US012685324B2

(12) United States Patent
Lauridsen et al.

(10) Patent No.: US 12,685,324 B2
(45) Date of Patent: Jul. 21, 2026

(54) CRYSTALLISATION OF BETA-LACTOGLOBULIN USING MULTIPLE PROTEIN FEEDS

(71) Applicant: ARLA FOODS AMBA, Viby J (DK)

(72) Inventors: Kasper Bøgelund Lauridsen, Viby J (DK); Hans Bertelsen, Viby J (DK); Nikolaj Drachmann, Viby J (DK)

(73) Assignee: ARLA FOODS AMBA, Viby J (DK)

( * ) Notice: Subject to any disclaimer, the term of this patent is extended or adjusted under 35 U.S.C. 154(b) by 275 days.

(21) Appl. No.: 18/261,612

(22) PCT Filed: Feb. 8, 2022

(86) PCT No.: PCT/EP2022/053010
§ 371 (c)(1),
(2) Date: Jul. 14, 2023

(87) PCT Pub. No.: WO2022/167683
PCT Pub. Date: Aug. 11, 2022

(65) Prior Publication Data
US 2024/0114919 A1 Apr. 11, 2024

(30) Foreign Application Priority Data
Feb. 8, 2021 (EP) ..................................... 21155726

(51) Int. Cl.
*A23J 1/20* (2006.01)
*A23C 21/00* (2006.01)
(52) U.S. Cl.
CPC ............... *A23J 1/205* (2013.01); *A23C 21/00* (2013.01)

(58) Field of Classification Search
CPC ................................. A23J 1/205; A23C 21/00
USPC .......................................................... 426/583
See application file for complete search history.

(56) References Cited

U.S. PATENT DOCUMENTS

| | | | |
|---|---|---|---|
| 2,790,790 A | 4/1957 | Klostergaard | |
| 5,719,048 A | 2/1998 | Nilsson et al. | |
| 2019/0320682 A1 | 10/2019 | Bertelsen et al. | |
| 2021/0267231 A1 | 9/2021 | Lauridsen et al. | |
| 2021/0267238 A1 | 9/2021 | Lauridsen et al. | |

FOREIGN PATENT DOCUMENTS

| | | |
|---|---|---|
| CN | 110381745 A | 10/2019 |
| EP | 0894091 A1 | 2/1999 |
| JP | H10218755 A | 8/1998 |

(Continued)

OTHER PUBLICATIONS

International Search Report and Written Opinion for Application No. PCT/EP2022/053010 dated May 27, 2022 (13 pages).

(Continued)

*Primary Examiner* — Brent T O'Hern
(74) *Attorney, Agent, or Firm* — Michael Best & Friedrich LLP

(57) ABSTRACT

The present invention relates to an improved method of producing beta-lactoglobulin (BLG) compositions by crystallisation of BLG. The invention makes use of at least two different BLG-containing protein feeds which are mixed to prepare a supersaturated protein solution in which BLG is crystallized. One of the protein feeds must have a pH of at least 5.6 and one of the protein feeds must have a pH of at most 5.4.

26 Claims, 1 Drawing Sheet

(56) References Cited

FOREIGN PATENT DOCUMENTS

| | | | | |
|---|---|---|---|---|
| WO | 2003050274 | A2 | 6/2003 | |
| WO | 2011120882 | A1 | 10/2011 | |
| WO | WO-2018115520 | A1 * | 6/2018 | ............... A23J 3/08 |
| WO | 2020002422 | A1 | 1/2020 | |
| WO | 2020002450 | A1 | 1/2020 | |
| WO | 2022167683 | A1 | 8/2022 | |

OTHER PUBLICATIONS

International Preliminary Report on Patentability for Application No. PCT/EP2022/053010 dated May 9, 2023 (7 pages).

European Patent Office. Extended European Search Report for application 21155726.9, dated Jul. 9, 2021 (11 pages).

O'Kennedy, B.T. et al. "The dominating effect of ionic strength on the heat-induced denaturation and aggregation of β-lactoglobulin in simulated milk ultrafiltrate." International Dairy Journal 19.3 (2009): 123-128.

Aschaffenburg, R., et al. "Improved method for the preparation of crystalline β-lactoglobulin and α-lactalbumin from cow's milk." Biochemical Journal 65.2 (1957): 273-277).

Coquerel, G.. "Crystallization of molecular systems from solution: phase diagrams, supersaturation and other basic concepts." Chemical Society Reviews 43.7 (2014): 2286-2300.

De Jongh, H. H. J., et al. "Mild isolation procedure discloses new protein structural properties of β-lactoglobulin." Journal of Dairy Science 84.3 (2001): 562-571.

International Search Report and Written Opinion for Application No. PCT/EP2022/072459, dated Mar. 20, 2023 (11 pages).

Lagasse, Had, et al. "Recent advances in (therapeutic protein) drug development." F1000Research 6 (2017): 113.

Leader, B. et al. "Protein therapeutics: a summary and pharmacological classification." Nature reviews Drug discovery 7.1 (2008): 21-39.

Link, F.J. et al. "Unraveling the impact of pH on the crystallization of pharmaceutical proteins: a case study of human insulin." Crystal growth & design 22.5 (2022): 3024-3033.

Lu, R.-M., et al. "Development of therapeutic antibodies for the treatment of diseases." Journal of biomedical science 27 (2020): 1-30.

Needleman, S. B. et al. "A general method applicable to the search for similarities in the amino acid sequence of two proteins." Journal of molecular biology 48.3 (1970): 443-453.

Palmer, A. H. "The preparation of a crystalline globulin from the albumin fraction of cow's milk." (1934): 359-372.

Rice, P. et al. "EMBOSS: the European molecular biology open software suite." Trends in genetics 16.6 (2000): 276-277.

Slack, A. W., et al. "Production of enriched β-lactoglobulin and α-lactalbumin whey protein fractions." Journal of Food Processing and Preservation 10.1 (1986): 19-30.

U.S. Appl. No. 19/099,236, filed Jan. 28, 2025, by Bertelsen et al. (Copy not submitted herewith pursuant to the waiver of 37 C.F. R. § 1.98(a)(2)(iii) issued by the Office on Oct. 19, 2004).

Wang Shilong (ed.), Protein Chemistry, Tongji University Press, Aug. 31, 2012, p. 343-350 (21 pages including English machine translation).

Chinese Patent Office Action for Application No. 202280013503.5 dated Aug. 14, 2025 (12 pages including English machine translation).

* cited by examiner

CRYSTALLISATION OF BETA-LACTOGLOBULIN USING MULTIPLE PROTEIN FEEDS

CROSS-REFERENCE TO RELATED APPLICATIONS

This application is a national stage application of International Patent Application No. PCT/EP2022/053010, filed Feb. 8, 2022, which claims priority to European Patent Application No. 21155726.9, filed Feb. 8, 2021, each of which is incorporated herein by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention relates to an improved method of producing beta-lactoglobulin (BLG) compositions by crystallisation of BLG. The invention makes use of at least two different BLG-containing protein feeds, which are mixed to prepare a supersaturated protein solution in which BLG is crystallized. One of the protein feeds must have a pH of at least 5.6 and one of the protein feeds must have a pH of at most 5.4.

Description of Related Art Including Information Disclosed Under 37 CFR 1.97 and 1.98

The concept of milk protein fractionation is well-known in the art and has been developed during the last decades to an array of technologies for preparing compositions enriched with various milk protein species each having specific properties and characteristics.

Isolation of beta-lactoglobulin (BLG) from milk serum or whey is the subject of a number of publications and typically involves multiple separation steps and often chromatographic techniques to arrive at a purified beta-lactoglobulin product.

WO2018/115520 describes industrial scale separation of BLG from protein solutions by crystallisation in salting-in mode and in the pH range 5-6. However, WO2018/115520 does not disclose preparing a supersaturated whey protein solution by mixing BLG-containing type A protein feed(s) and type B protein feed(s) as defined by the present invention.

WO 2020/002422 describes production of alpha-lactalbumin enriched whey protein products by industrial scale removal of BLG from whey protein solutions using BLG crystallisation in salting-in mode and at a pH in the range of 5-6. However, WO 2020/002422 does not disclose preparing a supersaturated whey protein solution by mixing BLG-containing type A protein feed(s) and type B protein feed(s) as defined by the present invention.

de Jongh et al (Mild Isolation Procedure Discloses New Protein Structural Properties of β-Lactoglobulin, J Dairy Sci., vol. 84 (3), 2001, pages 562-571) described purification of BLG from freshly milked milk by low temperature acid coagulation of casein and by subjecting the obtained acid whey to a combination of affinity chromatography (DEAE Sepharose) and gel permeation chromatography. The obtained BLG composition was stated to contain 0.985 g beta-lactoglobulin per 1 g protein.

Slack et al (Journal of Food Processing and Preservation, vol. 10, 1986, pages 19-30) explored a different approach and prepared BLG-enriched precipitates by pH adjusting demineralised acid whey and sweet whey to pH 4.65 and separating the formed precipitate by centrifugation and decantation. The obtained precipitate pellets were described as being relatively insoluble and contained a significant amount of protein impurities in additional BLG. No crystal formation was observed. It should be noted that the BLG precipitates that may form at pH 4.65 are not BLG crystals.

Palmer (Crystalline Globulin from Cow's Milk, J. Biol. Chem., Vol. 104, 1934, pages 359-372) reported a laborious and time consuming process for producing protein crystals based on acid whey using several sequences of salt precipitation of unwanted proteins, pH-adjustments and dialysis to remove other unwanted proteins. Finally, when a highly purified BLG solution had been obtained, BLG was crystallized. The process lasted more than 12 days and required addition of toluene. The procedures disclosed in Palmer are therefore incompatible with safe food production and provides products that are clearly not edible.

Aschaffenburg et al (Improved Method for the Preparation of Crystalline beta-Lactoglobulin and alpha-Lactalbumin from Cow's Milk, Bioch., vol. 65, 1957, pages 273-277) discloses an improved process relative to the process of Palmer's process, which improvement allows for preparation of beta-lactoglobulin crystals in the order of few days instead of weeks. However, the improved method still requires removal of unwanted proteins prior to crystallisation and furthermore employs toluene for the crystallisation, which makes it incompatible with safe food production.

JP H10 218755 A discloses production of cosmetic compositions containing a melanin-producing inhibitor, which comprises BLG as an active ingredient. The document furthermore suggests that BLG e.g. may be isolated by the following process: Hydrochloric acid is added to milk to precipitate casein followed by filtration to obtain whey. The pH of the whey is adjusted to 6.0 and ammonium sulfate is added in an amount of half saturation; the precipitated protein is removed by salting out, and a filtrate is recovered. The filtrate is saturated with ammonium sulfate and the precipitated protein is recovered. The recovered protein is again dissolved in water and dialyzed at pH 5.2 to separate the crystals, and β-lactoglobulin is prepared at a proportion of about 1.8 g from 1 L whey. However, the general process steps of the proposed process described in JP H10 218755 A are insufficient to lead to the formation of BLG crystals. The document therefore does not contain an enabling disclosure of crystallisation of BLG or of BLG crystals.

U.S. Pat. No. 2,790,790 discloses a process for precipitation of proteins from solution, and more particularly to the fractional precipitation of relatively unconjugated proteins from aqueous solution by the use of sodium chloride as the precipitant. The process is suggested to be useful for isolating BLG by NaCl-induced precipitation at pH 3.6-3.8. In example II of the document, it is suggested that the NaCl-precipitate may be dialysed in the usual manner to form crystalline B-lactoglobulin. However, U.S. Pat. No. 2,790,790 does not demonstrate that formation of BLG crystals at pH 3.6-3.8 is actually possible and contains no reference to meaning of "the usual manner" of dialyzing a BLG precipitate. The document therefore does not contain an enabling disclosure of crystallisation of BLG or of BLG crystals.

BRIEF SUMMARY OF THE INVENTION

It has been discovered previously that beta-lactoglobulin (BLG) can be efficiently isolated in industrial scale by crystallisation (see PCT application WO2018/115520). This crystallisation method requires processing and handling of large quantities of supersaturated protein solution.

The inventors have discovered that large scale implementation of WO2018/115520 often leads to undesired crystallisation of BLG before crystallisation is intended in the process. This is e.g. a problem if the BLG crystallisation takes place membrane filtration units or other equipment, which is sensitive to the presence of particulate matter.

The present inventors have now discovered that the isolation of BLG by crystallisation can be improved by preparing the supersaturated protein solution by mixing two or more BLG-containing protein feeds which have no or only a low level of BLG supersaturation as such, but which provide a higher degree of supersaturation when combined. One of these protein feeds should have a pH of at least 5.6 and more preferably at least 6.0 and the other should have a PH of at most 5.4 and more preferably at most 5.0. When combined, the two feeds provide a supersaturated BLG protein solution having a pH close to 5.5, which the inventors have found to be the optimum pH for the yield of BLG crystallisation.

The step of combining the protein feeds is preferably performed by mixing the feeds and does not required use of equipment that is sensitive to crystallisation of protein. This invention therefore reduces or even completely avoids the risk of early and unwanted BLG crystallisation, which may lead to clogging and malfunction of the involved process equipment.

A schematic illustration of the formation of the supersaturated protein solution is shown in FIG. 1, where one or more type B protein feed(s) (having a pH of at most 5.4 and preferably lower) are mixed with one or more type A protein feed(s) (having a pH of at least 5.6 and preferably even higher) in amounts sufficient to provide the initial protein solution which has a pH in the range of 5-6 and is supersaturated with respect to BLG.

The inventors have found this approach very advantageous for large scale crystallisation of BLG as the individual type A and B protein feeds can be produced with no or only very limited risk of early (and hence unwanted) BLG crystallisation. However, as soon as the type A protein feed(s) and type B feed(s) are mixed the supersaturated initial protein solution is formed.

FIG. 2 illustrates schematically how the yield of BLG crystallisation depends on the pH of the protein solution in which the crystallisation is to take place. The inventors have found the optimum pH to be approx. 5.5. Therefore, by mixing more acidic type B protein feed(s) with less acidic type A protein feed(s), an initial protein solution is obtained which is supersaturated with respect to BLG. If the type A protein feed(s) and/or the type B protein feed(s) are slightly supersaturated with respected to BLG, the initial protein solution must be even more supersaturated.

Guided by the disclosures of the present application and WO2018/115520, which is incorporated herein for all purposes, a skilled person can prepare type A protein feed(s) and type B protein feed(s) and mix them to provide initial protein solutions as described herein.

Thus, an aspect of the invention pertains to a method of preparing an edible composition comprising beta-lactoglobulin (BLG), preferably in crystallised and/or isolated form, the method comprising the steps of:

a) preparing an initial protein solution comprising BLG said initial protein solution is supersaturated with respect to BLG and has a pH in the range of 5-6, b) crystallising BLG in the supersaturated, initial protein solution, preferably in salting-in mode, thereby obtaining a BLG crystal-containing solution, and c) optionally, separating BLG crystals from the remaining liquid of the BLG crystal-containing solution, wherein step a) involves preparing the initial protein solution by combining, and preferably mixing, one or more type A protein feed(s) with one or more type B protein feed(s), and wherein:

a "type A protein feed" is defined as a protein feed which comprises BLG and has a pH of at least 5.6, and a "type B protein feed" is defined as a protein feed which comprises BLG and has a pH of at most 5.4.

BRIEF DESCRIPTION OF THE SEVERAL VIEWS OF THE DRAWING(S)

DETAILED DESCRIPTION OF THE INVENTION

Figure 1:
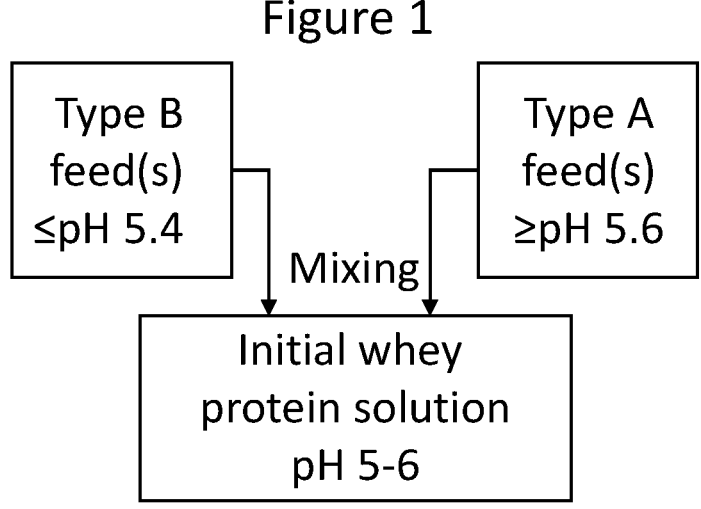
FIG. 1 illustrates step a) of the method where type A protein feed(s) is mixed with type B protein feed(s) to prepare the initial protein solution.
Figure 2:
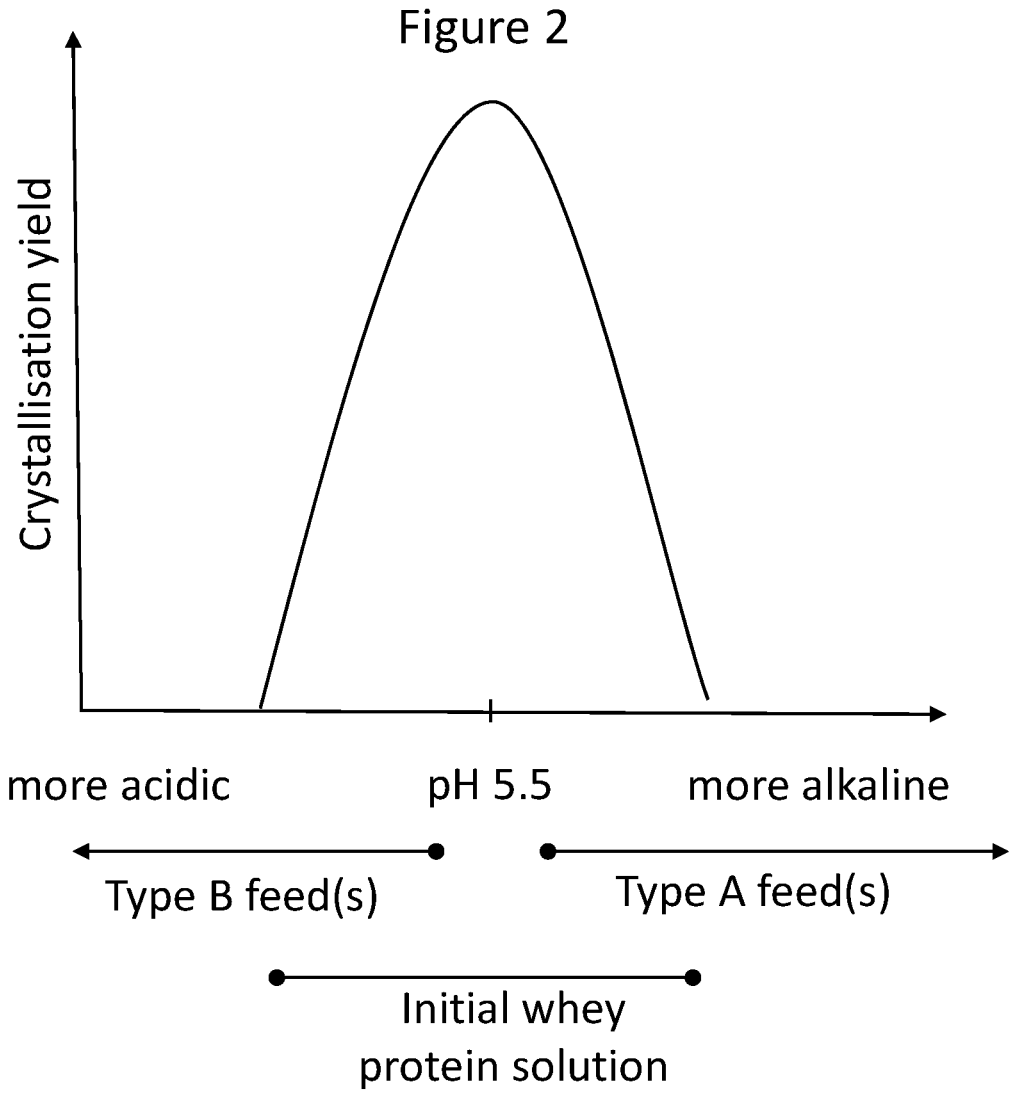
FIG. 2 is a schematic illustration of how the pH of the type A protein feed(s), type B protein feed(s) and the initial protein solution are located relative to the optimum pH for isolation of BLG by crystallisation.

As mentioned above, an aspect of the invention pertains to a method of preparing an edible composition comprising beta-lactoglobulin (BLG), preferably in crystallised and/or isolated form, the method comprising the steps of:

a) preparing an initial protein solution comprising BLG said initial protein solution is supersaturated with respect to BLG and has a pH in the range of 5-6, b) crystallising BLG in the supersaturated, initial protein solution, preferably in salting-in mode, thereby obtaining a BLG crystal-containing solution, and c) optionally, separating BLG crystals from the remaining liquid of the BLG crystal-containing solution, wherein step a) involves preparing the initial protein solution by combining, and preferably mixing, one or more type A protein feed(s) with one or more type B protein feed(s).

In the context of the present invention, the term "edible composition" pertains to a composition that is safe for human consumption and use as a food ingredient and that does not contain problematic amounts of toxic components such as toluene or other unwanted organic solvents.

The terms "edible composition comprising beta-lacto-globulin" and "edible BLG composition" are used interchangeably herein.

BLG is the most predominant protein in bovine whey and milk serum and exists in several genetic variants, the main ones in cow milk being labelled A and B. BLG is a lipocalin protein, and can bind many hydrophobic molecules, suggesting a role in their transport. BLG has also been shown to be able to bind iron via siderophores and might have a role in combating pathogens. A homologue of BLG is lacking in human breast milk.

Bovine BLG is a relatively small protein of approx. 162 amino acid residues with a molecular weight of approx. 18.3-18.4 kDa. Under physiological conditions it is predominantly dimeric, but dissociates to a monomer below about pH 3, preserving its native state as determined using NMR. Conversely, BLG also occurs in tetrameric, octameric and other multimeric aggregation forms under a variety of natural conditions.

BLG solutions can form gels under various conditions, when the native structure is sufficiently destabilised to allow aggregation. Under prolonged heating at low pH and low ionic strength, a transparent 'fine-stranded' gel is formed in which the protein molecules assemble into long stiff fibres.

In the context of the present invention, the term "BLG" or "beta-lactoglobulin" pertains to BLG from mammal species, e.g. in native and/or glycosylated forms and includes the naturally occurring genetic variants. The term BLG also encompasses mammal BLG produced by recombinant microorganisms. The term "BLG" or "beta-lactoglobulin" as used herein excludes unfolded and aggregated BLG. The content of BLG is measured according to Example 9.9 of WO 2018/115520.

In the context of the present invention, the term "crystal" pertains to a solid material whose constituents (such as atoms, molecules or ions) are arranged in a highly ordered microscopic structure, forming a crystal lattice that extends in all directions. BLG crystals are protein crystals that primarily contains BLG arranged in a highly ordered microscopic structure, forming a crystal lattice that extends in all directions. The BLG crystals may e.g. be monolithic or polycrystalline and may e.g. be intact crystals, fragments of crystals, or a combination thereof. Fragments of crystal are e.g. formed when intact crystals are subjected to mechanical shear during processing. Fragments of crystals also have the highly ordered microscopic structure of crystal but may lack the even surface and/or even edges or corners of an intact crystal. See e.g. FIG. 18 for an example of many intact BLG crystals and FIG. 13 for an example of fragments of BLG crystals. In both cases the BLG crystal or crystal fragments can be identified visually as well-defined, compact and coherent structures using light microscopy. BLG crystal or crystal fragments are often at least partially transparent. Protein crystals are furthermore known to be birefringent and this optical property can be used to identify unknown particles as having crystal structure. Non-crystalline BLG aggregates, on the other hand, appear as poorly defined, non-transparent, and as open or porous lumps of irregular size.

In the context of the present invention, the term "crystallise" pertains to formation of protein crystals. Crystallisation may e.g. happen spontaneously or be initiated by the addition of crystallisation seeds.

The edible composition comprises BLG in crystallised and/or isolated form. An edible composition that comprises BLG in isolated form comprises at least 80% w/w BLG relative to total solids. An edible composition that comprises BLG in crystallised form comprises at least some BLG crystals, and preferably a significant amount of BLG crystals.

BLG crystals can often be observed by microscopy and may even reach a size which makes them visible by eye.

In the context of the present invention, a liquid which is "supersaturated" or "supersaturated with respect to BLG" contains a concentration of dissolved BLG which is above the saturation point of BLG in that liquid at the given physical and chemical conditions. The term "supersaturated" is well-known in the field of crystallisation (see e.g. Gérard Coquerel, "Crystallization of molecular systems from solution: phase diagrams, supersaturation and other basic concepts", Chemical Society Reviews, p. 2286-2300, Issue 7, 2014) and supersaturation can be determined by a number of different measurement techniques (e.g. by spectroscopy or particle size analysis). In the context of the present invention, supersaturation with respect to BLG is determined by the following procedure.

Procedure for Testing Whether a Liquid at a Specific Set of Conditions is Supersaturated with Respect to BLG:

a) Transfer a 50 ml sample of the liquid to be tested to a centrifuge tube (VWR Catalogue no. 525-0402) having a height of 115 mm, an inside diameter of 25 mm and a capacity of 50 mL. Care should be taken to keep the sample and subsequent fractions thereof at the original physical and chemical conditions of the liquid during steps a)-h).

b) The sample is immediately centrifuged at 3000 g for 3.0 minutes with max. 30 seconds acceleration and max 30 seconds deceleration.

c) Immediately after the centrifugation, transfer as much as possible of the supernatant (without disturbing the pellet if a pellet has formed) to a second centrifuge tube (same type as in step a)

d) Take a 0.05 mL subsample of the supernatant (subsample A)

e) Add 10 mg BLG crystals (at least 98% pure BLG relative to total solids) having a particle size of at most 200 micron to the second centrifuge tube and agitate the mixture.

f) Allow the second centrifuge tube to stand for 60 minutes at the original temperature.

g) Immediately after step f), centrifuge the second centrifuge tube at 500 g for 10 minutes and then take another 0.05 ml subsample of the supernatant (subsample B).

h) Recover the centrifugation pellet of step g) if there is one, resuspend it in milliQ water and immediately inspect the suspension for presence of crystals that are visible by microscopy.

i) Determine the concentration of BLG in subsamples A and B using the method outlined in Example 9.9 of WO2018/115520—the results are expressed as % BLG w/w relative to the total weight of the subsamples. The concentration of BLG of subsample A is referred to as $C_{BLG, A}$ and the concentration of BLG of subsample B is referred to as $C_{BLG, B}$.

j) The liquid from which the sample of step a) was taken was supersaturated (at the specific conditions) if $C_{BLG, B}$ is lower than $C_{BLG, A}$ and if crystals are observed in step i).

In the context of the present invention, the terms "liquid" and "solution" encompass compositions that contain a combination of liquid and solid or semi-solid particles such as e.g. protein crystals or other protein particles. A "liquid" or a "solution" may therefore be a suspension or even a slurry. However, a "liquid" and "solution" is preferably pumpable.

In the context of the present invention, a dry product such as e.g. a powder, which comprises "BLG crystals" contains the product obtained from drying a suspension of BLG crystals and the crystal structure of the wet BLG crystals may have been distorted during the drying process and may at least partially have lost their x-ray diffraction characteristics. Along the same lines, the terms "dry BLG crystal" and "dried BLG crystal" refer to the particle obtained from drying a wet BLG crystal and this dry particle need not have a crystal structure itself. However, the present inventors have observed that when dried BLG crystals are resuspended in cold (4 degrees C.) demineralised water in the weight ratio 2 part water to 1 part dried BLG crystals the BLG crystal are rehydrated and resume substantially the same crystal structure (space group-type and unit cell dimension) as before drying.

Methods of analysis described in the context of PCT Application WO 2018/115520 apply equally to the present invention and should be used for determining the parameters described herein.

In the context of the present invention the term "initial protein solution" pertains to the protein solution prepared by combining, and preferably mixing, one or more type A protein feed(s) and one or more type B protein feed(s). The initial protein solution is the BLG-containing solution which is supersaturated with respect to BLG and in which the crystallisation of step b) is initiated. If one or more of the used protein feed(s) already contain BLG crystals the initial protein solution is the first protein solution which has a pH in the range of 5.0-6.0, is supersaturation with respect to BLG, and which is obtained by combining, and preferably mixing, a Type A protein feed and a Type B protein feed.

In the context of the present invention the term a "type A protein feed" relates to a protein feed which has a pH of at least 5.6 and which furthermore comprises BLG. Any BLG-containing protein feed which have a pH of at least 5.6 and are used for preparing the initial protein solution are therefore considered type A protein feeds.

In the context of the present invention the term a "type B protein feed" relates to a protein feed which has a pH of at most 5.4 and which furthermore comprises BLG. Any BLG-containing protein feed which have a pH of at most 5.4 and are used for preparing the initial protein solution are therefore considered type B protein feeds.

In the context of the present invention the term "one or more type A protein feed(s)" means that the invention may be implemented with a single type A protein feed or with several type A protein feeds which are combined with the type B protein feed(s) during the preparation of the initial protein solution.

In the context of the present invention the term "one or more type B protein feed(s)" means that the invention both may be implemented with a single type B protein feed or with several type B protein feeds which are combined with the type A protein feed(s) during the preparation of the initial protein solution.

In the context of the present invention the term "the type A protein feed(s) would, if combined, . . . " describes the one or more type A protein feed(s) based on the characteristics they would have had if they hypothetically were mixed to a single type A protein feed in the same amounts as they are used to prepare the initial protein solution. It is important to note that this term also encompasses the use of only a single type A protein feed in which case the characteristics relate to the single type A protein feed. It is furthermore important to note that this term does not require that multiple type A protein feeds are actually combined prior to mixing with the one or more type B protein feed(s).

In the context of the present invention the term "the type B protein feed(s) would, if combined, . . . " describes the one or more type B protein feed(s) based on the characteristics they would have had if they hypothetically were mixed to a single type B protein feed in the same amounts as they are used to prepare the initial protein solution. It is important to note that this term also encompasses the use of only a single type B protein feed in which case the characteristics relate to the single type B protein feed. It is furthermore important to note that this term does not require that multiple type B protein feeds are actually combined prior to mixing with the one or more type A protein feed(s).

The initial protein solution of step a) typically comprises non-BLG solids in addition to BLG. In the context of the present invention the term "non-BLG solids" pertains to solids such as e.g. carbohydrates, minerals, lipids, peptides as well as other proteins than BLG. The solids present in the initial protein solution are characteristic for the protein source or sources from which the protein feeds have been prepared. Protein feeds based on whey protein sources will typically contain other whey proteins, such as e.g. alphalactalbumin, caseinomacropeptide, and/or bovine serum albumin, in addition to BLG. Protein feeds based on BLG sources prepared by fermentation typically contain impurities from the fermentation broth e.g. residual nutrients and metabolic by-products such as e.g. other proteins, peptides and metabolized nutrients.

In some preferred embodiments of the invention, the method does not contain the separation of step c) and provides an edible composition, which comprises both BLG crystals and the additional protein, e.g. additional whey protein. If this method variant furthermore include the drying of step f) it provides a dry composition containing BLG crystals and the additional whey protein, i.e. a WPC or WPI in which at least a portion of the BLG is present in the form of BLG crystals. Preferably, the method contains the steps a), b) and f) in direct sequence.

If the protein feeds are prepared from a whey protein concentrate (WPC), a whey protein isolate (WPI), a serum protein concentrate (SPC) or a serum protein isolate (SPI), the above method variant makes it possible to prepare a WPC, WPI, SPC, or SPI in liquid or dry form, in which at least a portion of the BLG is in crystal form.

The terms "whey protein concentrate" and "serum protein concentration" pertains to dry or aqueous compositions in which contains a total amount of protein of 20-89% w/w relative to total solids.

A WPC or an SPC preferably contains:
20-89% w/w protein relative to total solids,
15-70% w/w BLG relative to total protein,
8-50% w/w ALA relative to total protein, and
0-40% w/w CMP relative to protein.
Alternatively, but also preferred, a WPC or an SPC may contain:
20-89% w/w protein relative to total solids,
15-90% w/w BLG relative to total protein,
4-50% w/w ALA relative to total protein, and
0-40% w/w CMP relative to protein.
Preferably, a WPC or an SPC contains:
20-89% w/w protein relative to total solids, 15-80% w/w BLG relative to total protein, 4-50% w/w ALA relative to total protein, and 0-40% w/w CMP relative to protein.

More preferably a WPC or a SPC contains:

70-89% w/w protein relative to total solids, 30-90% w/w BLG relative to total protein, 4-35% w/w ALA relative to total protein, and 0-25% w/w CMP relative to protein.

The terms "whey protein isolate" and "serum protein isolate" pertains to dry or aqueous compositions in which contain a total amount of protein of 90-100% w/w relative to total solids.

A WPI or a SPI preferably contains:

90-100% w/w protein relative to total solids, 15-70% w/w BLG relative to total protein, 8-50% w/w ALA relative to total protein, and 0-40% w/w CMP relative to total protein.

Alternatively, but also preferred, a WPI or a SPI may contain:

90-100% w/w protein relative to total solids, 30-95% w/w BLG relative to total protein, 4-35% w/w ALA relative to total protein, and 0-25% w/w CMP relative to total protein.

More preferably a WPI or a SPI may contain:

90-100% w/w protein relative to total solids, 30-90% w/w BLG relative to total protein, 4-35% w/w ALA relative to total protein, and 0-25% w/w CMP relative to total protein.

In some preferred embodiments of the invention, the method furthermore comprises a step d) of washing BLG crystals, e.g. the separated BLG crystals obtained from step c).

In some preferred embodiments of the invention, the method furthermore comprises a step e) of re-crystallising BLG crystals, e.g. the BLG crystals obtained from step c) or d).

The method may e.g. comprise, or even consist of, steps a), b), c), d), and e). Alternatively, the method may comprise, or even consist, of steps a), b), c), and e).

In some particularly preferred embodiments of the invention, the method furthermore comprises a step f) of drying a BLG-containing composition derived from step b), c), d), or e).

The method may for example comprise, or even consist of, steps a), b), and f). Alternatively, the method may comprise, or even consist of, steps a), b), c) and f). Alternatively, the method may comprise, or even consist of, steps a), b), c), d) and f). Alternatively, the method may comprise, or even consist of, steps a), b), c), d), e) and f). As said, step a) of the present invention involves providing an initial protein solution which has a pH in the range of 5-6 and is supersatured with respect to BLG.

The initial protein solution often contain additional protein in addition to BLG. In the context of the present invention, the term "additional protein" means a protein that is not BLG. The additional protein that is present in the initial protein solution typically comprises one or more of the non-BLG proteins that are found in milk serum or whey. Non-limiting examples of such proteins are alpha-lactalbumin, bovine serum albumin, immunoglobulines, caseinomacropeptide (CMP), osteopontin, lactoferrin, and milk fat globule membrane proteins. Alternatively, the additional protein may be protein impurities or cell debris from a fermentation broth, e.g. if the BLG is produced by fermentation of a recombinant cell culture.

In the context of the present invention, the term "whey protein" pertains to protein that is found in whey or in milk serum. The whey protein of the initial protein solution may be a subset of the protein species found in whey or milk serum or it may be the complete set of protein species found in whey or/and in milk serum. However, the initial protein solution always contains BLG.

The initial protein solution may therefore preferably contain at least one additional whey protein selected from the group consisting of alpha-lactalbumin, bovine serum albumin, immunoglobulines, caseinomacropeptide (CMP), osteopontin, lactoferrin, milk fat globule membrane proteins, and combinations thereof.

Alpha-lactalbumin (ALA) is a protein present in the milk of almost all mammalian species. ALA forms the regulatory subunit of the lactose synthase (LS) heterodimer and $\beta$-1, 4-galactosyltransferase (beta4Gal-T1) forms the catalytic component. Together, these proteins enable LS to produce lactose by transferring galactose moieties to glucose. As a multimer, alpha-lactalbumin strongly binds calcium and zinc ions and may possess bactericidal or antitumor activity. One of the main structural differences with beta-lactoglobulin is that ALA does not have any free thiol group that can serve as the starting-point for a covalent aggregation reaction. As a result, pure ALA will not form gels upon denaturation and acidification.

In the context of the present invention, the term "ALA" or "alpha-lactalbumin" pertains to alpha-lactalbumin from mammal species, e.g. in native and/or glycosylated forms and includes the naturally occurring genetic variants.

In some embodiments of the invention, the initial protein solution comprises at most 10% w/w casein relative to the total amount of protein, preferably at most 5% w/w, more preferred at most 1% w/w, and even more preferred at most 0.5% casein relative to the total amount of protein. In some preferred embodiments of the invention, the initial protein solution does not contain any detectable amount of casein.

The term "milk serum" pertains to the liquid which remains when casein and milk fat globules have been removed from milk, e.g. by microfiltration or large pore ultrafiltration. Milk serum may also be referred to as "ideal whey".

The term "milk serum protein" or "serum protein" pertains to the protein which is present in the milk serum.

The term "whey" pertains to the liquid supernatant that is left after the casein of milk has been precipitated and removed. Casein precipitation may e.g. be accomplished by acidification of milk and/or by use of rennet enzyme.

Several types of whey exist, such as "sweet whey", which is the whey product produced by rennet-based precipitation of casein, and "acid whey" or "sour whey" which is the whey product produced by acid-based precipitation of casein. Acid-based precipitation of casein may e.g. be accomplished by addition of food acids or by means of bacterial cultures.

In some preferred embodiments of the present invention the initial protein solution of step a) comprises non-BLG solids in an amount of at least 1% w/w relative to total solids, more preferably at least 2% w/w, even more preferred at least 5% w/w and most preferred at least 10% w/w.

In other preferred embodiments of the present invention the initial protein solution of step a) comprises non-BLG solids in an amount of at least 15% w/w relative to total solids, more preferably at least 20% w/w, even more preferred at least 30% w/w and most preferred at least 40% w/w.

In some preferred embodiments of the present invention the initial protein solution of step a) comprises non-BLG solids in an amount of 0-70% w/w relative to total solids, more preferably 1-60% w/w, even more preferred 2-50% w/w and most preferred 3-40% w/w.

In other preferred embodiments of the present invention the initial protein solution of step a) comprises non-BLG solids in an amount of 0-20% w/w relative to total solids, more preferably 0-15% w/w, even more preferred 0-10% w/w and most preferred 0-5% w/w.

In further preferred embodiments of the present invention the initial protein solution of step a) comprises non-BLG solids in an amount of 15-70% w/w relative to total solids, more preferably 20-65% w/w, even more preferred 25-60% w/w and most preferred 30-50% w/w.

In some preferred embodiments of the invention, the initial protein solution of step a) comprises at least 5% w/w additional whey protein relative to the total amount of protein. Preferably, the initial protein solution of step a) comprises at least 10% w/w additional whey protein relative to the total amount of protein. More preferably, the initial protein solution of step a) comprises at least 15% w/w additional whey protein relative to the total amount of protein. Even more preferably, the initial protein solution of step a) comprises at least 20% w/w additional whey protein relative to the total amount of protein. Most preferably, the initial protein solution of step a) may comprise at least 30% w/w additional whey protein relative to the total amount of protein.

In other preferred embodiments of the invention, the initial protein solution of step a) comprises at least 1% w/w additional whey protein relative to the total amount of protein. Preferably, the initial protein solution of step a) comprises at least 2% w/w additional whey protein relative to the total amount of protein. Even more preferably, the initial protein solution of step a) comprises at least 3% w/w additional whey protein relative to the total amount of protein. Most preferably, the initial protein solution of step a) may comprise at least 4% w/w additional whey protein relative to the total amount of protein.

In yet other preferred embodiments of the invention, the initial protein solution of step a) comprises at least 35% w/w additional whey protein relative to the total amount of protein. Preferably, the initial protein solution of step a) may comprise at least 40% w/w additional whey protein relative to the total amount of protein. More preferably, the initial protein solution of step a) may e.g. comprise at least 45% w/w additional whey protein relative to the total amount of protein. Even more preferably, the initial protein solution of step a) may comprise at least 50% w/w additional whey protein relative to the total amount of protein.

In some preferred embodiments of the invention the initial protein solution of step a) comprises in the range of 5-90% w/w additional whey protein relative to the total amount of protein. Preferably, the initial protein solution of step a) may comprise in the range of 10-80% w/w additional whey protein relative to the total amount of protein. The initial protein solution of step a) may e.g. comprise in the range of 20-70% w/w additional whey protein relative to the total amount of protein. Preferably, the initial protein solution of step a) comprises in the range of 30-70% w/w additional whey protein relative to the total amount of protein.

As said, the present inventors have found that it is possible to crystallize BLG without the use of organic solvents. This purification approach can also be used to refine preparations containing whey protein, which preparations have already been subjected to some BLG purification and provides simple methods of increasing the purity of BLG even further. Thus, in some preferred embodiments of the invention the initial protein solution of step a) comprises in the range of 1-20% w/w additional whey protein relative to the total amount of protein. Preferably, the initial protein solution of step a) may comprise in the range of 2-15% w/w additional whey protein relative to the total amount of protein. Even more preferably, the initial protein solution of step a) may e.g. comprise in the range of 3-10% w/w additional whey protein relative to the total amount of protein.

In some embodiments of the invention the initial protein solution of step a) comprises at least 5% w/w ALA relative to the total amount of protein. Preferably, the initial protein solution of step a) comprises at least 10% w/w ALA relative to the total amount of protein. Even more preferably, the initial protein solution of step a) comprises at least 15% w/w ALA relative to the total amount of protein. Alternatively, the initial protein solution of step a) may comprise at least 20% w/w ALA relative to the total amount of protein.

In some preferred embodiments of the invention the initial protein solution of step a) comprises at least 25% w/w ALA relative to the total amount of protein. Preferably, the initial protein solution of step a) comprises at least 30% w/w ALA relative to the total amount of protein. The initial protein solution of step a) preferably comprises at least 35% w/w ALA relative to the total amount of protein. Even more preferably, the initial protein solution of step a) may comprise at least 40% w/w ALA relative to the total amount of protein.

In some preferred embodiments of the invention the initial protein solution of step a) comprises in the range of 5-95% w/w ALA relative to the total amount of protein. Preferably, the initial protein solution of step a) comprises in the range of 5-70% w/w ALA relative to the total amount of protein. Even more preferably, the initial protein solution of step a) may comprise in the range of 10-60% w/w ALA relative to the total amount of protein. The initial protein solution of step a) preferably comprises in the range of 12-50% w/w ALA relative to the total amount of protein. Even more preferred, the initial protein solution of step a) may comprise in the range of 20-45% w/w ALA relative to the total amount of protein.

In some preferred embodiments of the invention the initial protein solution of step a) has a weight ratio between BLG and ALA of at least 0.01. Preferably, the initial protein solution of step a) has a weight ratio between BLG and ALA of at least 0.5. Even more preferably, the initial protein solution of step a) has a weight ratio between BLG and ALA of at least 1, such as e.g. at least 2. For example, the initial protein solution of step a) may have a weight ratio between BLG and ALA of at least 3.

Amounts and concentrations of BLG and other proteins in the initial protein solution and the protein feed all refer to dissolved protein and do not include precipitated or crystallised protein.

In the context of the present invention, the term "weight ratio" between component X and component Y means the value obtained by the calculation mx/my wherein mx is the amount (weight) of components X and my is the amount (weight) of components Y.

In some preferred embodiments of the invention the initial protein solution of step a) has a weight ratio between BLG and ALA in the range of 0.01-20. Preferably, the initial protein solution of step a) has a weight ratio between BLG and ALA in the range of 0.2-10. Even more preferably, the initial protein solution of step a) has a weight ratio between BLG and ALA in the range of 0.5-4. For example, the initial protein solution of step a) may have a weight ratio between BLG and ALA in the range of 1-3.

In some preferred embodiments of the invention the initial protein solution of step a) comprises at least 1% w/w BLG relative to the total amount of protein. Preferably, the initial protein solution of step a) comprises at least 2% w/w BLG relative to the total amount of protein. Even more preferably, the initial protein solution of step a) comprises at least 5% w/w BLG relative to the total amount of protein. Preferably, the initial protein solution of step a) may comprise at least 10% w/w BLG relative to the total amount of protein.

In some preferred embodiments of the invention the initial protein solution of step a) comprises at least 12% w/w BLG relative to the total amount of protein. For example, the initial protein solution of step a) may comprise at least 15% w/w BLG relative to the total amount of protein. The initial protein solution of step a) may e.g. comprise at least 20% w/w BLG relative to the total amount of protein. Alternatively, the initial protein solution of step a) may comprise at least 30% w/w BLG relative to the total amount of protein.

In other preferred embodiments of the invention the initial protein solution of step a) comprises at least 40% w/w BLG relative to the total amount of protein. More preferably, the initial protein solution of step a) may comprise at least 45% w/w BLG relative to the total amount of protein. Even more preferably, the initial protein solution of step a) may e.g. comprise at least 50% w/w BLG relative to the total amount of protein. Most preferably, the initial protein solution of step a) may comprise at least 55% w/w BLG relative to the total amount of protein.

In some particularly preferred embodiments of the invention the initial protein solution of step a) comprises at most 95% w/w BLG relative to the total amount of protein. Preferably, the initial protein solution of step a) may comprise at most 90% w/w BLG relative to the total amount of protein. More preferably, the initial protein solution of step a) may e.g. comprise at most 85% w/w BLG relative to the total amount of protein. Even more preferably, the initial protein solution of step a) may e.g. comprise at most 80% w/w BLG relative to the total amount of protein. Preferably, the initial protein solution of step a) may comprise at most 78% w/w BLG relative to the total amount of protein. Preferably, the initial protein solution of step a) may comprise at most 75% w/w BLG relative to the total amount of protein.

In some preferred embodiments of the invention the initial protein solution of step a) comprises in the range of 1-95% w/w BLG relative to the total amount of protein. Preferably, the initial protein solution of step a) may comprise in the range of 5-90% w/w BLG relative to the total amount of protein. More preferably the initial protein solution of step a) comprises in the range of 10-85% w/w BLG relative to the total amount of protein. Even more preferably the initial protein solution of step a) comprises in the range of 10-80% w/w BLG relative to the total amount of protein. Most preferably, the initial protein solution of step a) may comprise in the range of 20-70% w/w BLG relative to the total amount of protein.

In other preferred embodiments of the invention the initial protein solution of step a) comprises in the range of 10-95% w/w BLG relative to the total amount of protein. Preferably, the initial protein solution of step a) may comprise in the range of 12-90% w/w BLG relative to the total amount of protein. More preferably the initial protein solution of step a) comprises in the range of 15-85% w/w BLG relative to the total amount of protein. Even more preferably the initial protein solution of step a) comprises in the range of 15-80% w/w BLG relative to the total amount of protein. Most preferably, the initial protein solution of step a) may comprise in the range of 30-70% w/w BLG relative to the total amount of protein.

In some preferred embodiments of the invention the initial protein solution of step a) comprises BLG in an amount of at least 0.4% w/w relative to the weight of the initial protein solution. Preferably the initial protein solution comprises BLG in an amount of at least 1.0% w/w. More preferably the initial protein solution comprises BLG in an amount of at least 2.0% w/w. It is even more preferred that the initial protein solution comprises BLG in an amount of at least 4% w/w.

Higher concentrations of BLG are even more preferred and preferably the initial protein solution comprises BLG in an amount of at least 6% w/w. More preferably, the initial protein solution comprises BLG in an amount of at least 10% w/w. It is even more preferred that the initial protein solution comprises BLG in an amount of at least 15% w/w.

In some preferred embodiments of the invention the initial protein solution of step a) comprises BLG in an amount in the range of 0.4-40% w/w relative to the weight of the initial protein solution. Preferably the initial protein solution comprises BLG in an amount in the range of 1-35% w/w. More preferably the initial protein solution comprises BLG in an amount in the range of 4-30% w/w. It is even more preferred that the initial protein solution comprises BLG in an amount in the range of 10-25% w/w.

In other preferred embodiments of the invention the initial protein solution of step a) comprises BLG in an amount in the range of 1-45% w/w relative to the weight of the initial protein solution. Preferably the initial protein solution comprises BLG in an amount in the range of 3-40% w/w. More preferably the initial protein solution comprises BLG in an amount in the range of 5-36% w/w. It is even more preferred that the initial protein solution comprises BLG in an amount in the range of 7-34% w/W.

In further preferred embodiments of the invention the initial protein solution of step a) comprises BLG in an amount in the range of 6-32% w/w relative to the weight of the initial protein solution. Preferably the initial protein solution comprises BLG in an amount in the range of 8-30% w/w. More preferably the initial protein solution comprises BLG in an amount in the range of 10-28% w/w. It is even more preferred that the initial protein solution comprises BLG in an amount in the range of 12-26% w/w.

It is preferred that the initial protein solution is a demineralised initial protein solution.

In this context the term demineralised means that the conductivity of the initial protein solution is at most 15 mS/cm, and preferably at most 10 mS/cm, and even more preferably at most 8 mS/cm. The UF permeate conductivity of a demineralised initial protein solution is preferably at most 7 mS/cm, more preferably at most 4 mS/cm, and even more preferably at most 1 mS/cm.

It is particularly preferred that the initial protein solution is a demineralised milk serum protein concentrate, a demineralised milk serum protein isolate, a demineralised whey protein concentrate, or a demineralised whey protein isolate.

In some particularly preferred embodiments of the invention the initial protein solution comprises, or even consists of, a demineralised and pH adjusted milk serum protein concentrate, whey protein concentrate, milk serum protein isolate, whey protein isolate, or a combination thereof.

The initial protein solution may for example comprise, or even consist of, a demineralised milk serum protein concentrate. Alternatively, the initial protein solution may comprise, or even consist of, a demineralised whey protein concentrate. Alternatively, the initial protein solution may comprise, or even consist of, a demineralised milk serum protein isolate. Alternatively, the initial protein solution may comprise, or even consist of, a demineralised whey protein isolate.

In the context of the present invention, the terms "whey protein concentrate" and "milk serum protein concentrate" pertains to preparations of whey or milk serum which preparations contain in the range of approx. 20-89% w/w protein relative to total solids.

In the context of the present invention, the terms "whey protein isolate" and "milk serum protein isolated" pertains to preparations of whey or milk serum which preparations contain at least 90% w/w protein relative to total solids.

The terms "consists essentially of" and "consisting essentially of" mean that the claim or feature in question encompasses the specified materials or steps and those that do not materially affect the basic and novel characteristic(s) of the claimed invention.

The protein of the initial protein solution is preferably derived from mammal milk, and preferably from the milk of a ruminant such as e.g. cow, sheep, goat, buffalo, camel, llama, mare and/or deer. Protein derived from bovine (cow) milk is particularly preferred. The BLG and any additional protein are therefore preferably bovine BLG and bovine whey protein. In other embodiments of the invention the BLG of the initial protein solution has been produced by a recombinant microorganism but still has the amino acid sequence of BLG derived from mammal milk.

The protein of the initial protein solution is preferably as close to its native state as possible and preferably have only been subjected to gentle, non-denaturing heat-treatments if any at all.

In some preferred embodiments of the invention the BLG of the initial protein solution has a degree of lactosylation of at most 1. Preferably, the BLG of the initial protein solution has a degree of lactosylation of at most 0.6. More preferably, the BLG of the initial protein solution has a degree of lactosylation of at most 0.4. Even more preferably, the BLG of the initial protein solution has a degree of lactosylation of at most 0.2. Most preferably, the BLG of the initial protein solution has a degree of lactosylation of at most 0.1, such as e.g. preferably at most 0.01.

The degree of lactosylation of BLG is determined according to Czerwenka et al (J. Agric. Food Chem., Vol. 54, No. 23, 2006, pages 8874-8882).

In some preferred embodiments of the invention the initial protein solution has a furosine value of at most 80 mg/100 g protein. Preferably, the initial protein solution has a furosine value of at most 40 mg/100 g protein. More preferably, the initial protein solution has a furosine value of at most 20 mg/100 g protein. Even more preferably, the initial protein solution has a furosine value of at most 10 mg/100 g protein. Most preferably, the initial protein solution has a furosine value of at most 5 mg/100 g protein, such as e.g. preferably a furosine value of 0 mg/100 g protein.

The initial protein solution typically contains other components in addition to protein. The initial protein solution may contain other components that are normally found in whey or milk serum, such as e.g. minerals, carbohydrate, and/or lipid. Alternatively or additionally, the initial protein solution may contain components that are not native to the whey or milk serum. However, such non-native components should preferably be safe for use in food production and preferably also for human consumption.

The present method is particularly advantageous for separating BLG from crude initial protein solutions that contain other solids than BLG.

The initial protein solution may for example contain carbohydrates, such as e.g. lactose, oligosaccharides and/or hydrolysis products of lactose (i.e. glucose and galactose). The initial protein solution may e.g. contain carbohydrate in the range of 0-40% w/w, such as in the range of 1-30% w/w, or in the range of 2-20% w/w.

In some preferred embodiments of the invention the initial protein solution contains at most 20% w/w carbohydrate, preferably at most 10% w/w carbohydrate, more preferably at most 5% w/w carbohydrate, and even more preferably at most 2% w/w carbohydrate.

The initial protein solution may also comprise lipid, e.g. in the form of triglyceride and/or other lipid types such as phospholipids.

In some embodiments of the invention the initial protein solution of step a) comprises a total amount of lipid of at most 15% w/w relative to total solids. Preferably, the initial protein solution of step a) comprises a total amount of lipid of at most 10% w/w relative to total solids. More preferably, the initial protein solution of step a) comprises a total amount of lipid of at most 6% w/w relative to total solids. Even more preferably, the initial protein solution of step a) comprises a total amount of lipid of at most 1.0% w/w relative to total solids. Most preferably, the initial protein solution of step a) comprises a total amount of lipid of at most 0.5% w/w relative to total solids.

The total amount of protein of the initial protein solution is typically at least 1% w/w relative to the weight of the initial protein solution. Preferably, the total amount of protein of the initial protein solution is at least 5% w/w. More preferred, the total amount of protein of the initial protein solution is at least 10% w/w. Even more preferred, the total amount of protein of the initial protein solution is at least 15% w/w.

In some preferred embodiments of the invention the total amount of protein of the initial protein solution is in the range of 1-50% w/w. Preferably, the total amount of protein of the initial protein solution is in the range of 5-40% w/w. More preferred, the total amount of protein of the initial protein solution is in range of 10-30% w/w. Even more preferred, the total amount of protein of the initial protein solution is in the range of 15-25% w/w.

The total solids of the initial protein solution is typically at least 1% w/w relative to the weight of the initial protein solution. Preferably, the total solids of the initial protein solution is at least 5% w/w. More preferred, the total solids of the initial protein solution is at least 10% w/w. Even more preferred, the total solids of the initial protein solution is at least 15% w/w.

In some preferred embodiments of the invention the total solids of the initial protein solution is in the range of 5-50% w/w. Preferably, the total solids of the initial protein solution is in the range of 8-40% w/w. More preferred, the total solids of the initial protein solution is in range of 10-30% w/w. Even more preferred, the total solids of the initial protein solution is in the range of 15-25% w/w.

In other preferred embodiments of the invention the total solids of the initial protein solution is in the range of 8-50% w/w. Preferably, the total solids of the initial protein solution is in the range of 10-45% w/w. More preferred, the total solids of the initial protein solution is in range of 12-40% w/w. Even more preferred, the total solids of the initial protein solution is in the range of 15-35% w/w.

The total amount of protein of the initial protein solution is determined according to Example 9.2 of WO2018/115520.

The initial protein solution of the step a) is prepared by combining, and preferably mixing, one or more type A protein feed(s) with one or more type B protein feed(s). As mentioned above, any BLG-containing protein feed having a pH of at least 5.6 is defined as a type A protein feed, and any BLG-containing protein feed having a pH of at most 5.4 is defined as a type B protein feed.

In a most preferred embodiment, the initial protein solution is prepared by combining, and preferably mixing, a single type A protein feed with a single type B protein feed. The crystallisation is preferably initiated by subsequent addition of a seed composition, preferably in the form of a liquid or alternatively in the form of a powder.

The initial protein solution may furthermore contain protein feed(s) that are neither of Type A nor B, e.g. protein feed(s) having a pH of approx. 5.5 or protein feed(s) not containing BLG, but it is preferred to limit or even avoid the presence of such additional protein feeds unless they are used to optimize the processes, e.g. by providing BLG crystals or other seed materials to initiate crystallisation.

The preparation of the initial protein solution may involve addition of other ingredients in addition to the protein feeds, e.g. addition of acid or base in order to provide an initial protein solution with a suitable pH. However, it is preferred that the one or more type A protein feed(s) and the one or more type B protein feed(s) have already been conditioned to provide the desired pH when combined and hence to limit or even avoid addition of other ingredients.

In the context of the present invention, the terms "one or more type A protein feed(s)" and "one or more type B protein feed(s)" pertain to the BLG-containing compositions that are combined during the preparation of the initial protein solution supersaturated with respect to BLG. As said, a "type A protein feed" has a pH of at least 5.6 and a "type B protein feed" has a pH of at most 5.4. The protein feeds are typically aqueous liquid and/or powder comprising BLG and impurities. Examples of typical impurities are minerals, carbohydrates, other proteins such as e.g. additional protein.

The one or more type A protein feed(s), the one or more Type B protein feed(s), and any further ingredients may therefore be combined in any order to provide the initial protein solution.

The initial protein solution is prepared by combining the protein feeds, preferably by mixing one or more type A protein feed(s) with the one or more Type B protein feed(s), and optionally with any further protein feeds or ingredients.

All protein feeds and any further ingredients are provided with appropriate chemical compositions and combined in amounts sufficient to provide an initial protein solution as described herein.

The inventors have found that the maximum BLG yield of the BLG crystallisation is obtained at approximately pH 5.5. It is therefore preferred that the initial protein solution has a pH that is closer to 5.5 than:

the pH of the Type A protein feed(s) if they were combined, or the pH of the Type B protein feed(s) if they were combined, or the pH of the Type A protein feed(s) if they were combined and the pH of the Type B protein feed(s) if they were combined.

It is often preferred to combine the protein feeds to provide an initial protein solution which is in the meta-stable region with respect to BLG supersaturation, i.e. in the supersaturated region where BLG crystals can grow when seeding is used but where crystallisation does not start spontaneously.

In some preferred embodiments of the present invention:

the type A protein feed(s) would, if combined, have a pH of at least 5.6, more preferably at least 5.7, even more preferably at least 5.8, and most preferably at least 5.9, and the type B protein feed(s) would, if combined, have a pH of at most 5.4, more preferably at most 5.3, even more preferably 5.2, and most preferably 5.1.

If only a single type A protein feed is used the phase "would, if combined," refers to the single single type A protein feed as such. Similarly, if only a single type B protein feed is used the phase "would, if combined," refers to the single type B protein feed as such.

Therefore the phrase "the type A protein feed(s) would, if mixed, have [a specific property]" means that if only a single type A protein feed is used it has [the specific property]

if two or more type A protein feeds are used they would, if mixed, have [specific property].

For example, by stating that the type A protein feed(s) would, if mixed, have a pH of at least 5.6, it is meant that:

if only a single type A protein feed is used it has a pH of at least 5.6 if two or more type A protein feeds are used they would, if mixed, have a pH of at least 5.6.

For example, in an embodiment wherein two type A protein feeds are used the phrase "would, if combined" means that the specific property would be obtained if the two type A protein feeds were mixed.

Thus, in some preferred embodiments of the present invention:

in relation to type A protein feed:

if only a single type A protein feed is used it has, or if two or more type A protein feeds are used they would, if mixed, have a pH of at least 5.6, more preferably at least 5.7, even more preferably at least 5.8, and most preferably at least 5.9, and in relation to type B protein feed:

if only a single type B protein feed is used it has, or if two or more type B protein feeds are used they would, if mixed, have a pH of at most 5.4, more preferably at most 5.3, even more preferably at most 5.2, and most preferably 5.1.

In other preferred embodiments of the present invention:

the type A protein feed(s) would, if combined, have a pH of at least 6.0, more preferably at least 6.1, even more preferably at least 6.2, and most preferably at least 6.3, and the type B protein feed(s) would, if combined, have a pH of at most 5.0, more preferably at most 4.9, even more preferably 4.8, and most preferably 4.7.

Thus, in other preferred embodiments of the present invention:

in relation to type A protein feed:

if only a single type A protein feed is used it has, or if two or more type A protein feeds are used they would, if mixed, have a pH of at least 6.0, more preferably at least 6.1, even more preferably at least 6.2, and most preferably at least 6.3, and in relation to type B protein feed:

if only a single type B protein feed is used it has, or if two or more type B protein feeds are used they would, if mixed, have a pH of at most 5.0, more preferably at most 4.9, even more preferably 4.8, and most preferably 4.7.

In some preferred embodiments of the present invention the type A protein feed(s) would, if combined, have a pH of in the range of 5.6-10, more preferably 5.8-8, even more preferably 6.0-7 and most preferably 6.1-6.5.

Thus, in some preferred embodiments of the present invention, in relation to type A protein feed:

if only a single type A protein feed is used it has, or if two or more type A protein feeds are used they would, if mixed, have a pH of in the range of 5.6-10, more preferably 5.8-8, even more preferably 6.0-7 and most preferably 6.1-6.5.

In other preferred embodiments of the present invention the type A protein feed(s) would, if combined, have a pH of in the range of 6.0-8, more preferably 6.1-7.5, even more preferably 6.2-7.0 and most preferably 6.2-6.5.

Thus, in other preferred embodiments of the present invention, in relation to type A protein feed:

if only a single type A protein feed is used it has, or if two or more type A protein feeds are used they would, if mixed, have a pH of in the range of 6.0-8, more preferably 6.1-7.5, even more preferably 6.2-7.0 and most preferably 6.2-6.5.

In some preferred embodiments of the present invention type B protein feed(s) would, if combined, have a pH of in the range of 2-5.4, more preferably 3-5.2, even more preferably 4-5.0, and most preferably 4.5-4.9.

Thus, in some preferred embodiments of the present invention, in relation to type B protein feed:

if only a single type B protein feed is used it has, or if two or more type B protein feeds are used they would, if mixed, have a pH of in the range of 2-5.4, more preferably 3-5.2, even more preferably 4-5.0, and most preferably 4.5-4.9.

In other preferred embodiments of the present invention the type B protein feed(s) would, if combined, have a pH of in the range of 4.0-5.0, more preferably 4.1-4.9, even more preferably 4.3-4.8, and most preferably 4.5-4.8.

Thus, in other preferred embodiments of the present invention, in relation to type B protein feed:

if only a single type B protein feed is used it has, or if two or more type B protein feeds are used they would, if mixed, have a pH of in the range of 4.0-5.0, more preferably 4.1-4.9, even more preferably 4.3-4.8, and most preferably 4.5-4.8.

In some preferred embodiments of the present invention at least one of the one or more type A protein feed(s) is not saturated with respect to BLG, more preferably none of the one or more type A protein feed(s) is not saturated with respect to BLG.

In other preferred embodiments of the present invention at least one of the one or more type B protein feed(s) is not saturated with respect to BLG, more preferably none of the one or more type B protein feed(s) is not saturated with respect to BLG.

In further preferred embodiments of the present invention none of the type A or type B protein feed(s) are saturated with respect to BLG.

In some preferred embodiments of the present invention at least one of the one or more type A protein feed(s) does not contain BLG crystals, more preferably none of the one or more type A protein feed(s) contain BLG crystals.

In other preferred embodiments of the present invention at least one of the one or more type B protein feed(s) do not contain BLG crystals, more preferably none of the one or more type B protein feed(s) contain BLG crystals.

It should be noted that even though a feed does not contain BLG crystals it may still be saturated or even supersaturated with respect to BLG.

In further preferred embodiments of the present invention none of the type A or type B protein feed(s) contain BLG crystals.

In other preferred embodiments of the present invention none of the type A or type B protein feed(s) contain BLG crystals.

In some preferred embodiments of the present invention at least one of the one or more type A protein feed(s) is not supersaturated with respect to BLG, more preferably none of the one or more type A protein feed(s) are supersaturated with respect to BLG.

In other preferred embodiments of the present invention at least one of the one or more type B protein feed(s) is not supersaturated with respect to BLG, and more preferably none of the one or more type B protein feed(s) are supersaturated with respect to BLG.

In some preferred embodiments of the present invention at least one of the one or more type A protein feed(s) of step a) are saturated with respect to BLG.

In some preferred embodiments of the present invention at least one of the one or more type B protein feed(s) of step a) are saturated with respect to BLG.

In some preferred embodiments of the present invention at least one of the one or more type A protein feed(s) is supersaturated with respect to BLG but in the meta-stable zone wherein spontaneous crystallization does not occur.

In other preferred embodiments of the present invention at least one of the one or more type B protein feed(s) is supersaturated with respect to BLG but in the meta-stable zone wherein spontaneous crystallization does not occur.

In some preferred embodiments of the present invention type A and type B protein feed(s) that do not contain BLG crystals contribute with at least 1% w/w of the BLG content of the initial protein solution, more preferably at least 10% w/w, even more preferably at least 20% w/w, and most preferably at least 40% w/w.

Preferably, type A and type B protein feed(s) that does not contain BLG crystals contribute with at least 50% w/w of the BLG content of the initial protein solution, more preferably at least 70% w/w, even more preferably at least 80% w/w, and most preferably at least 90% w/w.

In other preferred embodiments of the present invention type A and type B protein feed(s) that do not contain BLG crystals contribute with at least 92% w/w of the BLG content of the initial protein solution, more preferably at least 94% w/w, even more preferably at least 96% w/w, and most preferably at least 99% w/w.

For example, it may be preferred that type A and type B protein feed(s) that do not contain BLG crystals contribute with 100% w/w of the BLG content of the initial protein solution. This is for example typically the situation if seed material is added after the preparation of the initial protein solution.

The inventors have found that it often is desirable that at least some of the protein feeds are not supersaturated with respect to BLG as this significantly reduces the risk of uncontrolled crystallation during production.

Thus, in some preferred embodiments of the present invention type A and type B protein feeds that are not supersaturated with respect to BLG contribute with at least 1% w/w of the BLG content of the initial protein solution, more preferably at least 10% w/w, even more preferably at least 20% w/w, and most preferably at least 40% w/w.

Preferably, type A and type B protein feeds that are not supersaturated with respect to BLG contribute with at least 50% w/w of the BLG content of the initial protein solution, more preferably at least 70% w/w, even more preferably at least 80% w/w, and most preferably at least 90% w/w.

In further preferred embodiments of the present invention type A and type B protein feeds that are not supersaturated with respect to BLG contribute with at least 92% w/w of the BLG content of the initial protein solution, more preferably at least 94% w/w, even more preferably at least 96% w/w, and most preferably at least 99% w/w.

It is often preferred that type A and type B protein feed(s) that are not supersaturated with respect to BLG contribute with approximately 100% w/w of the BLG content of the initial protein solution.

It is preferred to prepare, store and use the type A and type B protein feeds at temperatures that avoid protein denaturation and/or degradation.

In some preferred embodiments of the present invention the type A protein feed(s) would, if combined, have a temperature of at most 60 degrees C., more preferably at most 50 degrees C., even more preferably at most 40 degrees C. and most preferably at most 30 degrees C.

Thus, in some preferred embodiments of the present invention:

in relation to type A protein feed:
        if only a single type A protein feed is used it has, or
        if two or more type A protein feeds are used they would, if mixed, have
a temperature of at most 60 degrees C., more preferably at most 50 degrees C., even more preferably at most 40 degrees C. and most preferably at most 30 degrees C.

In other preferred embodiments of the present invention the type A protein feed(s) would, if combined, have a temperature of at most 20 degrees C., more preferably at most 15 degrees C., even more preferably at most 10 degrees C. and most preferably at most 5 degrees C.

Thus, in other preferred embodiments of the present invention:

in relation to type A protein feed:
        if only a single type A protein feed is used it has, or
        if two or more type A protein feeds are used they would, if mixed, have
a temperature of at most 20 degrees C., more preferably at most 15 degrees C., even more preferably at most 10 degrees C. and most preferably at most 5 degrees C.

In some preferred embodiments of the present invention the type B protein feed(s) would, if combined, have a temperature of at most 60 degrees C., more preferably at most 50 degrees C., even more preferably at most 40 degrees C. and most preferably at most 30 degrees C.

Thus, in some preferred embodiments of the present invention:

in relation to type B protein feed:
        if only a single type B protein feed is used it has, or
        if two or more type B protein feeds are used they would, if mixed, have
a temperature of at most 60 degrees C., more preferably at most 50 degrees C., even more preferably at most 40 degrees C. and most preferably at most 30 degrees C.

In other preferred embodiments of the present invention the type B protein feed(s) would, if combined, have a temperature of at most 20 degrees C., more preferably at most 15 degrees C., even more preferably at most 10 degrees C. and most preferably at most 5 degrees C.

Thus, in other preferred embodiments of the present invention, in relation to type B protein feed:

if only a single type B protein feed is used it has, or
    if two or more type B protein feeds are used they would, if mixed, have
    a temperature of at most 20 degrees C., more preferably at most 15 degrees C., even more preferably at most 10 degrees C. and most preferably at most 5 degrees C.

The inventors have found that initial protein solutions prepared from protein feeds having a low conductivity typically provide a higher yield of BLG crystallisation.

In some preferred embodiments of the present invention the type A protein feed(s) would, if mixed, have a conductivity of at most 10 mS/cm, more preferably at most 7 mS/cm, even more preferably at most 5 mS/cm, and most preferably at most 4 mS/cm.

Thus, in some preferred embodiments of the present invention:

in relation to type A protein feed:
        if only a single type A protein feed is used it has, or
        if two or more type A protein feeds are used they would, if mixed, have
a conductivity of at most 10 mS/cm, more preferably at most 7 mS/cm, even more preferably at most 5 mS/cm, and most preferably at most 4 mS/cm.

In other preferred embodiments of the present invention the type A protein feed(s) would, if mixed, have a conductivity of at most 3 mS/cm, more preferably at most 2 mS/cm, even more preferably at most 1 mS/cm, and most preferably at most 0.5 mS/cm.

Thus, in other preferred embodiments of the present invention, in relation to type A protein feed:

if only a single type A protein feed is used it has, or
    if two or more type A protein feeds are used they would, if mixed, have
a conductivity of at most 3 mS/cm, more preferably at most 2 mS/cm, even more preferably at most 1 mS/cm, and most preferably at most 0.5 mS/cm.

In some preferred embodiments of the present invention the type B protein feed(s) would, if mixed, have a conductivity of at most 10 mS/cm, more preferably at most 7 mS/cm, even more preferably at most 5 mS/cm, and most preferably at most 4 mS/cm.

Thus, in some preferred embodiments of the present invention, in relation to type B protein feed:

if only a single type B protein feed is used it has, or
    if two or more type B protein feeds are used they would, if mixed, have
a conductivity of at most 10 mS/cm, more preferably at most 7 mS/cm, even more preferably at most 5 mS/cm, and most preferably at most 4 mS/cm.

In other preferred embodiments of the present invention the type B protein feed(s) would, if mixed, have a conductivity of at most 3 mS/cm, more preferably at most 2 mS/cm, even more preferably at most 1 mS/cm, and most preferably at most 0.5 mS/cm.

Thus, in other preferred embodiments of the present invention, in relation to type B protein feed:

if only a single type B protein feed is used it has, or
    if two or more type B protein feeds are used they would, if mixed, have
a conductivity of at most 3 mS/cm, more preferably at most 2 mS/cm, even more preferably at most 1 mS/cm, and most preferably at most 0.5 mS/cm.

The inventors have furthermore observed that a BLG crystallisation yield is obtained if the ratio between the conductivity (expressed in mS/cm) and the total amount of protein (expressed in % wt. total protein relative to the total weight of the feed(s)) of the type A protein feed(s) and type B protein feed(s) is kept at or below a certain threshold.

In some preferred embodiments of the present invention the type A protein feed(s) would, if mixed, have a ratio between the conductivity and the total amount of protein of at most 0.3, more preferably at most 0.25, more preferably at most 0.20, more preferably at most 0.18, even more preferably at most 0.12, and most preferably at most 0.10.

Thus, in some preferred embodiments of the present invention:

in relation to type A protein feed:
if only a single type A protein feed is used it has, or
if two or more type A protein feeds are used they would, if mixed, have
a ratio between the conductivity and the total amount of protein of at most 0.3, more preferably at most 0.25, more preferably at most 0.20, more preferably at most 0.18, even more preferably at most 0.12, and most preferably at most 0.10.

In some preferred embodiments of the present invention the type B protein feed(s) would, if mixed, have a ratio between the conductivity and the total amount of protein of at most 0.3, more preferably at most 0.25, more preferably at most 0.20, more preferably at most 0.18, even more preferably at most 0.12, and most preferably at most 0.10.

Thus, in some preferred embodiments of the present invention, in relation to type B protein feed:

if only a single type B protein feed is used it has, or
if two or more type B protein feeds are used they would, if mixed, have
a ratio between the conductivity and the total amount of protein of at most 0.3, more preferably at most 0.25, more preferably at most 0.20, more preferably at most 0.18, even more preferably at most 0.12, and most preferably at most 0.10.

In some preferred embodiments of the present invention the type A protein feed(s) would, if combined, comprises at least 1% w/w BLG relative to the weight of the combination of type A protein feed(s), more preferably at least 3% w/w, even more preferably at least 5% w/w, and most preferably at least 7% w/w BLG relative to the weight of the combination of type A protein feed(s).

Thus, in some preferred embodiments of the present invention, in relation to type A protein feed:

if only a single type A protein feed is used it comprises, or
if two or more type A protein feeds are used they would, if mixed, comprise
at least 1% w/w BLG relative to the total weight of type A protein feed, more preferably at least 3% w/w, even more preferably at least 5% w/w, and most preferably at least 7% w/w BLG relative to the total weight of type A protein feed.

In other preferred embodiments of the present invention the type A protein feed(s) would, if combined, comprise 1-45% w/w BLG relative to the weight of the combination of type A protein feed(s), more preferably 3-40% w/w, even more preferably 5-36% w/w, and most preferably 7-34% w/w BLG relative to the weight of the combination of type A protein feed(s).

Thus, in other preferred embodiments of the present invention, in relation to type A protein feed:

if only a single type A protein feed is used it comprises, or if two or more type A protein feeds are used they would, if mixed, comprise
1-45% w/w BLG relative to the total weight of type A protein feed, more preferably 3-40% w/w, even more preferably 5-36% w/w, and most preferably 7-34% w/w BLG relative to the total weight of type A protein feed.

In further preferred embodiments of the present invention the type A protein feed(s) would, if combined, comprise 6-32% w/w BLG relative to the weight of the combination of type A protein feed(s), more preferably 8-30% w/w, even more preferably 10-28% w/w, and most preferably 12-26% w/w BLG relative to the weight of the combination of type A protein feed(s).

Thus, in further preferred embodiments of the present invention, in relation to type A protein feed:

if only a single type A protein feed is used it comprises, or
if two or more type A protein feeds are used they would, if mixed, comprise
6-32% w/w BLG relative to the total weight of type A protein feed, more preferably 8-30% w/w, even more preferably 10-28% w/w, and most preferably 12-26% w/w BLG relative to the total weight of type A protein feed.

In some preferred embodiments of the present invention the type B protein feed(s) would, if combined, comprise at least 1% w/w BLG relative to the weight of the combination of type B protein feed(s), more preferably at least 3% w/w, even more preferably at least 5% w/w, and most preferably at least 7% w/w BLG relative to the weight of the combination of type B protein feed(s).

Thus, in some preferred embodiments of the present invention, in relation to type B protein feed:

if only a single type B protein feed is used it comprises, or
if two or more type B protein feeds are used they would, if mixed, comprise
at least 1% w/w BLG relative to the total weight of type B protein feed, more preferably at least 3% w/w, even more preferably at least 5% w/w, and most preferably at least 7% w/w BLG relative to the total weight of type B protein feed.

In other preferred embodiments of the present invention the type B protein feed(s) would, if combined, comprise 1-45% w/w BLG relative to the weight of the combination of type B protein feed(s), more preferably 3-40% w/w, even more preferably 5-36% w/w, and most preferably 7-34% w/w BLG relative to the weight of the combination of type B protein feed(s).

Thus, in other preferred embodiments of the present invention, in relation to type B protein feed:

if only a single type B protein feed is used it comprises, or
if two or more type B protein feeds are used they would, if mixed, comprise
1-45% w/w BLG relative to the total weight of type B protein feed, more preferably 3-40% w/w, even more preferably 5-36% w/w, and most preferably 7-34% w/w BLG relative to the total weight of type B protein feed.

In further preferred embodiments of the present invention the type B protein feed(s) would, if combined, comprise 6-32% w/w BLG relative to the weight of the combination of type B protein feed(s), more preferably 8-30% w/w, even more preferably 10-28% w/w, and most preferably 12-26% w/w BLG relative to the weight of the combination of type B protein feed(s).

Thus, in further preferred embodiments of the present invention, in relation to type B protein feed:

if only a single type B protein feed is used it comprises, or if two or more type B protein feeds are used they would, if mixed, comprise 6-32% w/w BLG relative to the total weight of type B protein feed, more preferably 8-30% w/w, even more preferably 10-28% w/w, and most preferably 12-26% w/w BLG relative to the total weight of type B protein feed.

In some preferred embodiments of the present invention the type A protein feed(s) would, if mixed, comprise BLG in an amount of at least 30% w/w relative to the total amount of protein, more preferably at least 40% w/w, even more preferred at least 50% w/w and most preferred at least 55% w/w.

Thus, in some preferred embodiments of the present invention, in relation to type A protein feed:

if only a single type A protein feed is used it comprises, or if two or more type A protein feeds are used they would, if mixed, comprise BLG in an amount of at least 30% w/w relative to the total amount of protein, more preferably at least 40% w/w, even more preferred at least 50% w/w, and most preferred at least 55% w/w.

In some preferred embodiments of the present invention the type B protein feed(s) would, if mixed, comprise BLG in an amount of at least 30% w/w relative to the total amount of protein, more preferably at least 40% w/w, even more preferred at least 50% w/w and most preferred at least 55% w/w.

Thus, in some preferred embodiments of the present invention, in relation to type B protein feed:

if only a single type B protein feed is used it comprises, or if two or more type B protein feeds are used they would, if mixed, comprise BLG in an amount of at least 30% w/w relative to the total amount of protein, more preferably at least 40% w/w, even more preferred at least 50% w/w, and most preferred at least 55% w/w.

In some preferred embodiments of the present invention the type A protein feed(s) would, if combined, comprise non-BLG solids in an amount of at least 1% w/w relative to total solids, more preferably at least 2% w/w, even more preferred at least 5% w/w and most preferred at least 10% w/w.

Thus, in some preferred embodiments of the present invention, in relation to type A protein feed:

if only a single type A protein feed is used it comprises, or if two or more type A protein feeds are used they would, if mixed, comprise non-BLG solids in an amount of at least 1% w/w relative to total solids, more preferably at least 2% w/w, even more preferred at least 5% w/w, and most preferred at least 10% w/w.

In other preferred embodiments of the present invention the type A protein feed(s) would, if mixed, comprise non-BLG solids in an amount of at least 15% w/w relative to total solids, more preferably at least 20% w/w, even more preferred at least 30% w/w and most preferred at least 40% w/w.

Thus, in other preferred embodiments of the present invention, in relation to type A protein feed:

if only a single type A protein feed is used it comprises, or if two or more type A protein feeds are used they would, if mixed, comprise non-BLG solids in an amount of at least 15% w/w relative to total solids, more preferably at least 20% w/w, even more preferred at least 30% w/w and most preferred at least 40% w/w.

In some preferred embodiments of the present invention the type A protein feed(s) would, if combined, comprise non-BLG solids in an amount of 0-70% w/w relative to total solids, more preferably 1-60% w/w, even more preferred 2-50% w/w and most preferred 3-40% w/w.

Thus, in some preferred embodiments of the present invention, in relation to type A protein feed:

if only a single type A protein feed is used it comprises, or if two or more type A protein feeds are used they would, if mixed, comprise non-BLG solids in an amount of 0-70% w/w relative to total solids, more preferably 1-60% w/w, even more preferred 2-50% w/w and most preferred 3-40% w/w.

In some preferred embodiments of the present invention the type A protein feed(s) would, if mixed, comprise non-BLG solids in an amount of 0-70% w/w relative to total solids, more preferably 0-60% w/w, even more preferred 0-50% w/w and most preferred 0-40% w/w.

Thus, in some preferred embodiments of the present invention, in relation to type A protein feed:

if only a single type A protein feed is used it comprises, or if two or more type A protein feeds are used they would, if mixed, comprise non-BLG solids in an amount of 0-70% w/w relative to total solids, more preferably 1-60% w/w, even more preferred 2-50% w/w and most preferred 3-40% w/w.

In other preferred embodiments of the present invention the type A protein feed(s) would, if combined, comprise non-BLG solids in an amount of 0-20% w/w relative to total solids, more preferably 0-15% w/w, even more preferred 0-10% w/w and most preferred 0-5% w/w.

Thus, in other preferred embodiments of the present invention, in relation to type A protein feed:

if only a single type A protein feed is used it comprises, or if two or more type A protein feeds are used they would, if mixed, comprise non-BLG solids in an amount of 0-20% w/w relative to total solids, more preferably 0-15% w/w, even more preferred 0-10% w/w and most preferred 0-5% w/w.

In further preferred embodiments of the present invention the type A protein feed(s) would, if combined, comprise non-BLG solids in an amount of 15-70% w/w relative to total solids, more preferably 20-65% w/w, even more preferred 25-60% w/w and most preferred 30-50% w/w.

Thus, in further preferred embodiments of the present invention, in relation to type A protein feed:

if only a single type A protein feed is used it comprises, or if two or more type A protein feeds are used they would, if mixed, comprise non-BLG solids in an amount of 15-70% w/w relative to total solids, more preferably 20-65% w/w, even more preferred 25-60% w/w and most preferred 30-50% w/w.

In some preferred embodiments of the present invention the type B protein feed(s) would, if combined, comprise non-BLG solids in an amount of at least 1% w/w relative to total solids, more preferably at least 2% w/w, even more preferred at least 5% w/w and most preferred at least 10% w/w.

Thus, in some preferred embodiments of the present invention, in relation to type B protein feed:

if only a single type B protein feed is used it comprises, or if two or more type B protein feeds are used they would, if mixed, comprise non-BLG solids in an amount of at least 1% w/w relative to total solids, more preferably at least 2% w/w, even more preferred at least 5% w/w, and most preferred at least 10% w/w.

In other preferred embodiments of the present invention the type B protein feed(s) would, if combined, comprise non-BLG solids in an amount of at least 15% w/w relative to total solids, more preferably at least 20% w/w, even more preferred at least 30% w/w and most preferred at least 40% w/w.

Thus, in other preferred embodiments of the present invention, in relation to type B protein feed:

if only a single type B protein feed is used it comprises, or if two or more type B protein feeds are used they would, if mixed, comprise non-BLG solids in an amount of at least 15% w/w relative to total solids, more preferably at least 20% w/w, even more preferred at least 30% w/w and most preferred at least 40% w/w.

In some preferred embodiments of the present invention the type B protein feed(s) would, if combined, comprise non-BLG solids in an amount of 0-70% w/w relative to total solids, more preferably 1-60% w/w, even more preferred 2-50% w/w and most preferred 3-40% w/w.

Thus, in some preferred embodiments of the present invention, in relation to type B protein feed:

if only a single type B protein feed is used it comprises, or if two or more type B protein feeds are used they would, if mixed, comprise non-BLG solids in an amount of 0-70% w/w relative to total solids, more preferably 1-60% w/w, even more preferred 2-50% w/w and most preferred 3-40% w/w.

In other preferred embodiments of the present invention the type B protein feed(s) would, if combined, comprise non-BLG solids in an amount of 0-20% w/w relative to total solids, more preferably 0-15% w/w, even more preferred 0-10% w/w and most preferred 0-5% w/w.

Thus, in other preferred embodiments of the present invention, in relation to type B protein feed:

if only a single type B protein feed is used it comprises, or if two or more type B protein feeds are used they would, if mixed, comprise non-BLG solids in an amount of 0-20% w/w relative to total solids, more preferably 0-15% w/w, even more preferred 0-10% w/w and most preferred 0-5% w/w.

In further preferred embodiments of the present invention the type B protein feed(s) would, if combined, comprise non-BLG solids in an amount of 15-70% w/w relative to total solids, more preferably 20-65% w/w, even more preferred 25-60% w/w and most preferred 30-50% w/w.

Thus, in further preferred embodiments of the present invention, in relation to type B protein feed:

if only a single type B protein feed is used it comprises, or if two or more type B protein feeds are used they would, if mixed, comprise non-BLG solids in an amount of 15-70% w/w relative to total solids, more preferably 20-65% w/w, even more preferred 25-60% w/w and most preferred 30-50% w/w.

In some embodiments of the invention the protein feeds have low content of denatured protein.

Preferably, the protein feeds would, if combined, have a degree of protein denaturation of at most 20%, more preferably at most 10%, even more preferably at most 5%, and most preferably at most 2%.

In some preferred embodiments of the present invention the initial protein solution comprises a total amount of type A protein feed in the range of 1-99% w/w relative to the weight of the initial protein solution, more preferably 10-80% w/w, even more preferably 20-70% w/w, and most preferably 30-60% w/w.

In other preferred embodiments of the present invention the initial protein solution comprises a total amount of type A protein feed in the range of 5-95% w/w relative to the weight of the initial protein solution, more preferably 15-80% w/w, even more preferably 20-75% w/w, and most preferably 35-70% w/w.

In some preferred embodiments of the present invention the initial protein solution comprises a total amount of type B protein feed(s) in the range of 1-99% w/w relative to the weight of the initial protein solution, more preferably 10-80% w/w, even more preferably 20-70% w/w, and most preferably 30-60% w/w.

In other preferred embodiments of the present invention the initial protein solution comprises a total amount of type B protein feed in the range of 5-95% w/w relative to the weight of the initial protein solution, more preferably 15-80% w/w, even more preferably 20-75% w/w, and most preferably 35-70% w/w.

In some preferred embodiments of the present invention the initial protein solution comprises:

a total amount of type A protein feed(s) in the range of 5-90% w/w relative to the weight of the initial protein solution, more preferably 10-80% w/w, even more preferably 20-70% w/w, and most preferably 30-60% w/w, and a total amount of type B protein feed(s) in the range of 5-90% w/w relative to the weight of the initial protein solution, more preferably 10-80% w/w, even more preferably 20-70% w/w, and most preferably 30-60% w/w.

In other preferred embodiments of the present invention the initial protein solution comprises:

a total amount of type A protein feed(s) having a pH of 5.8-9 in the range of 5-90% w/w relative to the weight of the initial protein solution, more preferably 10-80% w/w, even more preferably 20-70% w/w, and most preferably 30-60% w/w, and a total amount of type B protein feed(s) having a pH of 2.5-5.2 in the range of 5-90% w/w relative to the weight of the initial protein solution, more preferably 10-80% w/w, even more preferably 20-70% w/w, and most preferably 30-60% w/w.

In further preferred embodiments of the present invention the initial protein solution comprises:

a total amount of type A protein feed(s) having a pH of 6.0-8 in the range of 5-90% w/w relative to the weight of the initial protein solution, more preferably 10-80% w/w, even more preferably 20-70% w/w, and most preferably 30-60% w/w, and a total amount of type B protein feed(s) having a pH of 3-5.0 in the range of 5-90% w/w relative to the weight of the initial protein solution, more preferably 10-80% w/w, even more preferably 20-70% w/w, and most preferably 30-60% w/w.

In even further preferred embodiments of the present invention the initial protein solution comprises:

a total amount of type A protein feed(s) having a pH of 6.1-8 in the range of 5-90% w/w relative to the weight of the initial protein solution, more preferably 10-80% w/w, even more preferably 20-70% w/w, and most preferably 30-60% w/w, and a total amount of type B protein feed(s) having a pH of 3-4.9 of 5-90% w/w relative to the weight of the initial protein solution, more preferably 10-80% w/w, even more preferably 20-70% w/w, and most preferably 30-60% w/w.

In some preferred embodiments of the present invention all protein feeds are in liquid form.

In other preferred embodiments of the present invention at least one of the protein feeds is in dry form.

In further preferred embodiments of the present invention at least one of the protein feeds is in dry form, and preferably in powder form and at least one of the protein feeds is in liquid form.

The protein feeds are preferably prepared from a WPC, a WPI, a SPC, a SPI, or a combination thereof.

The embodiments relating to the chemical composition of the initial protein solution equally apply to the Type A protein feed(s) and the type B protein feed(s), however typically at least one parameter of the protein feeds is set to avoid supersaturation or at least spontaneous crystallisation.

It is often preferred that the degree of supersaturation of BLG of the initial protein solution is higher than the degree of supersaturation of:

the type A protein feed if only a single type A protein feed is used, or the type A protein feeds, if combined, if two or more type A protein feeds are used.

Additionally, it is often preferred that the degree of supersaturation of BLG of the initial protein solution is higher than the degree of supersaturation of:

the type B protein feed if only a single type B protein feed is used, or the type B protein feeds, if combined, if two or more type B protein feeds are used.

It is particularly preferred that the degree of supersaturation of BLG of the initial protein solution is higher than both the degree of supersaturation of:

the type A protein feed if only a single type A protein feed is used, or the type A protein feeds, if combined, if two or more type A protein feeds are used, and of:

the type B protein feed if only a single type B protein feed is used, or the type B protein feeds, if combined, if two or more type B protein feeds are used.

The degree of supersaturation of a liquid is determined by seeding a sample of the liquid with BLG crystals and quantifying the amount of additional BLG crystals mass that is generated in the sample when keeping the sample the same conditions (e.g. temperature, pressure and humidity) for 24 hours. Quantification of BLG crystal mass is done by centrifugation at 15000 g for 5 minutes at the temperature of the liquid and subsequently quantifying the content of BLG in the obtained pellet using the Analysis 9.9 of WO 2018/

115520A1. The degree of supersaturation is the percentage of BLG of the liquid sample that is capable of being isolated in the pellet.

In some preferred embodiments of the present invention, in relation to type A protein feed, if only a single type A protein feed is used it has, or if two or more type A protein feeds are used they would, if mixed, have:

a content of BLG of 4-32% w/w relative to the total weight of type A protein feed, more preferably 6-32% w/w, more preferably 8-30% w/w, even more preferably 10-28% w/w, and most preferably 12-26% w/w BLG relative to the total weight of type A protein feed, a pH of in the range of 5.6-10, more preferably 5.8-8, even more preferably 6.0-7 and most preferably 6.1-6.5, preferably, a temperature of at most 20 degrees C., more preferably at most 15 degrees C., even more preferably at most 10 degrees C. and most preferably at most 5 degrees C., preferably, a content of BLG in an amount of at least 30% w/w relative to the total amount of protein, more preferably at least 40% w/w, even more preferred at least 50% w/w, and most preferred at least 55% w/w, one or more of:

a conductivity of at most 7 mS/cm, even more preferably at most 5 mS/cm, and most preferably at most 3 mS/cm, and a ratio between the conductivity and the total amount of protein of at most 0.3, more preferably at most 0.25, most preferably at most 0.20.

In some preferred embodiments of the present invention, in relation to type B protein feed, if only a single type B protein feed is used it has, or if two or more type B protein feeds are used they would, if mixed, have:

a content of BLG of 4-32% w/w relative to the total weight of type B protein feed, more preferably 6-32% w/w, more preferably 8-30% w/w, even more preferably 10-28% w/w, and most preferably 12-26% w/w BLG relative to the total weight of type B protein feed, a pH of in the range of 2-5.4, more preferably 3-5.2, even more preferably 4-5.0, most preferably 4.5-4.9, preferably, a temperature of at most 20 degrees C., more preferably at most 15 degrees C., even more preferably at most 10 degrees C. and most preferably at most 5 degrees C., preferably, a content of BLG in an amount of at least 30% w/w relative to the total amount of protein, more preferably at least 40% w/w, even more preferred at least 50% w/w, and most preferred at least 55% w/w, one or more of:

a conductivity of at most 7 mS/cm, even more preferably at most 5 mS/cm, and most preferably at most 3 mS/cm, and a ratio between the conductivity and the total amount of protein of at most 0.3, more preferably at most 0.25, most preferably at most 0.20.

In particularly preferred embodiments of the invention, in relation to type A protein feed, if only a single type A protein feed is used it has, or if two or more type A protein feeds are used they would, if mixed, have:

a content of BLG of 4-32% w/w relative to the total weight of type A protein feed, more preferably 6-32% w/w, more preferably 8-30% w/w, even more preferably 10-28% w/w, and most preferably 12-26% w/w BLG relative to the total weight of type A protein feed, a pH of in the range of 5.6-10, more preferably 5.8-8, even more preferably 6.0-7 and most preferably 6.1-6.5, preferably, a temperature of at most 20 degrees C., more preferably at most 15 degrees C., even more preferably at most 10 degrees C. and most preferably at most 5 degrees C., preferably, a content of BLG in an amount of at least 30% w/w relative to the total amount of protein, more preferably at least 40% w/w, even more preferred at least 50% w/w, and most preferred at least 55% w/w, one or more of:

a conductivity of at most 7 mS/cm, even more preferably at most 5 mS/cm, and most preferably at most 3 mS/cm, and a ratio between the conductivity and the total amount of protein of at most 0.3, more preferably at most 0.25, most preferably at most 0.20.

and in relation to type B protein feed, if only a single type B protein feed is used it has, or if two or more type B protein feeds are used they would, if mixed, have:

a content of BLG of 4-32% w/w relative to the total weight of type B protein feed, more preferably 6-32% w/w, more preferably 8-30% w/w, even more preferably 10-28% w/w, and most preferably 12-26% w/w BLG relative to the total weight of type B protein feed, a pH of in the range of 2-5.4, more preferably 3-5.2, even more preferably 4-5.0, most preferably 4.5-4.9, preferably, a temperature of at most 20 degrees C., more preferably at most 15 degrees C., even more preferably at most 10 degrees C. and most preferably at most 5 degrees C., preferably, a content of BLG in an amount of at least 30% w/w relative to the total amount of protein, more preferably at least 40% w/w, even more preferred at least 50% w/w, and most preferred at least 55% w/w, one or more of:

a conductivity of at most 7 mS/cm, more preferably at most 5 mS/cm, and most preferably at most 3 mS/cm, and a ratio between the conductivity and the total amount of protein of at most 0.3, more preferably at most 0.25, most preferably at most 0.20.

In some preferred embodiments of the present invention, in relation to type B protein feed, if only a single type B protein feed is used it has, or if two or more type B protein feeds are used they would, if mixed, have:

a content of BLG of 4-32% w/w relative to the total weight of type B protein feed, more preferably 6-32% w/w, more preferably 8-30% w/w, even more preferably 10-28% w/w, and most preferably 12-26% w/w BLG relative to the total weight of type B protein feed, a pH of in the range of 2-5.4, more preferably 3-5.2, even more preferably 4-5.0, most preferably 4.5-4.9, preferably, a temperature of at most 20 degrees C., more preferably at most 15 degrees C., even more preferably at most 10 degrees C. and most preferably at most 5 degrees C., preferably, a content of non-BLG solids in an amount of 0-70% w/w relative to total solids, more preferably 0-60% w/w, even more preferred 0-50% w/w and most preferred 0-40% w/w, one or more of:

a conductivity of at most 7 mS/cm, even more preferably at most 5 mS/cm, and most preferably at most 3 mS/cm, and a ratio between the conductivity and the total amount of protein of at most 0.3, more preferably at most 0.25, most preferably at most 0.20.

In particularly preferred embodiments of the invention, in relation to type A protein feed, if only a single type A protein feed is used it has, or if two or more type A protein feeds are used they would, if mixed, have:

a content of BLG of 4-32% w/w relative to the total weight of type A protein feed, more preferably 6-32% w/w, more preferably 8-30% w/w, even more preferably 10-28% w/w, and most preferably 12-26% w/w BLG relative to the total weight of type A protein feed, a pH of in the range of 5.6-10, more preferably 5.8-8, even more preferably 6.0-7 and most preferably 6.1-6.5, preferably, a temperature of at most 20 degrees C., more preferably at most 15 degrees C., even more preferably at most 10 degrees C. and most preferably at most 5 degrees C., preferably, a content of non-BLG solids in an amount of 0-70% w/w relative to total solids, more preferably 0-60% w/w, even more preferred 0-50% w/w and most preferred 0-40% w/w, one or more of:

a conductivity of at most 7 mS/cm, even more preferably at most 5 mS/cm, and most preferably at most 3 mS/cm, and a ratio between the conductivity and the total amount of protein of at most 0.3, more preferably at most 0.25, most preferably at most 0.20.

and in relation to type B protein feed, if only a single type B protein feed is used it has, or if two or more type B protein feeds are used they would, if mixed, have:

a content of BLG of 4-32% w/w relative to the total weight of type B protein feed, more preferably 6-32% w/w, more preferably 8-30% w/w, even more preferably 10-28% w/w, and most preferably 12-26% w/w BLG relative to the total weight of type B protein feed, a pH of in the range of 2-5.4, more preferably 3-5.2, even more preferably 4-5.0, most preferably 4.5-4.9, preferably, a temperature of at most 20 degrees C., more preferably at most 15 degrees C., even more preferably at most 10 degrees C. and most preferably at most 5 degrees C., preferably, a content of non-BLG solids in an amount of 0-70% w/w relative to total solids, more preferably 0-60% w/w, even more preferred 0-50% w/w and most preferred 0-40% w/w, one or more of:

a conductivity of at most 7 mS/cm, more preferably at most 5 mS/cm, and most preferably at most 3 mS/cm, and a ratio between the conductivity and the total amount of protein of at most 0.3, more preferably at most 0.25, most preferably at most 0.20.

In some preferred embodiments of the invention the protein feeds are prepared by one or more of the following process steps:

Adjusting the pH,

Reducing the conductivity

Reducing the temperature

Increasing the protein concentration

Adding an agent that reduces the water activity

Modifying the ion composition

The present inventors have found that pressure-driven membrane filtration is well-suited for preparing liquid protein feeds.

In some preferred embodiments of the present invention the at least one of the protein feeds are prepared by a process that involves pressure-driven membrane filtration of a protein source, preferably a whey protein source. Preferred pressure-driven membrane filtration comprises filtration by ultrafiltration, microfiltration, nanofiltration and reverse osmosis. Ultrafiltration has been found to be particularly preferred for preparing the protein feeds and may be used as the only type of pressure-driven membrane filtration during the preparation of the protein feeds or may be used in combination with the other filtration methods.

The preparation of the protein feeds often involve pH adjustments to provide protein feeds with the desired pH. Preferably the pH is adjusted to a pH in the range of 6.0-7.0 when preparing type A protein feeds and to a pH in the range of 4.0-5.0 when preparing type B protein feeds. The pH is preferably adjusted using food acceptable acids and/or bases. Food acceptable acids are particularly preferred, such as e.g. carboxylic acids. Useful examples of such acids are e.g. hydrochloric acid, sulfuric acid, phosphoric acid, acetic acid, maleic acid, tartaric acid, lactic acid, citric acid, or gluconic acid, and/or mixtures thereof.

In some preferred embodiments of the invention the pH is adjusted using a lactone, such as e.g. D-glucono-delta-lactone, which slowly hydrolyses and at the same time reduces the pH of the aqueous liquid containing it. The target pH after the hydrolysis of the lactone has ended can be calculated precisely.

Useful examples of food acceptable bases are e.g. hydroxide sources such as e.g. sodium hydroxide, potassium hydroxide, calcium hydroxide, salts of food acids such as e.g. tri-sodium citrate, and/or combinations thereof.

In other preferred embodiments of the invention the pH is adjusted by addition of cation exchange material on its $H^+$ form. Bead-type/large particle type cation exchange material is easily removed from the initial protein solution prior to the crystallisation or even after the crystallisation. Adjustment of pH by addition of cation exchange material on its $H^+$ form is particularly advantageous in the present invention as it reduced the pH without adding negative counter ions that significantly affects the conductivity of the protein feed.

In some preferred embodiments of the invention the preparation of the initial protein solution involves reducing the conductivity of the protein feed.

Conductivity values mentioned herein have been normalised to 25 degrees C. unless it is specified otherwise.

The inventors have found that reducing the conductivity of the initial protein solution leads to a higher yield of BLG crystals. The minimum obtainable conductivity of the initial protein solution depends on the composition of the protein fraction and the lipid fraction (if any). Some protein species such as e.g. caseinomacropeptide (CMP) contribute more to the conductivity than other protein species. It is therefore preferable that the conductivity of the protein feed is brought near the level where protein and the counter ions of the protein are the main contributors to the conductivity. The reduction of conductivity often involves removal of at least some of the small, free ions that are present in liquid phase and not tightly bound to the proteins.

It is often preferred that the protein feeds have a conductivity of at most 10 mS/cm. In some preferred embodiments of the invention, the protein feeds have a conductivity of at most 5 mS/cm. Preferably, the protein feeds have a conductivity of at most 4 mS/cm.

Lower conductivities are even more preferred and give rise to higher yields of BLG crystals. Thus, the protein feeds preferably have a conductivity of at most 3 mS/cm. In some preferred embodiments of the invention, the protein feeds have a conductivity of at most 1 mS/cm. Preferably, the protein feeds have a conductivity of at most 0.5 mS/cm.

The low conductivity of the protein feeds is preferably obtained by dialysis or diafiltration. Diafiltration by ultrafiltration is particularly preferred as it allows for washing out salts and small charged molecules while proteins are retained. In some preferred embodiments of the invention, the same UF unit is used for UF/diafiltration and subsequent concentration of the protein feeds.

The present inventors have seen indications that the ratio between the conductivity (expressed in mS/cm) and the total amount of protein in the initial protein solution (expressed in % wt. total protein relative to the total weight of the initial protein solution) advantageously can be kept at or below a certain threshold to facilitate the crystallisation of BLG.

In some preferred embodiments of the invention, the ratio between the conductivity and the total amount of protein of the protein feeds is at most 0.3. Preferably, the ratio between the conductivity and the total amount of protein of the protein feeds is at most 0.25. Preferably, the ratio between the conductivity and the total amount of protein of the protein feeds is at most 0.20. More preferably, the ratio between the conductivity and the total amount of protein of the protein feeds is at most 0.18. Even more preferably, the ratio between the conductivity and the total amount of protein of the protein feeds is at most 0.12. Most preferably, the ratio between the conductivity and the total amount of protein of the protein feeds is at most 0.10.

It is for example preferred that the ratio between the conductivity and the total amount of protein of the protein feeds is approx. 0.07, or even lower.

The present inventors have furthermore found that the protein feed advantageously may be conditioned to obtain a UF permeate conductivity of at most 10 mS/cm. The UF permeate conductivity is a measure of the conductivity of the small molecule fraction of a liquid and is measured according to Example 9.10 of WO2018/115520. When the term "conductivity" is used herein as such it refers to the conductivity of the liquid in question. When the term "UF permeate conductivity" is used it refers to the conductivity of the small molecule fraction of a liquid and is measured according to Example 9.10 of WO2018/115520.

Preferably, the UF permeate conductivity of the protein feeds is at most 7 mS/cm. More preferably, the UF permeate conductivity of the protein feeds may be at most 5 mS/cm. Even more preferably, the UF permeate conductivity of the protein feeds may be at most 3 mS/cm.

Even lower UF permeate conductivities may be used and are particularly preferred if a high yield of BLG should be obtained. Thus, preferably, the UF permeate conductivity of the protein feeds is at most 1.0 mS/cm. More preferably, the UF permeate conductivity of the protein feeds may be at most 0.4 mS/cm. Even more preferably, the UF permeate conductivity of the protein feeds may be at most 0.1 mS/cm. Most preferably, the UF permeate conductivity of the protein feeds may be at most 0.04 mS/cm.

Even lower UF permeate conductivities may reached, e.g. of MilliQ water is used as a diluent in during diafiltration (MilliQ water has a conductivity of approx. 0.06 μS/cm) Thus, the UF permeate conductivity of the protein feeds may be at most 0.01 mS/cm. Alternatively, the UF permeate conductivity of the protein feeds may be at most 0.001 mS/cm. Alternatively, the UF permeate conductivity of the protein feeds may be at most 0.0001 mS/cm.

In some preferred embodiments of the invention the preparation of the protein feeds involves a temperature reduction.

The temperature of the protein feeds may be at most 30 degrees C., preferably at most 20 degrees C., and even more preferably to at most 10 degrees C. The inventors have found that even lower temperatures provide higher degree of supersaturation obtain when the protein feeds are mixed, thus, the temperature of the protein feed may e.g. be reduced to at most 5 degrees C., preferably at most 2 degrees C., and even more preferably to at most 0 degrees C. The temperature may even be lower than 0 degrees C., however preferably the protein feeds should remain pumpable, e.g. in the form of an ice slurry.

In some preferred embodiments of the invention the protein feeds is an ice slurry before they are combined to prepared the initial protein solution.

The preparation of the protein feeds preferably involves one or more protein concentration steps such as ultrafiltration, nanofiltration, reverse osmosis, and/or evaporation.

Ultrafiltration is particularly preferred as it allows for selective concentration of protein. As mentioned above, ultrafiltration is preferably used both for diafiltration and concentration during the preparation of the protein feeds.

In some preferred embodiments of the invention, the concentration of BLG of protein feeds is below the level where spontaneous crystallisation of BLG occurs.

In some preferred embodiments of the invention the preparation of the protein feeds involves addition of one or more water activity reducing agent(s).

Useful, but non-limiting, examples of such water activity reducing agents are polysaccharides and/or poly-ethylene glycol (PEG).

In some preferred embodiments of the invention the preparation of the protein feeds involves ion exchange, by adding new ionic species, by dialysis or diafiltration.

In yet other preferred embodiments of the invention the preparation of the protein feeds involves reducing the conductivity, e.g. by diafiltration using a membrane that retains at least BLG. Diafiltration by ultrafiltration is particularly preferred.

Any suitable protein source may be used to prepare the protein feeds. In some preferred embodiments of the present invention the protein source is produced by fermentation of one or more of mammal cells, recombinant plant cells, recombinant mammal cells, and/or recombinant microorganisms capable of producing BLG.

In other preferred embodiments of the invention the protein source is derived from whey or milk serum from mammal milk. In particularly preferred embodiments of the invention the protein source of the protein feeds comprises, or even consists of, a milk serum protein concentrate, whey protein concentrate, milk serum protein isolate, whey protein isolate, or a combination thereof.

Typically, the protein feeds are prepared by combining, and preferably mixing, two or more of the above-mentioned processes.

In some preferred embodiments of the invention the preparation of the protein feeds involves subjecting the protein source, which preferably is a whey protein source, to:

pH adjustment to the desired pH, preferably a pH in the range of 6.0-8 when preparing type A protein feeds and a pH in the range of 3-5.0 when preparing type B protein feeds, and concentration by ultrafiltration, nanofiltration and/or reverse osmosis.

In other preferred embodiments of the invention the preparation of the protein feeds involves subjecting the protein source, which preferably is a whey protein source, to:

pH adjustment to the desired pH, preferably a pH in the range of 6.0-8 when preparing type A protein feeds and a pH in the range of 3-5.0 when preparing type B protein feeds, concentration by ultrafiltration, nanofiltration and/or reverse osmosis, ultrafiltration/diafiltration to provide a protein feed having a low conductivity, and temperature adjustment to keep the temperature of the liquid streams during processing at at most 20 degrees C., more preferably at most 15 degrees C., even more preferably at most 10 degrees C., and most preferably at most 5 degrees C.

The present inventors have furthermore found that the BLG yield of the present method may be improved by controlling the molar ratio between the sum of sodium+potassium vs. the sum of calcium and magnesium. A higher relative amount of calcium and magnesium surprisingly seems to increase the yield of BLG and therefore increases the efficiency of the BLG recovery of the present method.

In some preferred embodiments of the present invention the type A protein feed(s) would, if combined, have a molar ratio between Na+K and Ca+Mg of at most 4. More preferably, the type A protein feed(s) would, if combined, have a molar ratio between Na+K and Ca+Mg of at most 2. Even more preferably, the type A protein feed(s) would, if combined, have a molar ratio between Na+K and Ca+Mg of at most 1.5, and even more preferably at most 1.0. Most preferably, the type A protein feed(s) would, if combined, have a molar ratio between Na+K and Ca+Mg of at most 0.5, such as e.g. at most 0.2.

The molar ratio between Na+K and Ca+Mg it calculated as $(m_{Na}+m_K)/(m_{Ca}+m_{Mg})$ wherein $m_{Na}$ is the content of elemental Na in mol, $m_K$ is the content of elemental K in mol, $m_{Ca}$ is the content of elemental Ca in mol, and $m_{Mg}$ is the content of elemental Mg in mol.

In some preferred embodiments of the present invention the type B protein feed(s) would, if combined, have a molar ratio between Na+K and Ca+Mg of at most 4. More preferably, the type B protein feed(s) would, if combined, have a molar ratio between Na+K and Ca+Mg of at most 2. Even more preferably, the type B protein feed(s) would, if combined, have a molar ratio between Na+K and Ca+Mg of at most 1.5, and even more preferably at most 1.0. Most preferably, the type A protein feed(s) would, if combined, have a molar ratio between Na+K and Ca+Mg of at most 0.5, such as e.g. at most 0.2.

In some embodiments of the invention the protein feeds have low content of denatured protein. Preferably, the protein feeds have a degree of protein denaturation of at most 20%, preferably at most 10%, more preferably at most 5%, and most preferably at most 2%.

In some preferred embodiments of the invention the preparation of the initial protein solution has a pH in the range of 5-6.

All pH values are measured using a pH glass electrode and are normalised to 25 degrees C.

The initial protein solution may for example have a pH in the range of 4.9-6.1. The pH of the initial protein solution may e.g. be in the range of 5.0-6.1. Alternatively, the pH of the initial protein solution may be in the range of 5.1-6.1. Preferably, the pH of the initial protein solution is in the range of 5.1-6.0.

In some preferred embodiments of the invention the pH of the initial protein solution is in the range of 5.0-6.0. Preferably, the pH of the initial protein solution is in the range of 5.1-6.0. More preferably the pH of the initial protein solution is in the range of 5.1-5.9. Even more preferred, the pH of the initial protein solution may be in the range of 5.2-5.8. Most preferably the pH of the initial protein solution is in the range of 5.4-5.6.

The inventors have observed that the maximum BLG crystallisation yield is obtained at approx. pH 5.5 and that the pH of the initial protein solution advantageously can be selected outside pH 5.5 but moved closer to the optimum pH during the crystallisation, e.g. by addition of food acid or additional type B protein feed or type A protein feed. Thus, in some preferred embodiments of the present invention the pH of initial protein solution is in the range of 5.0-5.3 or 5.7-6.0.

The inventors have found that it is advantageous to avoid spontaneous crystallization during the crystallization and that BLG crystals formed by controlled crystallisation in the meta-stable zone have a more even size distribution and are easier to efficiently separate from the mother liquor that BLG crystals resulting from spontaneous BLG crystallisation.

Thus, in some preferred embodiments of the present invention the initial protein solution and preferably also the crystallizing protein solution are controlled to avoid spontaneous BLG crystallisation. It is for example preferred that the initial protein solution is supersaturated with respect to BLG but is in the meta-stable zone, meaning that spontaneous BLG crystallisation cannot occur.

The inventors have found that a low conductivity of the initial protein solution leads to a higher yield of BLG crystals. The minimum obtainable conductivity of the initial protein solution depends on the composition of the protein fraction and the lipid fraction (if any). Some protein species such as e.g. caseinomacropeptide (CMP) contribute more to the conductivity than other protein species. It is therefore preferable that the conductivity of the protein feed is brought near the level where protein and the counter ions of the protein are the main contributors to the conductivity. The reduction of conductivity often involves removal of at least some of the small, free ions that are present in liquid phase and not tightly bound to the proteins.

It is often preferred that the initial protein solution has a conductivity of at most 10 mS/cm. In some preferred embodiments of the invention, the initial protein solution has a conductivity of at most 5 mS/cm. Preferably, the initial protein solution has a conductivity of at most 4 mS/cm.

Lower conductivities are even more preferred and give rise to higher yields of BLG crystals. Thus, the initial protein solution preferably has a conductivity of at most 3 mS/cm. In some preferred embodiments of the invention, the initial protein solution has a conductivity of at most 1 mS/cm. Preferably, the initial protein solution has a conductivity of at most 0.5 mS/cm.

The present inventors have seen indications that the ratio between the conductivity (expressed in mS/cm) and the total amount of protein of the initial protein solution (expressed in % wt. total protein relative to the total weight of the initial protein solution) advantageously can be kept at or below a certain threshold to facilitate the crystallisation of BLG.

In some preferred embodiments of the invention, the ratio between the conductivity and the total amount of protein of the initial protein solution is at most 0.3. Preferably, the ratio between the conductivity and the total amount of protein of the initial protein solution is at most 0.25. Preferably, the ratio between the conductivity and the total amount of protein of the initial protein solution is at most 0.20. More preferably, the ratio between the conductivity and the total amount of protein of the initial protein solution is at most 0.18. Even more preferably, the ratio between the conductivity and the total amount of protein of the initial protein solution is at most 0.12. Most preferably, the ratio between the conductivity and the total amount of protein of the initial protein solution is at most 0.10.

It is for example preferred that the ratio between the conductivity and the total amount of protein of the initial protein solution is approx. 0.07, or even lower.

The present inventors have furthermore found that the initial protein solution advantageously may have a UF permeate conductivity of at most 10 mS/cm. The UF permeate conductivity is a measure of the conductivity of the small molecule fraction of a liquid and is measured according to Example 9.10 of WO2018/115520. When the term "conductivity" is used herein as such it refers to the conductivity of the liquid in question. When the term "UF permeate conductivity" is used it refers to the conductivity of the small molecule fraction of a liquid and is measured according to Example 9.10 of WO2018/115520.

Preferably, the UF permeate conductivity of the initial protein solution is at most 7 mS/cm. More preferably, the UF permeate conductivity of the initial protein solution may be at most 5 mS/cm. Even more preferably, the UF permeate conductivity of the initial protein solution may be at most 3 mS/cm.

Even lower UF permeate conductivities may be used and are particularly preferred if a high yield of BLG should be obtained. Thus, preferably, the UF permeate conductivity of the initial protein solution is at most 1.0 mS/cm. More preferably, the UF permeate conductivity of the initial protein solution may be at most 0.4 mS/cm. Even more preferably, the UF permeate conductivity of the initial protein solution may be at most 0.1 mS/cm. Most preferably, the UF permeate conductivity of the initial protein solution may be at most 0.04 mS/cm.

Even lower UF permeate conductivities may reached, e.g. of MilliQ water is used as a diluent in during diafiltration (MilliQ water has a conductivity of approx. 0.06 µS/cm) Thus, the UF permeate conductivity of the initial protein solution may be at most 0.01 mS/cm. Alternatively, the UF permeate conductivity of the initial protein solution may be at most 0.001 mS/cm. Alternatively, the UF permeate conductivity of the initial protein solution may be at most 0.0001 mS/cm.

The inventors have found that a low temperature increases the BLG crystallisation yield. In some preferred embodiments of the present invention the temperature of the initial protein solution is at most 30 degrees C., more preferably at most 20 degrees C., and most preferably to at most 10 degrees C. Lower temperatures provide even higher degree of supersaturation, thus, the temperature of the initial protein solution is preferably at most 5 degrees C., more preferably at most 2 degrees C., and even more preferably at most 0 degrees C. The temperature may even be lower than 0 degrees C., however preferably the initial protein solution should remain pumpable, e.g. in the form of an ice slurry.

In some preferred embodiments of the invention, the initial protein solution is an ice slurry at the initialisation of BLG crystallisation. Alternatively or additionally, crystallising initial protein solution may be converted into or maintained as an ice slurry during the BLG crystallisation of step b).

The present inventors have furthermore found that the BLG yield of the present method may be improved by controlling the molar ratio between the sum of sodium+ potassium vs. the sum of calcium and magnesium. A higher relative amount of calcium and magnesium surprisingly seems to increase the yield of BLG and therefore increases the efficiency of the BLG recovery of the present method.

In some preferred embodiments of the present invention the initial protein solution of step a) has a molar ratio between Na+K and Ca+Mg of at most 4. More preferably, the initial protein solution of step a) has a molar ratio between Na+K and Ca+Mg of at most 2. Even more preferably, the initial protein solution of step a) has a molar ratio between Na+K and Ca+Mg of at most 1.5, and even more preferably at most 1.0. Most preferably, the initial protein solution of step a) has a molar ratio between Na+K and Ca+Mg of at most 0.5, such as e.g. at most 0.2.

The molar ratio between Na+K and Ca+Mg it calculated as $(m_{Na}+m_{K})/(m_{Ca}+m_{Mg})$ wherein $m_{Na}$ is the content of elemental Na in mol, $m_{K}$ is the content of elemental K in mol, $m_{Ca}$ is the content of elemental Ca in mol, and $m_{Mg}$ is the content of elemental Mg in mol.

It is particularly preferred that the initial protein solution is supersaturated with respect to BLG by salting-in and that BLG therefore can be crystallised from the initial protein solution in salting-in mode.

In some embodiments of the invention the initial protein solution has low content of denatured protein, particularly if the edible BLG product of the present invention should have degree of protein denaturation too. Preferably, the initial protein solution has a degree of protein denaturation of at most 20%, preferably at most 10%, more preferably at most 5%, and most preferably at most 2%.

Step b) of the method involves crystallising at least some of the BLG of the supersaturated initial protein solution.

It is particularly preferred that the crystallisation of step b) takes place in salting-in mode, i.e. in a liquid that has a low ionic strength and conductivity. This is contrary to the salting-out mode wherein significant amounts of salts are added to a solution in order to provoke crystallisation.

The crystallisation of BLG of step b) may e.g. involve one or more of the following:

Waiting for crystallisation to take place,

Addition of crystallisation seeds,

Increasing the degrees of supersaturation of BLG even further, and/or

Mechanical stimulation.

In some preferred embodiments of the invention step b) involves adding crystallisation seeds to the initial protein solution. The inventors have found that addition of crystallisation seeds makes it possible to control when and where the BLG crystallisation takes place to avoid sudden clogging of process equipment and unintentional stops during production. It is for example often desirable to avoid onset crystallisation while concentrating the protein feed.

In principle, any seed material which initiates the crystallisation of BLG may be used. However, it is preferred that hydrated BLG crystals or dried BLG crystals are used for seeding to avoid adding additional impurities to the initial protein solution.

The crystallisation seeds may be on dry form or may form part of a suspension when added to the initial protein solution. Adding a suspension containing the crystallisation seeds, e.g. BLG crystals, is presently preferred as it appears to provide a faster onset of crystallisation. It is preferred that such a suspension contain crystallisation seeds has a pH in the range of 5-6 and a conductivity of at most 10 mS/cm.

In some embodiments of the invention at least some of the crystallisation seeds are located on a solid phase which is brought in contact with the initial protein solution.

The crystallisation seeds preferably have a smaller particle size than the desired size of the BLG crystals. The size of the crystallisation seeds may be modified by removing the largest seeds by sieving or other size fractionation processes. Particle size reduction, e.g. by means of grinding, may also be employed prior to the particle size fractionation.

In some embodiments of the invention at least 90% w/w of the crystallisation seeds have a particle size (measured by sieving analysis) in the range of 0.1-600 microns. For example, at least 90% w/w of the crystallisation seeds may have a particle size in the range of 1-400 microns. Preferably, at least 90% w/w of the crystallisation seeds may have a particle size in the range of 5-200 microns. More preferably, at least 90% w/w of the crystallisation seeds may have a particle size in the range of 5-100 microns.

The particle size and dosage of crystallisation seeds may be tailored to provide the optimal crystallisation of BLG.

In some preferred embodiments of the invention at least one of the one or more type A or type B protein feed(s) already contains BLG crystals in which case further seeding is not necessary, yet often preferred to ensure a sufficient amount of crystallisation seeds.

In some preferred embodiments of the invention step b) involves increasing the degree of supersaturation of BLG even further, preferably to a degree of supersaturation where crystallisation of BLG initiates immediately, i.e. in at most 20 minutes, and preferably in at most 5 minutes. This is also referred to as the nucleation zone wherein crystallites form spontaneously and start the crystallisation process.

The degree of supersaturation may e.g. be increased by one or more of the following:

increasing the protein concentration of the initial protein solution further cooling the initial protein solution further bringing the initial protein solution closer to the optimum pH for BLG crystallisation reducing the conductivity even further.

It is particularly preferred to increase the protein concentration of the initial protein solution further and/or to bring the initial protein solution closer to the optimum pH for BLG crystallisation (approx. pH 5.5) by addition of additional type A or B protein feed.

In some preferred embodiments of the invention step b) involves waiting for the BLG crystals to form. This may take several hours and is typically for an initial protein solution which is only slightly supersaturated with respect to BLG and to which no crystallisation seeds have been added.

In some preferred embodiments of the invention the provision of the initial protein solution (step a) and the crystallisation of BLG (step b) takes place as two separate steps. However, if the initial protein solution already contains at least some BLG crystals step b) starts the moment the initial protein solution has been prepared.

In some preferred embodiments of the invention step b) involves additional adjustment of the crystallising protein solution preferably to raise the degree of supersaturation of BLG, or at least maintain supersaturation. The additional adjustments preferably result in an increased yield of BLG crystals or provide BLG crystals of a better quality, e.g. in the form of a larger and more uniform crystal size.

Such additional adjustment may involve one or more of:

increasing the protein concentration of the crystallising protein solution even further cooling the crystallising protein solution to an even lower temperature bringing the crystallising protein solution even closer to the optimum pH for BLG crystallisation reducing the conductivity of the crystallising protein solution even further.

In some preferred embodiments of the invention the crystallising protein solution is maintained in the meta-stable zone during step b) to avoid spontaneous formation of new crystallites.

It is particularly preferred to increase the protein concentration of the crystallizing protein solution further and/or to bring the crystallizing protein solution closer to the optimum pH for BLG crystallisation (approx. pH 5.5) by addition of additional type A or B protein feed. The pH adjustment is preferably performed slowly to avoid spontaneous crystallisation or large local pH differences. Rates of pH adjustments in the range of 0.05-0.5 pH-units per hour have been found advantageous for controlled BLG crystallization.

It is furthermore particularly preferred that the temperature of crystallizing protein solution is reduced during step b) to a temperature that is at least 2 degrees C. lower than the temperature of the initial protein solution, more preferably at least 4 degrees C. lower and most preferably at least 6 degrees C. lower than the temperature of the initial protein solution. It is however preferred that the crystallizing protein solution does not freeze completely.

The inventors have observed that the maximum BLG crystallisation yield is obtained at approx. pH 5.5 and that the pH of the initial protein solution advantageously can be selected outside the optimum but moved closer to the optimum pH during the crystallisation, e.g. by addition of food acid or more preferably by additional type B protein feed or type A protein feed.

Thus, in some preferred embodiments of the present invention the pH of initial protein solution is in the range of 5.0-5.3 or 5.7-6.0. In such preferred embodiments of the present invention it is furthermore preferred to adjust the pH of the crystallizing protein solution to bring the pH of the crystallizing protein solution closer to pH 5.5 than the pH of the initial protein solution, preferably by addition of additional type A protein feed or additional type B protein feed. It is particularly preferred that the crystallizing protein solution is adjusted to approx. pH 5.5 during the crystallisation. The additional type A protein feed or additional type B protein feed used for adjusting the crystallizing protein solution preferably has conductivity that is equal to or lower than the crystallizing protein solution. It is furthermore preferred to combine the above-mentioned pH adjustment during the crystallization with a reduction of the temperature of the crystallising protein solution so that the crystallizing protein solution is cooled to a temperature that is lower than the temperature of initial protein solution, e.g. simultaneously or sequentially.

In some preferred embodiments of the present invention:

the pH of initial protein solution of step a) is in the range of 5.0-5.3 or 5.7-6.0 and the temperature of the initial protein solution is in the range of 5-20 degrees C., during step b) the pH of the crystallizing protein solution is adjusted to a pH in the range of 5.4-5.6, preferably by addition of additional type A protein feed if the pH of the initial protein solution is in the range of 5.0-5.3, or by addition of additional type B protein feed if the pH of the initial protein solution is in the range of 5.7-6.0, and during step b) the temperature of crystallizing protein solution is reduced to a temperature that is at least 2 degrees C. lower than the temperature of the initial protein solution.

The terms "additional type A protein feed" and "additional type B protein feed" pertain to BLG containing compositions that are added to the initial protein solution to provoke crystallisation or to the crystallizing protein solution to modify at least its pH and BLG content. The features and preferences described in the context of a "type A protein feed" and a "type B protein feed" apply equally to an "additional type A protein feed" and an "additional type B protein feed", respectively.

The inventors have determined the crystal lattice structure of the isolated BLG crystals by x-ray crystallography and have not found a similar crystal in the prior art.

In some preferred embodiments of the invention at least some of the BLG crystals obtained during step b) have an orthorhombic space group $P\,2_1\,2_1\,2_1$.

Preferably, at least some of the obtained BLG crystals have an orthorhombic space group $P\,2_1\,2_1\,2_1$ and the unit cell dimensions a=68.68 (±5%) Å, b=68.68 (±5%) Å, and c=156.65 (±5%) Å; and unit cell integral angles α=90 degrees, β=90 degrees, and γ=90 degrees.

In some preferred embodiments of the invention, at least some of the obtained BLG crystals have an orthorhombic space group $P\,2_1\,2_1\,2_1$ and the unit cell dimensions a=68.68 (±2%) Å, b=68.68 (±2%) Å, and c=156.65 (±2%) Å; and the unit cell integral angles α=90 degrees, β=90 degrees, and γ=90 degrees.

Even more preferred, at least some of the obtained BLG crystals may have an orthorhombic space group $P\,2_1\,2_1\,2_1$ and the unit cell dimensions a=68.68 (±1%) Å, b=68.68 (±1%) Å, and c=156.65 (±1%) Å; and the unit cell integral angles α=90 degrees, β=90 degrees, and γ=90 degrees.

Most preferably, at least some of the obtained BLG crystals have an orthorhombic space group $P\,2_1\,2_1\,2_1$ and the unit cell dimensions a=68.68 Å, b=68.68 Å, and c=156.65 Å; and the unit cell integral angles α=90 degrees, β=90 degrees, and γ=90 degrees.

In some particularly preferred embodiments of the invention the method contains a step c) of separating at least some of the BLG crystals from the remaining liquid of the BLG crystal-containing solution. This is especially preferred when purification of BLG is desired.

Step c) may for example comprise separating the BLG crystals to a solids content of at least 30% w/w. Preferably, step c) comprises separating the BLG crystals to a solids content of at least 40% w/w. Even more preferably step c) comprises separating the BLG crystals to a solids content of at least 50% w/w.

The inventors have found that the high solids content is advantageous for the purification of BLG as the aqueous portion that adhere to the separated BLG crystals typically contains the impurities that should be avoided. Additionally, the high solids content reduces the energy consumption for converting the separated BLG crystals to a dry product, such as e.g. a powder, and it increases the BLG yield obtained from a drying unit with a given capacity.

In some preferred embodiments of the invention step c) comprises separating the BLG crystals to a solids content of at least 60%. Preferably, step c) comprises separating the BLG crystals to a solids content of at least 70%. Even more preferably step c) comprises separating the BLG crystals to a solids content of at least 80%.

In some preferred embodiments of the invention the separation of step c) involves one or more of the following operations:

centrifugation,
decantation,
filtration,
sedimentation,
combinations of the above.

These unit operations are well-known to the person skilled in the art and are easily implemented. Separation by filtration may e.g. involve the use of vacuum filtration, dynamic crossflow filtration (DCF), a filtrate press or a filter centrifuge.

Different pore sizes for filtration may be employed based on the desired outcome. Preferably, the filter allows native whey protein and small aggregates to pass but retains the BLG crystals. The filter preferably has a nominal pore size of at least 0.1 micron. The filter may e.g. have a nominal pore size of at least 0.5 micron. Even more preferably, the filter may have a nominal pore size of at least 2 micron.

Filters having larger pore sizes can also be used and are in fact preferred if primarily the large crystals should be separated from a liquid containing BLG crystals. In some embodiments of the invention the filter has a nominal pore size of at least 5 micron. Preferably, the filter has a nominal pore size of at least 20 micron. Even more preferably, the filter may have a pore size of at least 40 micron.

The filter may e.g. have a pore size in the range of 0.03-5000 micron, such as e.g. 0.1-5000 micron. Preferably, the filter may have a pore size in the range of 0.5-1000 micron. Even more preferably, the filter may have a pore size in the range of 5-800 micron, such as e.g. in the range of 10-500 micron or in the range of 50-500 microns.

In some preferred embodiments of the invention the filter has a pore size in the range of 0.03-100 micron. Preferably, the filter may have a pore size in the range of 0.1-50 micron. More preferably, the filter may have a pore size in the range of 4-40 micron. Even more preferably, the filter may have a pore size in the range of 5-30 micron such as in the range of 10-20 micron.

An advantage of using filters having a pore size larger than 1 micron is that bacteria and other microorganisms also are at least partly removed during separation and optionally also during washing and/or recrystallization. The present method therefore makes it possible to produce high purity BLG with both a very low bacterial load yet avoiding heat-damage of the protein.

Another advantage of using filters having a pore size larger than 1 micron is that removal of water and subsequent drying becomes easier and less energy consuming.

The remaining liquid which is separated from the BLG crystals may be recycled to one or more protein feed during preparation of the initial protein solution.

In some preferred embodiments of the invention, step c) employs a filter centrifuge. In other preferred embodiments of the invention, step c) employs a decanter centrifuge. Results (see Example 13 of WO2018/115520) have shown that use a filter centrifuge and/or a decanter centrifuge for separating BLG crystals from the mother liquor provides more robust operation of the method than e.g. vacuum filtration.

Often it is preferred to dry a formed filter cake with a drying gas to reduce the moisture content of the filter cake and preferably to make it possible to peel the filter cake off the filter. The use of a drying gas may form part of the separation step or alternatively, the final drying step if the filter cake is converted directly to a dry edible BLG composition.

In some preferred embodiments of the invention, step c) employs a DCF unit.

In some preferred embodiments of the invention step c) is performed using a DCF unit equipped with a membrane capable of retaining BLG crystals, the DCF permeate is recycle to form part of the initial protein solution or protein feed, and DCF retentate may be recovered or returned to the crystallization tank. Preferably, the DCF permeate is treated, e.g. by ultra-/diafiltration by to make it supersaturated with respect to BLG prior to mixing with the initial protein solution or protein feed.

Advantageously, these embodiments do not require that the temperature of the liquid streams are raised above 15 degrees C. and are therefore less prone to microbial contamination than method variants that require higher temperatures. Another industrial advantage of the these embodiments is that the level of supersaturation is easily controlled and can be kept at a level where unwanted, spontaneous crystallization does not occur. The temperature of the liquid streams during these embodiments of the method is therefore preferably at most 15 degrees C., more preferred at most 12 degrees C., and even more preferred at most 10 degrees C., and most preferred at most 5 degrees C.

These embodiments are exemplified in Example 10 of WO2018/115520. These embodiments may be implemented as a batch methods or a continuous method.

In some preferred embodiments of the invention the method comprises a step d) of washing BLG crystals, e.g. the separated BLG crystals of c). The washing may consist of a single wash or of multiple washing steps.

The washing of step d) preferably involves contacting the BLG crystals with a washing liquid without completely dissolving the BLG crystals and subsequently separating the remaining BLG crystals from the washing liquid.

The washing liquid is preferably selected to avoid complete dissolution of the BLG crystals and may e.g. comprise, or even consist essentially of, cold demineralised water, cold tap water, or cold reverse osmosis permeate.

The washing liquid may have a pH in the range of 5-6, preferably in the range of 5.0-6.0, and even more preferably in the range of 5.1-6.0, such as e.g. in the range of 5.1-5.9.

The washing liquid may have a conductivity of at most 0.1 mS/cm, preferably at most 0.02 mS/cm, and even more preferably at most 0.005 mS/cm.

Washing liquids having even lower conductivities may be used. For example, the washing liquid may have a conductivity of at most 1 microS/cm. Alternatively, the washing liquid may have a conductivity of at most 0.1 microS/cm, such as e.g. approx. 0.05 microS/cm.

A washing step is preferably performed at low temperature to limit the dissolution of crystallised BLG. The temperature of the washing liquid is preferably at most 30 degrees C., more preferably at most 20 degrees C. and even more preferably at most 10 degrees C.

A washing step may e.g. be performed at at most 5 degrees C., more preferably at at most 2 degrees C. such as e.g. approx. 0 degrees C. Temperatures lower than 0 degrees C. may be used in so far that the washing liquid does not freeze at that temperature, e.g. due to the presence of one or more freezing point depressant(s).

In some embodiments of the invention the washing liquid contains BLG, e.g. in an amount of at least 1% w/w, and preferably in an amount of at least 3% w/w, such as e.g. in an amount of 4% w/w.

The washing of step d) typically dissolves at most 80% w/w of the initial amount of BLG crystals, preferably at most 50% w/w, and even more preferably at most 20% w/w of the initial amount of BLG crystals. Preferably, the washing of step d) dissolves at most 15% w/w of the initial amount of BLG crystals, more preferably at most 10% w/w, and even more preferably at most 5% w/w of the initial amount of BLG crystals.

The weight ratio between the total amount of washing liquid and the initial amount of separated BLG crystals is often at least 1, preferably at least 2 and more preferably at least 5. For example, the weight ratio between the amount of washing liquid and the initial amount of separated BLG crystals may be at least 10. Alternatively, the weight ratio between the amount total of washing liquid and the initial amount of separated BLG crystals may be at least 20, such as e.g. at least 50 or at least 100.

The term "total amount of washing liquid" pertains to the total amount of washing liquid used during the entire process.

In some preferred embodiments of the invention the one or more washing sequences take place in the same filter arrangement or in a similar filter arrangement as the BLG crystal separation. A filter cake primarily containing BLG crystals is added one or more sequences of washing liquid which is removed through the filter while the remaining part of the BLG crystals stays in the filter cake.

In particularly preferred embodiments of the invention, the separation of step c) is performed using a filter that retains BLG crystals. Subsequently, the filter cake is contacted with one or more quantities of washing liquid which moves through the filter cake and the filter. It is often preferred that each quantity of washing liquid is at most 10 times the volume of the filter cake, preferably at most 5 times the volume of the filter cake, more preferably at most 1 times the volume of the filter cake, even more preferably at most 0.5 times the volume of the filter cake, such as e.g. at most 0.2 times the volume of the filter cake. The volume of the filter cake includes both solids and fluids (liquids and gasses) of the filter cake. The filter cake is preferably washed this way at least 2 times, preferably at least 4 times and even more preferably at least 6 times.

The used washing liquid from step d) may e.g. be recycled to the protein feed or the initial protein solution where washed out BLG may be isolated again.

The method may furthermore comprise a step e) which involves a recrystallization step. The recrystallization step may e.g. comprise:

dissolving the separated BLG crystals in a recrystallization liquid, adjusting the recrystallization liquid to obtain supersaturation with respect to BLG, crystallising BLG in the supersaturated, adjusted recrystallization liquid, and separating BLG crystals from the remaining adjusted recrystallization liquid.

Alternatively and often more preferred, the separated BLG crystals are converted into one or more type A protein feed(s) and one or more type B protein feed(s) which are combined to form a new supersaturated protein solution, e.g. a whey protein solution, as in step a) and in which new protein solution BLG is crystallised again.

Step e) may comprise either a single re-crystallisation sequence or multiple re-crystallisation sequences.

In some embodiments of the invention the BLG crystals of step or c) or d) are recrystallized at least 2 times. For example, the BLG crystals may be recrystallized at least 3 times, such as e.g. at least 4 times.

The washing and re-crystallization steps may be combined in any sequence and may be performed multiple times if required.

The separated BLG crystals of step c) may e.g. be subjected to the process sequence:

One or more steps of washing (step d), followed by

One or more steps of re-crystallisation (step e).

Alternatively, the separated BLG crystals of step c) may be subjected to the process sequence:

One or more steps of re-crystallisation (step e), followed by

One or more steps of washing (step d).

It is also possible to combine multiple steps of washing and re-crystallisation, e.g. in the sequence:

One or more steps of washing (step d),

One or more steps of re-crystallisation (step e),

One or more steps of washing (step d), and

One or more steps of re-crystallisation (step e).

Or e.g. in the sequence:

One or more steps of re-crystallisation (step e),

One or more steps of washing (step d),

One or more steps of re-crystallisation (step e).

One or more steps of washing (step d)

In some embodiments of the invention the method furthermore involves subjecting the separated BLG to additional BLG enrichments steps, e.g. based on chromatography or selective filtration. However, in other preferred embodiments of the invention the method does not contain additional BLG enrichment steps after step b). By the term "additional BLG enrichment step" is meant a process step which enriches BLG relative to the total amount of protein, which step is not related to crystallisation of BLG or handling of BLG crystals. An example of such an additional BLG enrichment step is ion exchange chromatography. Washing of BLG crystals and/or recrystallization of BLG is not considered "additional BLG enrichment steps".

In some particularly preferred embodiments of the invention the method involves a drying step f) wherein a BLG-containing composition derived from steps b), c), d), or e) is converted to a dry composition.

In the context of the present invention, the term "dry" means that the composition or product in question comprises at most 6% w/w water and preferably even less.

In the context of the present invention, the term "BLG-containing composition" is used to describe the composition that is subjected to the drying of step f).

In the context of the present invention, a "BLG-containing composition derived from step b), c), d), or e)" means a composition which comprises at least some of the BLG from step b), c), d), or e). In some preferred embodiments of the invention the "BLG-containing composition derived from step b), c), d), or e)" is directly obtained from step b), c), d), or e). However, in other preferred embodiments of the invention the "BLG-containing composition derived from step b), c), d), or e)" is the result of further processing of the composition obtained directly from step b), c), d), or e).

It is often preferred that the BLG-containing composition contains a significant amount of the BLG present in the composition obtained directly from step b), c), d), or e). In some preferred embodiments of the invention the BLG-containing composition derived from step b), c), d), or e) comprises at least 50% w/w of the BLG obtained from step b), c), d), or e), preferably at least 70%, and even more preferably at least 80%.

Preferably, the BLG-containing composition derived from step b), c), d), or e) comprises at least 85% w/w of the BLG obtained from step b), c), d), or e). More preferably, the BLG-containing composition derived from step b), c), d), or e) comprises at least 90% w/w of the BLG obtained from step b), c), d), or e). Even more preferably, the BLG-containing composition derived from step b), c), d), or e) comprises at least 95% w/w of the BLG obtained from step b), c), d), or e). Most preferably, the BLG-containing composition derived from step b), c), d), or e) comprises 100% w/w of the BLG obtained from step b), c), d), or e).

In some preferred embodiments of the invention the drying step involves one or more of spray drying, freeze drying, spin-flash drying, rotary drying, and/or fluid bed drying.

In some particularly preferred embodiments of the invention the drying step involves a BLG-containing composition in which the BLG crystal has been dissolved and wherein the resulting powder does not contain BLG crystals formed by step b) or by re-crystallisation prior to the drying step. These embodiments are preferred if the edible BLG composition should resemble that of e.g. a conventional, dried whey protein powder.

The BLG crystals may e.g. be dissolved by:
increasing temperature,
increasing the conductivity, e.g. by addition of one or more salts
changing the pH, e.g. outside the range 5-6,
decreasing the concentration of BLG, e.g. by dilution,
or a combination of the above.

Spray-drying is the presently preferred method of drying the BLG-containing composition which does not contain BLG crystals.

In other particularly preferred embodiments of the invention the drying step involves a BLG-containing composition which still contains BLG crystals and wherein the resulting powder contains BLG crystals. These embodiments are preferred if the edible BLG composition should have a higher density than conventional, dried whey protein powder.

In some particularly preferred embodiments of the invention the drying step involves a BLG-containing composition which still contains BLG crystals and wherein the resulting powder contains BLG crystals. These embodiments are preferred if the edible BLG-composition should have a higher density than conventional, dried whey protein powder.

As documented in Example 7 of WO2018/115520, the present inventors have previously discovered that it is possible to spray-dry a slurry of BLG crystals and retain at least some of the crystal structure when the dried BLG crystals are resuspended in cold demineralised water. It is particularly advantageous to avoid exposing the BLG-containing composition containing BLG crystals to a heat-treatment regime that dissolve a significant amount of the BLG crystal prior to spraying. Thus, if pre-heating of the BLG-containing composition containing BLG crystals is used prior to spraying it is preferred to carefully control the heat-load.

In some embodiments of the invention the BLG-containing composition containing BLG crystals has a temperature of at most 70 degrees C. when reaching the exit of the spray device (e.g. a nozzle or an atomizer), preferably at most 60 degrees C., more preferably at most 50 degrees C. In some preferred embodiments of the invention the BLG-containing composition containing BLG crystals has a temperature of at most 40 degrees C. when reaching the exit of the spray-device, preferably at most 30 degrees C., more preferably at most 20 degrees C., even more preferably at most 10 degrees C., and most preferably at most 5 degrees C.

The spray-device of the spray-dryer is the device, e.g. the nozzle or the atomizer, which converts the solution or suspension to be dried into droplets that enter the drying chamber of the spray-drier.

It is particularly preferred that the BLG-containing composition containing BLG crystals has a temperature in the range of 0-50 degrees C. when reaching the exit of the spray-device, preferably in the range of 2-40 degrees C., more preferably in the range of 4-35 degrees C., and most preferably in the range of 5-10 degrees C. when reaching the exit of the spray-device.

In some preferred embodiments of the invention, the BLG-containing composition has a crystallinity of BLG of at least 20% when reaching the exit of the spray-device, preferably at least 40%, more preferably at least 60%, even more preferably at least 80%, and a most preferably at least 90%, such as e.g. preferably 97-100%. BLG-containing composition may either be a BLG isolate, e.g. contain BLG in an amount of more than 90% w/w relative to total protein or it may contain significant amounts of other proteins and therefore contain BLG in an amount of at most 90% w/w relative to total protein.

In some preferred embodiments of the invention, the BLG-containing composition may have the protein composition of a traditional liquid WPC or WPI or a traditional liquid SPC or SPI as described herein but have a crystallinity of BLG of at least 20% when reaching the exit of the spray-device, preferably at least 40%, more preferably at least 60%, even more preferably at least 80%, and a most preferably at least 90%, such as e.g. preferably 97-100%.

The inlet temperature of gas of the spray-drier is preferably in the range of 140-220 degrees C., more preferably in the range of 160-200 degrees C., and even more preferably in the range of 170-190 degrees C., such as e.g. preferably approximately 180 degrees C. The exit temperature of the gas from the spray-drier is preferably in the range of 50-95 degrees C., more preferably in the range of 70-90 degrees C., and even more preferably in the range of 80-88 degrees C., such as e.g. preferably approximately 85 degrees C. As a rule of thumb, the solids that are subjected to spray-drying are said to be heated to a temperature which is 10-15 degrees C. less than the gas exit temperature.

In some preferred embodiments of the invention, the spray-drier is preferably in the range of 50-85 degrees C., more preferably in the range of 60-80 degrees C., and even more preferably in the range of 65-75 degrees C., such as e.g. preferably approximately 70 degrees C.

In some preferred embodiments of the invention the BLG-containing composition to be dried is mixed with a dry BLG isolate to raise the solids content to a level where the mixture can be dried by fluid bed drying. This is also referred to as back-mixing and allows for very cost efficient drying of the BLG product. These embodiments are particularly preferred for BLG-containing compositions that contain BLG crystals.

An advantage of the present method is that the BLG-containing composition to be dried may have a very high solids content prior to the drying step and therefore less water has to be removed and less energy is consumed in the drying operation.

In some preferred embodiments of the invention the BLG-containing composition derived from step b), c), d), or e) has a solids content of at least 20% w/w. Preferably, the BLG-containing composition derived from step b), c), d), or e) has a solids content of at least 30% w/w. More preferably, the BLG-containing composition derived from step b), c), d), or e) has a solids content of at least 40% w/w. Even more preferably, the BLG-containing composition derived from step b), c), d), or e) has a solids content of at least 50% w/w, such as e.g. at least 60% w/w.

In other preferred embodiments of the invention the BLG-containing composition derived from step b), c), d), or e) has a solids content of in the range of 20-80% w/w. Preferably, the BLG-containing composition derived from step b), c), d), or e) has a solids content in the range of 30-70% w/w. More preferably, the BLG-containing composition derived from step b), c), d), or e) has a solids content in the range of 40-65% w/w. Even more preferably, the BLG-containing composition derived from step b), c), d), or e) has a solids content in the range of 50-65% w/w, such as e.g. approx. 60% w/w.

The present inventors have found that the higher the crystallinity of the BLG-containing composition, the less water is bound to the BLG-containing composition, and the higher total solids content of the BLG-containing composition can be achieved prior to the drying step. Thus in some preferred embodiments of the invention, the BLG-containing composition, has a crystallinity of BLG of at least 10% w/w. Preferably, the BLG of the BLG-containing composition has a crystallinity of at least 20% w/w. More preferably the BLG of the BLG-containing composition has a crystallinity of at least 30% w/w. Even more preferably the BLG of the BLG-containing composition has a crystallinity of at least 40% w/w.

Even higher crystallinities are often preferred. Thus, in some preferred embodiments of the invention the BLG of the BLG-containing composition has a crystallinity of at least 50% w/w. Preferably, the BLG of the BLG-containing composition has a crystallinity of at least 60% w/w. More preferably, the BLG of edible BLG composition has a crystallinity of at least 70% w/w. Even more preferably, the BLG of the BLG-containing composition has a crystallinity of at least 80% w/w. Most preferred, the BLG of the BLG-containing composition has a crystallinity of at least 90% w/w, preferably at least 95% w/w, more preferably at least 97% w/w, and even more preferably at least 99% w/w.

The inventors have found that a reduced content of water tends to increase the crystallinity of BLG of a composition. Thus, compositions having a high water:BLG ratio (e.g. a suspension of 4% BLG crystals in water) tend to have a lower crystallinity of BLG than does compositions that have a lower water:BLG ratio (e.g. a filter cake or moist, isolated crystals) at the same conditions.

The method of the present invention may be operated using mild temperatures that do not damage the nutritional value of neither BLG nor the other whey proteins of the initial protein solution.

In some preferred embodiments of the invention, the BLG is not subjected to a temperature above 90 degrees C. during the method. Preferably, the BLG is not subjected to a temperature above 80 degrees C. during the method. Even more preferred, the BLG is not subjected to a temperature above 75 degrees C. during the method. It should be noted that even though spray-drying often employs temperatures in the excess of 150 degree C., the short exposure time and the concurrent evaporation of water means that the spray-dried proteins do not experience temperatures above 50-70 degrees C.

The inventors have seen indications that extended heating during the drying step reduces the amount of BLG that is in crystal form. In some preferred embodiments of the invention the heat exposure during the drying step is kept sufficiently low to provide a degree of denaturation of BLG of at most 10%, preferably at most 4%, more preferably at most 1%, even more preferably at most 0.4% and even more preferred at most 0.1%. Most preferably, the drying step does not result in detectable denaturation of BLG at all.

The degree of denaturation caused by the drying step is calculated by determining the BLG content (relative to total solids) in the BLG-containing composition to be dried ($c_{before\ step\ f}$) in step f) and the BLG content (relative to total solids) in the redissolved, dried composition and using the formula:

$$\text{Degree of denaturation} = ((c_{before\ step\ f} - c_{after\ step\ f})/c_{before\ step\ f}) * 100\%$$

Some preferred embodiments of the invention pertain to a method of preparing an edible composition comprising beta-lactoglobulin (BLG) in crystallised form, the method comprising the steps of a) providing an initial protein solution comprising BLG and at least one additional whey protein, said initial protein solution is supersaturated with respect to BLG and has a pH in the range of 5-6, said initial protein solution comprising:
   70-100% w/w protein relative to total solids,
   30-90% w/w BLG relative to total protein, and preferably 30-70% w/w BLG
   4-50% w/w ALA relative to total protein, and preferably 8-35% w/w ALA,
   0-25% w/w CMP relative to protein,
   at least 10% w/w protein relative to the total weight of the initial protein solution, b) crystallising BLG in the supersaturated initial protein solution, preferably by addition of crystallisation seeds, thereby obtaining a BLG crystal-containing solution, and f) drying the BLG crystal-containing solution of step b) or a concentrate thereof, said BLG crystal-containing solution preferably having a crystallinity of BLG of at least 30%, which method does not contain steps c), d) or e).

The initial protein solution is preferably a demineralised protein solution, and has preferably ratio between the conductivity and the total amount of protein of at most 0.3 and/or a UF permeate conductivity of at most 7 mS/cm.

In these embodiments the BLG crystals are not separated from the BLG crystal-containing solution but are dried and results in a high density edible protein composition in powder form.

Other preferred embodiments of the invention pertain to a method of preparing an edible composition comprising beta-lactoglobulin (BLG) in crystallised form, the method comprising the steps of a) providing an initial protein solution comprising BLG and at least one additional whey protein, said initial protein solution is supersaturated with respect to BLG and has a pH in the range of 5-6, said initial protein solution comprising:
   70-100% w/w protein relative to total solids,
   30-90% w/w BLG relative to total protein, and preferably 30-70%
   4-50% w/w ALA relative to total protein, and preferably 8-35%
   0-25% w/w CMP relative to total protein.
   at least 10% w/w protein relative to the total weight of the initial protein solution, b) crystallising BLG in the supersaturated initial protein solution, preferably by addition of crystallisation seeds, thereby obtaining a BLG crystal-containing solution, c) separating BLG crystals from the remaining liquid of the BLG crystal-containing solution, d) optionally, washing the separated BLG crystals obtained from step c), e) optionally, re-crystallising BLG crystals obtained from step c) or d), and f) drying a BLG-containing composition derived from, and preferably directly obtained from, step c), d), or e), which BLG-containing composition comprises BLG crystals and preferably having a crystallinity of BLG of at least 30%.

The initial protein solution is preferably a demineralised protein solution, and has preferably ratio between the conductivity and the total amount of protein of at most 0.3 and/or a UF permeate conductivity of at most 7 mS/cm.

These embodiments are particularly useful for making low mineral and low phosphorus edible BLG compositions in the form of high density powders Yet other preferred embodiments of the invention pertain to a method of preparing an edible composition comprising beta-lactoglobulin in isolated form, the method comprising the steps of a) providing an initial protein solution comprising BLG and at least one additional whey protein, said initial protein solution is supersaturated with respect to BLG and has a pH in the range of 5-6, said initial protein solution comprising:

70-100% w/w protein relative to total solids, 30-90% w/w BLG relative to total protein, and preferably 30-70% w/w BLG, 5-50% w/w ALA relative to total protein, and preferably 8-35% w/w ALA, 0-25% w/w CMP relative to total protein.

at least 10% w/w protein relative to the total weight of the initial protein solution, b) crystallising BLG in the supersaturated initial protein solution, preferably by addition of crystallisation seeds, thereby obtaining a BLG crystal-containing solution, c) separating BLG crystals from the remaining liquid of the BLG crystal-containing solution, d) optionally, washing the separated BLG crystals obtained from step c), e) optionally, re-crystallising BLG crystals obtained from step c) or d), and f) drying a BLG-containing composition derived from step c), d), or e), which BLG-containing composition does not comprise BLG crystals.

The initial protein solution is preferably a demineralised protein solution, and has preferably ratio between the conductivity and the total amount of protein of at most 0.3 and/or a UF permeate conductivity of at most 7 mS/cm.

In these embodiments BLG crystals are dissolved prior to drying.

In some preferred embodiments the present method is implemented as batch process. Alternatively, and sometimes preferably, the method may be implemented as semi-batch process. In other preferred embodiments the method is implemented as a continuous process.

An advantage of the present method is that it is much faster than comparable methods for BLG crystallisation of the prior art. The duration from the initial adjustment of the protein feed to the completion of the separation of step c may be at most 10 hours, preferably at most 4 hours, more preferably at most 2 hours, and even more preferably at most 1 hour.

In some preferred embodiments of the invention the BLG crystal-containing solution that remains after the BLG crystals have been separated in step c) is collected and used directly as an ingredient in food production or is subjected to further processing according to PCT application WO2020/002,422 which is incorporated herein by reference for all purposes. If so, the present method provides an edible, alpha-lactalbumin enriched whey protein composition in addition to the edible BLG composition.

The edible BLG composition preferably contains BLG in an amount of at least 30% w/w relative to the total amount of protein and an amount of total protein of at least 30% w/w relative to total solids.

In some preferred embodiments of the invention the BLG of the edible BLG composition has a degree of lactosylation of at most 1. Preferably, the BLG of the edible BLG composition has a degree of lactosylation of at most 0.6. More preferably, the BLG of the edible BLG composition has a degree of lactosylation of at most 0.4. Even more preferably, the BLG of the edible BLG composition has a degree of lactosylation of at most 0.2. Most preferably, the BLG of the edible BLG composition has a degree of lactosylation of at most 0.1, such as e.g. preferably at most 0.01.

In some preferred embodiments of the invention the BLG of the edible BLG composition comprises at least 90% w/w non-lactosylated BLG, preferably at least 95% w/w non-lactosylated BLG, and even more preferably at least 98% w/w non-lactosylated BLG.

The percentage of non-lactosylated BLG is determined according to Example 9.1 of WO2018/115520.

In some preferred embodiments of the invention the BLG of the edible BLG composition has a crystallinity of at least 10% w/w. Preferably, the BLG of the edible BLG composition has a crystallinity of at least 20% w/w. More preferably the BLG of the edible BLG composition has a crystallinity of at least 30% w/w. Even more preferably the BLG of the edible BLG composition has a crystallinity of at least 40% w/w.

Even higher crystallinities are often preferred. Thus, in some preferred embodiments of the invention the BLG of the edible BLG composition has a crystallinity of at least 50% w/w. Preferably, the BLG of the edible BLG composition has a crystallinity of at least 60% w/w. More preferably, the BLG of the edible BLG composition has a crystallinity of at least 70% w/w. Even more preferably, the BLG of the edible BLG composition has a crystallinity of at least 80% w/w. Most preferred, the BLG of the edible BLG composition has a crystallinity of at least 90% w/w, and preferably at least 95% w/w.

The crystallinity of BLG in a liquid having pH in the range of 5-6 is measured according to Example 9.7 of WO2018/115520. The crystallinity of BLG in a powdered material is measured according to Example 9.8 of WO2018/115520. If the edible composition is a dry product but not in the form a powder, it must be converted to a powder, e.g. by grinding or milling, before it is subjected to the method of Example 9.8 of WO2018/115520.

In some preferred embodiments of the invention the edible BLG composition is a WPC, WPI, SPC, or SPI, in which at least some of the BLG is on crystal form. The edible BLG composition may e.g. comprise at most 90% w/w BLG relative to the total amount of protein, and has a crystallinity of BLG of at least 10%. For example, the edible BLG composition may comprise at most 80% w/w BLG relative to the total amount of protein, and have a crystallinity of BLG of at least 10%. The edible BLG composition may e.g. comprise 30-70% w/w BLG relative to the total amount of protein, and have a crystallinity of BLG of at least 10%.

In other preferred embodiments of the invention, the edible BLG composition comprises at most 90% w/w BLG relative to the total amount of protein, and have a crystallinity of BLG of at least 30%. Preferably, the edible BLG composition may comprise at most 80% w/w BLG relative to the total amount of protein, and have a crystallinity of BLG of at least 30%. Even more preferably, the edible BLG composition may comprise 30-70% w/w BLG relative to the total amount of protein, and have a crystallinity of BLG of at least 30%.

The present inventors have found that the present invention makes it possible to prepare an edible whey protein product having a very low content of phosphorus and other minerals, which is advantageous for patients suffering from kidney diseases or otherwise having a reduced kidney function.

The edible BLG composition is preferably a low phosphorus composition.

In the context of the present invention the term "low phosphorus" pertains to a composition, e.g. a liquid, a powder or another food product, that has a total content of phosphorus of at most 100 mg phosphorus per 100 g protein. Preferably, a low phosphorus composition has a total content of at most 80 mg phosphorus per 100 g protein. More preferably, a low phosphorus composition may have a total content of at most 50 mg phosphorus per 100 g protein. Even more preferably, a low phosphorus composition may have a total content of phosphorus of at most 20 mg phosphorus per 100 g protein. Even more preferably, a low phosphorus composition may have a total content of phosphorus of at most 5 mg phosphorus per 100 g protein. Low phosphorus compositions according to the present invention may be used as a food ingredient for the production of a food product for patients groups that have a reduced kidney function.

Thus, in some particularly preferred embodiments of the invention the edible BLG composition comprises at most 80 mg phosphorus per 100 g protein. Preferably, the edible BLG composition comprises at most 30 mg phosphorus per 100 g protein. More preferably, the edible BLG composition comprises at most 20 mg phosphorus per 100 g protein. Even more preferably, the edible BLG composition comprises at most 10 mg phosphorus per 100 g protein. Most preferably, the edible BLG composition comprises at most 5 mg phosphorus per 100 g protein.

The content of phosphorus relates to the total amount of elemental phosphorus of the composition in question and is determined according to Example 9.5 of WO2018/115520.

In other preferred embodiments of the invention the edible BLG composition is a low mineral composition.

In the context of the present invention the term "low mineral" pertains to a composition, e.g. a liquid, a powder or another food product, that has at least one, preferably two, and even more preferably all, of the following:
an ash content of at most 1.2% w/w relative to total solids,
a total content of calcium and magnesium of at most 0.3% w/w relative to total solids,
a total content of sodium and potassium of at most 0.10% w/w relative to total solids,
a total content of phosphorus of at most 100 mg phosphorus per 100 g protein.

Preferably, a low mineral composition has at least one, preferably two or more, and even more preferably all, of the following:
an ash content of at most 0.7% w/w relative to total solids,
a total content of calcium and magnesium of at most 0.2% w/w relative to total solids,
a total content of sodium and potassium of at most 0.08% w/w relative to total solids,
a total content of phosphorus of at most 80 mg phosphorus per 100 g protein.

Even more preferably, a low mineral composition has at least one, preferably two or more, and even more preferably all, of the following:
an ash content of at most 0.5% w/w relative to total solids,
a total content of calcium and magnesium of at most 0.15% w/w relative to total solids,
a total content of sodium and potassium of at most 0.06% w/w relative to total solids,
a total content of phosphorus of at most 50 mg phosphorus per 100 g protein.

It is particularly preferred that a low mineral composition has the following:
an ash content of at most 0.5% w/w relative to total solids,
a total content of calcium and magnesium of at most 0.15% w/w relative to total solids,
a total content of sodium and potassium of at most 0.06% w/w relative to total solids,
a total content of phosphorus of at most 50 mg phosphorus per 100 g protein.

In some preferred embodiments of the invention the edible BLG composition comprises a total amount of protein of at least 25% w/w relative to the total solids of the edible BLG composition. Preferably, the edible BLG composition comprises a total amount of protein of at least 50% w/w relative to the total solids of the edible BLG composition. More preferred, the edible BLG composition comprises a total amount of protein of at least 75% w/w relative to the total solids of the edible BLG composition. Even more preferred, the edible BLG composition comprises a total amount of protein of at least 90% w/w relative to the total solids of the edible BLG composition.

In some preferred embodiments of the invention the total amount of protein of the edible BLG composition is in the range of 25-100% w/w relative to total solids. Preferably, the total amount of protein of the edible BLG composition is in the range of 50-100% w/w. More preferred, the total amount of protein of the edible BLG composition is in range of 75-100% w/w relative to total solids. Even more preferred, the total amount of protein of the edible BLG composition is in the range of 90-100% w/w relative to total solids.

In some preferred embodiments of the invention the edible BLG composition comprises at least 75% w/w BLG relative to the total amount of protein. Preferably, the edible BLG composition may comprise at least 90% w/w BLG relative to the total amount of protein. More preferably, the edible BLG composition may comprise at least 95% w/w BLG relative to the total amount of protein. Even more preferably, the edible BLG composition may comprise at least 97% w/w BLG relative to the total amount of protein. Most preferably, the edible BLG composition comprises approx. 100% w/w BLG relative to the total amount of protein.

In some preferred embodiments of the invention the edible BLG composition contains at most 10% w/w carbohydrate, preferably at most 5% w/w carbohydrate, more preferably at most 1% w/w carbohydrate, and even more preferably at most 0.1% w/w carbohydrate.

The edible BLG composition may also comprise lipid, e.g. in the form of triglyceride and/or other lipid types such as phospholipids.

In some embodiments of the invention the edible BLG composition comprises a total amount of lipid of at most 1% w/w relative to total solids. Preferably, the edible BLG composition comprises a total amount of lipid of at most 0.5% w/w relative to total solids. More preferably, the edible BLG composition comprises a total amount of lipid of at most 0.1% w/w relative to total solids. Even more preferably, the edible BLG composition comprises a total amount of lipid of at most 0.05% w/w relative to total solids. Most preferably, the edible BLG composition comprises a total amount of lipid of at most 0.01% w/w relative to total solids.

In some preferred embodiments of the invention the edible BLG composition is a dry composition, and e.g. a powder. It is particularly preferred that the edible BLG composition is a spray-dried powder.

The present inventors have observed that edible BLG compositions in powder form in which at least some of the BLG was in crystal form when dried have a higher density than comparable BLG composition without BLG crystals (see Example 7). This high density effect is very surprisingly also observed for edible BLG compositions in powder form which are obtained from spray-dried BLG crystal slurries.

Thus, in some preferred embodiments of the invention the edible BLG composition in powder form has a bulk density of at least 0.40 g/mL. Preferably the edible BLG composition in powder form has a bulk density of at least 0.45 g/mL. More preferably the edible BLG composition in powder form has a bulk density of at least 0.50 g/mL. It is even more preferred that the edible BLG composition in powder form has a bulk density of at least 0.6 g/mL. The edible BLG composition in powder form may e.g. have a bulk density of at least 0.7 g/mL.

The advantage of bulk density both applies to powders of edible BLG compositions in which BLG is nearly the only protein present and to powders of edible BLG compositions wherein the concentration of BLG has not been enriched relative to the other proteins that were present in the initial protein solution. The invention therefore provides high density powders of both isolated BLG and crude whey protein, which comprises significant amounts of ALA and other whey proteins in addition to BLG.

In some preferred embodiments of the invention the edible BLG composition in powder form has a bulk density of at least 0.45 g/mL and comprises at least 70% w/w protein relative to the total weight of the composition. More preferably the edible BLG composition in powder form has a bulk density of at least 0.50 g/mL and comprises at least 70% w/w protein relative to the total weight of the composition. It is even more preferred that the edible BLG composition in powder form has a bulk density of at least 0.6 g/mL and comprises at least 70% w/w protein relative to the total weight of the composition. The edible BLG composition in powder form may e.g. have a bulk density of at least 0.7 g/mL and comprises at least 70% w/w protein relative to the total weight of the composition.

In other preferred embodiments of the invention the edible BLG composition in powder form has a bulk density of at least 0.45 g/mL and comprises at least 80% w/w protein relative to the total weight of the composition. More preferably the edible BLG composition in powder form has a bulk density of at least 0.50 g/mL and comprises at least 80% w/w protein relative to the total weight of the composition. It is even more preferred that the edible BLG composition in powder form has a bulk density of at least 0.6 g/mL and comprises at least 80% w/w protein relative to the total weight of the composition. The edible BLG composition in powder form may e.g. have a bulk density of at least 0.7 g/mL and comprises at least 80% w/w protein relative to the total weight of the composition.

The edible BLG composition in powder form may e.g. have a bulk density in the range of 0.40-1.5 g/mL and comprises at least 80% w/w protein relative to the total weight of the composition. Preferably, the powdered, edible BLG composition has a bulk density in the range of 0.45-1.0 g/mL and comprises at least 80% w/w protein relative to the total weight of the composition. More preferably the powdered, edible BLG composition may have a bulk density in the range of 0.50-0.9 g/mL and comprises at least 80% w/w protein relative to the total weight of the composition. It is even more preferred that the powdered, edible BLG composition has a bulk density in the range of 0.6-0.9 g/mL and comprises at least 80% w/w protein relative to the total weight of the composition. The powdered, edible BLG composition may e.g. have a bulk density in the range of 0.6-0.8 g/mL and comprises at least 80% w/w protein relative to the total weight of the composition.

The inventors have found that the high density powders of the invention advantageously allows for more cost-effective packaging and logistics of the powder as less packaging material is required per kg powder and more powder (mass) can be transported by a given container or truck.

The edible BLG composition in powder form may e.g. have a bulk density in the range of 0.40-1.5 g/mL. Preferably, the powdered, edible BLG composition has a bulk density in the range of 0.45-1.0 g/mL. More preferably the powdered, edible BLG composition may have a bulk density in the range of 0.50-0.9 g/mL. It is even more preferred that the powdered, edible BLG composition has a bulk density in the range of 0.6-0.9 g/mL. The powdered, edible BLG composition may e.g. have a bulk density in the range of 0.6-0.8 g/mL.

In other preferred embodiments of the invention the edible BLG composition in powder form has a bulk density in the range of 0.50-1.5 g/mL. Preferably, the powdered, edible BLG composition has a bulk density in the range of 0.55-1.0 g/mL. More preferably the powdered, edible BLG composition may have a bulk density in the range of 0.60-1.0 g/mL. It is even more preferred that the powdered, edible BLG composition has a bulk density in the range of 0.65-1.0 g/mL. The powdered, edible BLG composition may preferably have a bulk density in the range of 0.70-1.0 g/mL.

The edible BLG composition in powder form may e.g. have a bulk density in the range of 0.40-1.5 g/mL and comprises at least 70% w/w protein relative to the total weight of the composition. Preferably, the powdered, edible BLG composition has a bulk density in the range of 0.45-1.0 g/mL and comprises at least 70% w/w protein relative to the total weight of the composition. More preferably the powdered, edible BLG composition may have a bulk density in the range of 0.50-0.9 g/mL and comprises at least 70% w/w protein relative to the total weight of the composition. It is even more preferred that the powdered, edible BLG composition has a bulk density in the range of 0.6-0.9 g/mL and comprises at least 70% w/w protein relative to the total weight of the composition. The powdered, edible BLG composition may e.g. have a bulk density in the range of 0.6-0.8 g/mL and comprises at least 70% w/w protein relative to the total weight of the composition.

The edible BLG composition in powder form may e.g. have a bulk density in the range of 0.40-1.5 g/mL and comprises at least 80% w/w protein relative to the total weight of the composition. Preferably, the powdered, edible BLG composition has a bulk density in the range of 0.45-1.0 g/mL and comprises at least 80% w/w protein relative to the total weight of the composition. More preferably the powdered, edible BLG composition may have a bulk density in the range of 0.50-0.9 g/mL and comprises at least 80% w/w protein relative to the total weight of the composition. It is even more preferred that the powdered, edible BLG composition has a bulk density in the range of 0.6-0.9 g/mL and comprises at least 80% w/w protein relative to the total weight of the composition. The powdered, edible BLG composition may e.g. have a bulk density in the range of 0.6-0.8 g/mL and comprises at least 80% w/w protein relative to the total weight of the composition.

In other preferred embodiments of the invention the edible BLG composition in powder form has a bulk density in the range of 0.50-1.5 g/mL and comprises at least 70% w/w protein relative to the total weight of the composition. Preferably, the powdered, edible BLG composition has a bulk density in the range of 0.55-1.0 g/mL and comprises at least 70% w/w protein relative to the total weight of the composition. More preferably the powdered, edible BLG composition may have a bulk density in the range of 0.60-1.0 g/mL and comprises at least 70% w/w protein relative to the total weight of the composition. It is even more preferred that the powdered, edible BLG composition has a bulk density in the range of 0.65-1.0 g/mL and comprises at least 70% w/w protein relative to the total weight of the composition. The powdered, edible BLG composition may preferably have a bulk density in the range of 0.70-1.0 g/mL and comprises at least 70% w/w protein relative to the total weight of the composition.

In other preferred embodiments of the invention the edible BLG composition in powder form has a bulk density in the range of 0.50-1.5 g/mL and comprises at least 80% w/w protein relative to the total weight of the composition. Preferably, the powdered, edible BLG composition has a bulk density in the range of 0.55-1.0 g/mL and comprises at least 80% w/w protein relative to the total weight of the composition. More preferably the powdered, edible BLG composition may have a bulk density in the range of 0.60-1.0 g/mL and comprises at least 80% w/w protein relative to the total weight of the composition. It is even more preferred that the powdered, edible BLG composition has a bulk density in the range of 0.65-1.0 g/mL and comprises at least 80% w/w protein relative to the total weight of the composition. The powdered, edible BLG composition may preferably have a bulk density in the range of 0.70-1.0 g/mL and comprises at least 80% w/w protein relative to the total weight of the composition.

The bulk density of a powder is measured according to Example 9.3 of WO2018/115520.

The present inventors have seen indications that the BLG compositions according to the present invention have better long-term stability than similar BLG compositions. This is particularly the case when at least some of the BLG is present in the form of BLG crystals, which seem to offer a better storage stability of the BLG molecules.

In some preferred embodiments of the invention the dry BLG composition has a furosine value of at most 80 mg/100 g protein after 60 days at 30 degrees C., preferably at most 60 mg/100 g protein, more preferably at most 40 mg/100 g protein, and even more preferably at most 20 mg/100 g protein. Most preferably, the dry BLG composition has a furosine value of at most 10 mg/100 g protein after 60 days at 30 degrees C.

In some preferred embodiments of the invention the dry BLG composition has a furosine value of at most 80 mg/100 g protein, preferably at most 60 mg/100 g protein, more preferably at most 40 mg/100 g protein, and even more preferably at most 20 mg/100 g protein. Most preferably, the dry BLG composition has a furosine value of at most 10 mg/100 g protein. Preferably the dry BLG composition has a furosine value of 0 mg/100 g protein.

In some preferred embodiments of the invention the BLG of the dry BLG composition has a degree of lactosylation of at most 1 after 60 days at 30 degrees C., preferably at most 0.6, more preferably 0.2, even more preferably at most 0.1, and most preferably at most 0.01.

In some preferred embodiments of the invention the edible BLG composition is a liquid composition. A liquid edible BLG composition preferably comprises at least 20% w/w water, more preferably at least 30% w/w water, even more preferably at least 40% w/w.

The liquid edible BLG composition may e.g. comprises in the range of 20-90% w/w water, more preferably in the range of 30-80% w/w water, even more preferably at least 40% w/w.

The present inventors have found that edible BLG compositions according to the present invention have surprisingly low degree of protein denaturation, even spray-drying has been used to prepare an edible BLG powder composition (see Example 11 of WO2018/115520).

Thus, in some preferred embodiments of the invention the edible BLG composition has a degree of protein denaturation of at most 10%. Preferably, the edible BLG composition has a degree of protein denaturation of at most 5%. More preferably, the edible BLG composition has a degree of protein denaturation of at most 2%. Even more preferably, the edible BLG composition has a degree of protein denaturation of at most 1%. Even more preferably, the edible BLG composition has a degree of protein denaturation of at most 0.5%.

In some preferred embodiments of the invention, the edible BLG composition is a dry powder, and preferably a spray-dried powder, and has a degree of protein denaturation of at most 2%, and preferably at most 1.5%. More preferably, the dry edible BLG composition, e.g. in the form of a spray-dried powder, has a degree of protein denaturation of at most 1.0%. Even more preferably, the dry edible BLG composition, e.g. in the form of a spray-dried powder, has a degree of protein denaturation of at most 0.8%. Even more preferably, the dry edible BLG composition, e.g. in the form of a spray-dried powder, has a degree of protein denaturation of at most 0.5%.

In some preferred embodiments of the invention, the edible BLG composition comprises:

At most 6% w/w water

At least 80% total protein relative to total solids

At least 95% BLG relative to total protein, and said edible BLG composition:

Is a dry powder, and

Has a bulk density of at least 0.50 g/mL, and preferably at least 0.60 g/mL.

In other preferred embodiments of the invention, the edible BLG composition comprises:

At most 6% w/w water

At least 80% total protein relative to total solids

At least 95% BLG relative to total protein, and said edible BLG composition:

Is a dry powder,

Has a bulk density of at least 0.50 g/mL, and preferably at least 0.60 g/mL, and Has a crystallinity of BLG of at least 20% and preferably at least 40%.

In further preferred embodiments of the invention, the edible BLG composition comprises:

At most 6% w/w water

At least 80% total protein relative to total solids

At least 95% BLG relative to total protein, and said edible BLG composition:

Is a dry powder,

Has a bulk density of at least 0.50 g/mL, and preferably at least 0.60 g/mL, and Has a degree of protein denaturation of at most 2%, and preferably at most 1.0%.

In further preferred embodiments of the invention, the edible BLG composition comprises:

At most 6% w/w water

At least 80% total protein relative to total solids,

At least 95% BLG relative to total protein, at most 80 mg phosphorus per 100 g protein.

said edible BLG composition:

Is a dry powder.

In yet preferred embodiments of the invention, the edible BLG composition comprises:

At most 6% w/w water

At least 90% total protein relative to total solids,

At least 97% BLG relative to total protein, at most 50 mg phosphorus per 100 g protein.

said edible BLG composition:

Is a dry powder.

In other preferred embodiments of the invention, the edible BLG composition comprises:

At most 6% w/w water

At least 80% total protein relative to total solids, and preferably at least 90% total protein relative to total solids, 30-90% BLG relative to total protein, 8-25% w/w ALA relative to total protein, said edible BLG composition:

Is a dry powder, and

Has a crystallinity of BLG of at least 20% and preferably at least 40%.

In some preferred embodiments of the invention, the edible BLG composition comprises:

20-80% w/w water, and preferably 20-60% w/w water,

At least 80% total protein relative to total solids, and preferably at least 90% total protein At least 95% BLG relative to total protein, at most 80 mg phosphorus per 100 g protein.

said edible BLG composition:

has a crystallinity of BLG of at least 20%, preferably at least 40, and optionally, has a degree of protein denaturation of at most 2%, and preferably at most 1.0%.

Edible compositions according to these embodiments are particularly useful for preparing edible BLG compositions in dried form, and are particularly suitable for spray-drying and preparation of a high density whey protein powder having the normal concentration profile of whey protein species whey protein but containing at least some of the BLG in the form of dried BLG crystals.

In other preferred embodiments of the invention, the edible BLG composition comprises:

20-80% w/w water, and preferably 20-60% w/w water,

At least 80% total protein relative to total solids, and preferably at least 90% total protein relative to total solids, 30-79% BLG relative to total protein, 8-25% w/w ALA relative to total protein, said edible BLG composition:

Has a crystallinity of BLG of at least 20% and preferably at least 40%.

Edible compositions according to these embodiments are particularly useful for preparing edible BLG compositions in dried form, and are particularly suitable for spray-drying and preparation of a high density whey protein powder having the normal concentration profile of whey protein species whey protein but containing at least some of the BLG in the form of dried BLG crystals.

The present method is preferably performed at a temperature in the range of 1-65 degrees C., preferably 2-50 degrees C., more preferably in the range of 3-20 degrees C., even more preferably in the range of 4-15 degrees C.

Particularly preferred embodiments of the invention are described in the following numbered embodiments:

Numbered embodiment 1. A method of preparing an edible composition comprising beta-lactoglobulin (BLG), preferably in crystallised and/or isolated form, the method comprising the steps of:

a) preparing an initial protein solution comprising BLG said initial protein solution is supersaturated with respect to BLG and has a pH in the range of 5-6, b) crystallising BLG in the supersaturated, initial protein solution, preferably in salting-in mode, thereby obtaining a BLG crystal-containing solution, and c) optionally, separating BLG crystals from the remaining liquid of the BLG crystal-containing solution, wherein step a) involves preparing the initial protein solution by combining, and preferably mixing, one or more type A protein feed(s) with one or more type B protein feed(s), and wherein:

a "type A protein feed" is defined as a protein feed which comprises BLG and has a pH of at least 5.6, and a "type B protein feed" is defined as a protein feed which comprises BLG and has a pH of at most 5.4.

Numbered embodiment 2. The method according to any of the preceding numbered embodiments, wherein:

the type A protein feed(s) would, if combined, have a pH of at least 5.6, more preferably at least 5.7, even more preferably at least 5.8, and most preferably at least 5.9, and the type B protein feed(s) would, if combined, have a pH of at most 5.4, more preferably at most 5.3, even more preferably 5.2, and most preferably 5.1.

Numbered embodiment 3. The method according to any of the preceding numbered embodiments, wherein:

the type A protein feed(s) would, if combined, have a pH of at least 6.0, more preferably at least 6.1, even more preferably at least 6.2, and most preferably at least 6.3, and the type B protein feed(s) would, if combined, have a pH of at most 5.0, more preferably at most 4.9, even more preferably 4.8, and most preferably 4.7.

Numbered embodiment 4. The method according to any of the preceding numbered embodiments, wherein the type A protein feed(s) would, if combined, have a pH of in the range of 5.6-10, more preferably 5.8-8, even more preferably 6.0-7 and most preferably 6.1-6.5.

Numbered embodiment 5. The method according to any of the preceding numbered embodiments, wherein the type A protein feeds would, if combined, have a pH of in the range of 6.0-8, more preferably 6.1-7.5, even more preferably 6.2-7.0 and most preferably 6.2-6.5.

Numbered embodiment 6. The method according to any of the preceding numbered embodiments, wherein the type B protein feeds would, if combined, have a pH of in the range of 2-5.4, more preferably 3-5.2, even more preferably 4-5.0, and most preferably 4.5-4.9.

Numbered embodiment 7. The method according to any of the preceding numbered embodiments, wherein the type B protein feeds would, if combined, have a pH of in the range of 4.0-5.0, more preferably 4.1-4.9, even more preferably 4.3-4.8, and most preferably 4.5-4.8.

Numbered embodiment 8. The method according to any of the preceding numbered embodiments, wherein at least one of the one or more type A protein feeds is not saturated with respect to BLG, more preferably none of the one or more type A protein feeds is not saturated with respect to BLG.

Numbered embodiment 9. The method according to any of the preceding numbered embodiments, wherein at least one of the one or more type B protein feeds is not saturated with respect to BLG, more preferably none of the one or more type B protein feeds is not saturated with respect to BLG.

Numbered embodiment 10. The method according to any of the preceding numbered embodiments, wherein none of the type A or type B protein feeds are saturated with respect to BLG.

Numbered embodiment 11. The method according to any of the preceding numbered embodiments, wherein at least one of the one or more type A protein feeds does not contain BLG crystals, more preferably none of the one or more type A protein feeds contain BLG crystals.

Numbered embodiment 12. The method according to any of the preceding numbered embodiments, wherein at least one of the one or more type B protein feeds do not contain BLG crystals, more preferably none of the one or more type B protein feeds contain BLG crystals.

Numbered embodiment 13. The method according to any of the preceding numbered embodiments, wherein none of the type A or type B protein feeds contain BLG crystals.

Numbered embodiment 14. The method according to any of the preceding numbered embodiments, wherein at least one of the one or more type A protein feeds is not supersaturated with respect to BLG, more preferably none of the one or more type A protein feeds are supersaturated with respect to BLG.

Numbered embodiment 15. The method according to any of the preceding numbered embodiments, wherein none of the type A or type B protein feeds contain BLG crystals.

Numbered embodiment 16. The method according to any of the preceding numbered embodiments, wherein at least one of the one or more type A protein feeds is not supersaturated with respect to BLG, and more preferably none of the one or more type A protein feeds are supersaturated with respect to BLG.

Numbered embodiment 17. The method according to any of the preceding numbered embodiments, wherein at least one of the one or more type B protein feeds is not supersaturated with respect to BLG, and more preferably none of the one or more type are supersaturated with respect to BLG.

Numbered embodiment 18. The method according to any of the preceding numbered embodiments, wherein at least one of the one or more type A protein feeds of step a) are saturated with respect to BLG.

Numbered embodiment 19. The method according to any of the preceding numbered embodiments, wherein at least one of the one or more type B protein feeds of step a) are saturated with respect to BLG.

Numbered embodiment 20. The method according to any of the preceding numbered embodiments, wherein type A and type B protein feed(s) that do not contain BLG crystals contribute with at least 1% w/w of the BLG content of the initial protein solution, more preferably at least 10% w/w, even more preferably at least 20% w/w, and most preferably at least 40% w/w.

Numbered embodiment 21. The method according to any of the preceding numbered embodiments, wherein type A and type B protein feed(s) that do not contain BLG crystals contribute with at least 50% w/w of the BLG content of the initial protein solution, more preferably at least 70% w/w, even more preferably at least 80% w/w, and most preferably at least 90% w/w.

Numbered embodiment 22. The method according to any of the preceding numbered embodiments, wherein type A and type B protein feed(s) that do not contain BLG crystals contribute with at least 92% w/w of the BLG content of the initial protein solution, more preferably at least 94% w/w, even more preferably at least 96% w/w, and most preferably at least 99% w/w.

Numbered embodiment 23. The method according to any of the preceding numbered embodiments, wherein type A and type B protein feed(s) that are not supersaturated with respect to BLG contribute with at least 1% w/w of the BLG content of the initial protein solution, more preferably at least 10% w/w, even more preferably at least 20% w/w, and most preferably at least 40% w/w.

Numbered embodiment 24. The method according to any of the preceding numbered embodiments, wherein type A and type B protein feed(s) that are not supersaturated with respect to BLG contribute with at least 50% w/w of the BLG content of the initial protein solution, more preferably at least 70% w/w, even more preferably at least 80% w/w, and most preferably at least 90% w/w.

Numbered embodiment 25. The method according to any of the preceding numbered embodiments, wherein type A and type B protein feed(s) that are not supersaturated with respect to BLG contribute with at least 92% w/w of the BLG content of the initial protein solution, more preferably at least 94% w/w, even more preferably at least 96% w/w, and most preferably at least 99% w/w.

Numbered embodiment 26. The method according to any of the preceding numbered embodiments, wherein the type A protein feed(s) would, if combined, have a temperature of at most 60 degrees C., more preferably at most 50 degrees C., even more preferably at most 40 degrees C. and most preferably at most 30 degrees C.

Numbered embodiment 27. The method according to any of the preceding numbered embodiments, wherein the type A protein feed(s) would, if combined, have a temperature of at most 20 degrees C., more preferably at most 15 degrees C., even more preferably at most 10 degrees C. and most preferably at most 5 degrees C.

Numbered embodiment 28. The method according to any of the preceding numbered embodiments, wherein the type B protein feed(s) would, if combined, have a temperature of at most 60 degrees C., more preferably at most 50 degrees C., even more preferably at most 40 degrees C. and most preferably at most 30 degrees C.

Numbered embodiment 29. The method according to any of the preceding numbered embodiments, wherein the type B protein feed(s) would, if combined, have a temperature of at most 20 degrees C., more preferably at most 15 degrees C., even more preferably at most 10 degrees C. and most preferably at most 5 degrees C.

Numbered embodiment 30. The method according to any of the preceding numbered embodiments, wherein the of type A protein feed(s) would, if combined, comprises at least 1% w/w BLG relative to the weight of the combination of type A protein feed(s), more preferably at least 3% w/w, even more preferably at least 5% w/w, and most preferably at least 7% w/w BLG relative to the weight of the combination of type A protein feed(s).

Numbered embodiment 31. The method according to any of the preceding numbered embodiments, wherein the type A protein feed(s) would, if combined, comprise 1-45% w/w BLG relative to the weight of the combination of type A protein feed(s), more preferably 3-40% w/w, even more preferably 5-36% w/w, and most preferably 7-34% w/w BLG relative to the weight of the combination of type A protein feed(s).

Numbered embodiment 32. The method according to any of the preceding numbered embodiments, wherein the type B protein feed(s) would, if combined, comprise at least 1% w/w BLG relative to the weight of combination of type B protein feed(s), more preferably at least 3% w/w, even more preferably at least 5% w/w, and most preferably at least 7% w/w BLG relative to the weight of the combination of type B protein feed(s).

Numbered embodiment 33. The method according to any of the preceding numbered embodiments, wherein the type B protein feed(s) would, if combined, comprise 1-45% w/w BLG relative to the weight of the combination of type B protein feed(s), more preferably 3-40% w/w, even more preferably 5-36% w/w, and most preferably 7-34% w/w BLG relative to the weight of the combination of type B protein feed(s).

Numbered embodiment 34. The method according to any of the preceding numbered embodiments, wherein the initial protein solution comprises a total amount of type A protein feed in the range of 1-99% w/w relative to the weight of the initial protein solution, more preferably 10-80% w/w, even more preferably 20-70% w/w, and most preferably 30-60% w/w.

Numbered embodiment 35. The method according to any of the preceding numbered embodiments, wherein the initial protein solution comprises a total amount of type B protein feed(s) in the range of 1-99% w/w relative to the weight of the initial protein solution, more preferably 10-80% w/w, even more preferably 20-70% w/w, and most preferably 30-60% w/w.

Numbered embodiment 36. The method according to any of the preceding numbered embodiments, wherein the initial protein solution comprises:

a total amount of type A protein feed(s) in the range of 5-90% w/w relative to the weight of the initial protein solution, more preferably 10-80% w/w, even more preferably 20-70% w/w, and most preferably 30-60% w/w, and a total amount of type B protein feed(s) in the range of 5-90% w/w relative to the weight of the initial protein solution, more preferably 10-80% w/w, even more preferably 20-70% w/w, and most preferably 30-60% w/w.

Numbered embodiment 37. The method according to any of the preceding numbered embodiments, wherein the initial protein solution comprises:

a total amount of type A protein feed(s) having a pH of 5.8-8 in the range of 5-90% w/w relative to the weight of the initial protein solution, more preferably 10-80% w/w, even more preferably 20-70% w/w, and most preferably 30-60% w/w, and a total amount of type B protein feed(s) having a pH of 3-5.2 in the range of 5-90% w/w relative to the weight of the initial protein solution, more preferably 10-80% w/w, even more preferably 20-70% w/w, and most preferably 30-60% w/w.

Numbered embodiment 38. The method according to any of the preceding numbered embodiments, wherein the initial protein solution comprises:

a total amount of type A protein feed(s) having a pH of 6.0-8 in the range of 5-90% w/w relative to the weight of the initial protein solution, more preferably 10-80% w/w, even more preferably 20-70% w/w, and most preferably 30-60% w/w, and a total amount of type B protein feed(s) having a pH of 3-5.0 in the range of 5-90% w/w relative to the weight of the initial protein solution, more preferably 10-80% w/w, even more preferably 20-70% w/w, and most preferably 30-60% w/w.

Numbered embodiment 39. The method according to any of the preceding numbered embodiments, wherein the initial protein solution comprises:

a total amount of type A protein feed(s) having a pH of 6.1-8 in the range of 5-90% w/w relative to the weight of the initial protein solution, more preferably 10-80% w/w, even more preferably 20-70% w/w, and most preferably 30-60% w/w, and a total amount of type B protein feed(s) having a pH of 3-4.9 of 5-90% w/w relative to the weight of the initial protein solution, more preferably 10-80% w/w, even more preferably 20-70% w/w, and most preferably 30-60% w/w.

Numbered embodiment 40. The method according to any of the preceding numbered embodiments wherein at least one of the protein feeds used for preparing the initial protein solution is in liquid form.

Numbered embodiment 41. The method according to any of the preceding numbered embodiments wherein all protein feeds are in liquid form.

Numbered embodiment 42. The method according to any of the preceding numbered embodiments wherein at least one of the protein feeds is in dry form, and preferably in powder form and at least one of the protein feeds is in liquid form.

Numbered embodiment 43. The method according to any of the preceding numbered embodiments wherein all the protein feeds are in dry form.

Numbered embodiment 44. The method according to any of the preceding numbered embodiments, furthermore comprising a step d) of washing BLG crystals, e.g. the separated crystals obtained from step c).

Numbered embodiment 45. The method according to any of the preceding numbered embodiments, furthermore comprising a step e) of re-crystallising BLG crystals, e.g. the BLG crystals obtained from step c) or d).

Numbered embodiment 46. The method according to any of the preceding numbered embodiments, furthermore comprising a step f) of drying a BLG-containing composition derived from step b), c), d), or e).

Numbered embodiment 47. The method according to any of the preceding numbered embodiments, wherein the initial protein solution of step a) comprises at least 1% w/w non-BLG solids relative to total solids.

Numbered embodiment 48. The method according to any of the preceding numbered embodiments, wherein the initial protein solution of step a) comprises at least 5% w/w ALA relative to the total amount of protein.

Numbered embodiment 49. The method according to any of the preceding numbered embodiments, wherein the initial protein solution of step a) comprises at least 15% w/w additional whey protein relative to the total amount of protein.

Numbered embodiment 50. The method according to any of the preceding numbered embodiments, wherein the initial protein solution of step a) comprises at most 40% w/w BLG relative to the total amount of protein.

Numbered embodiment 51. The method according to any of the preceding numbered embodiments, wherein the initial protein solution of step a) comprises at least 5% w/w BLG relative to the weight of the initial protein solution.

Numbered embodiment 52. The method according to any of the preceding numbered embodiments, wherein the protein feeds are prepared from a milk serum protein concentrate, a whey protein concentrate, milk serum protein isolate, and/or whey protein isolate.

Numbered embodiment 53. The method according to any of the preceding numbered embodiments, wherein the ratio between the conductivity and the total amount of protein of the initial protein solution is at most 0.3.

Numbered embodiment 54. The method according to any of the preceding numbered embodiments, wherein the UF permeate conductivity of the initial protein solution is at most 7 mS/cm.

Numbered embodiment 55. The method according to any of the preceding numbered embodiments, wherein one or more of the protein feed(s) are prepared by subjecting one or more whey protein materials to one or more of the following adjustments:

Adjusting the pH,

Reducing the conductivity

Reducing the temperature

Increasing the protein concentration, and

Adding an agent that reduces the water activity.

Numbered embodiment 56. The method according to any of the preceding numbered embodiments, wherein the preparation of one or more protein feeds involve adjusting the pH of a whey protein material.

Numbered embodiment 57. The method according to any of the preceding numbered embodiments, wherein the preparation of one or more protein feeds involve reducing the conductivity of the whey protein material.

Numbered embodiment 58. The method according to any of the preceding numbered embodiments, wherein the preparation of one or more protein feeds involve reducing the temperature of a whey protein material.

Numbered embodiment 59. The method according to any of the preceding numbered embodiments, wherein the preparation one or more protein feeds involve increasing the total protein concentration of a whey protein material.

Numbered embodiment 60. The method according to any of the preceding numbered embodiments, wherein one or more of the protein feeds are derived from a milk serum protein concentrate, a whey protein concentrate, milk serum protein isolate, and/or whey protein isolate.

Numbered embodiment 61. The method according to any of the preceding numbered embodiments, wherein one or more of the protein feeds comprise the protein of a milk serum protein concentrate, a whey protein concentrate, milk serum protein isolate, and/or whey protein isolate.

Numbered embodiment 62. The method according to any of the preceding numbered embodiments, wherein the crystallisation of BLG of step b) involves one or more of the following:

Waiting for crystallisation to take place,

Addition of crystallisation seeds,

Increasing the degrees of supersaturation of BLG even further, and/or

Mechanical stimulation.

Numbered embodiment 63. The method according to any of the preceding numbered embodiments, wherein the crystallisation of BLG of step b) involves addition of one or more additional protein feeds containing BLG while the crystallisation of BLG is on-going.

Numbered embodiment 64. The method according to any of the preceding numbered embodiments, wherein step c) comprises separating the BLG crystals from the remaining initial protein solution.

Numbered embodiment 65. The method according to numbered embodiment 64, wherein step c) comprises separating the BLG crystals to a solids content of at least 30% w/w, preferably at least 40% w/w and even more preferably at least 50% w/w.

Numbered embodiment 66. The method according to any of the numbered embodiments 44-65, wherein the washing in step d) involves contacting the separated BLG crystals with a washing liquid without completely dissolving the BLG crystals and subsequently separating the remaining BLG crystals from the washing liquid.

Numbered embodiment 67. The method according to numbered embodiment 66 wherein the washing of step d) dissolves at most 80% w/w of the initial amount of BLG crystals, preferably at most 50% w/w, and even more preferably at most 20% w/w of the initial amount of BLG crystals.

Numbered embodiment 68. The method according to any of the numbered embodiments 45-67 wherein the recrystallization step involves:

dissolving the separated BLG crystals in a recrystallization liquid, adjusting the recrystallization liquid to obtain supersaturation with respect to BLG, crystallising BLG in the supersaturated, adjusted recrystallization liquid, and separating BLG crystals from the remaining adjusted recrystallization liquid.

Numbered embodiment 69. The method according to any of the numbered embodiments 45-68, wherein BLG crystals of step d) are recrystallized at least 2 times Numbered embodiment 70. The method according to any of the numbered embodiments 46-69 wherein the drying step involves one or more of spray drying, freeze drying, spin-flash drier, rotary drying, and/or fluid bed drying.

Numbered embodiment 71. The method according to any of the preceding numbered embodiments, wherein:

in relation to type A protein feed:

if only a single type A protein feed is used it has, or if two or more type A protein feeds are used they would, if mixed, have a pH of at least 5.6, more preferably at least 5.7, even more preferably at least 5.8, and most preferably at least 5.9, and in relation to type B protein feed:

if only a single type B protein feed is used it has, or if two or more type B protein feeds are used they would, if mixed, have a pH of at most 5.4, more preferably at most 5.3, even more preferably 5.2, and most preferably 5.1.

Numbered embodiment 72. The method according to any of the preceding numbered embodiments, wherein:

in relation to type A protein feed:

if only a single type A protein feed is used it has, or if two or more type A protein feeds are used they would, if mixed, have a pH of at least 6.0, more preferably at least 6.1, even more preferably at least 6.2, and most preferably at least 6.3, and in relation to type B protein feed:

if only a single type B protein feed is used it has, or if two or more type B protein feeds are used they would, if mixed, have a pH of at most 5.0, more preferably at most 4.9, even more preferably 4.8, and most preferably 4.7.

Numbered embodiment 73. The method according to any of the preceding numbered embodiments, wherein in relation to type A protein feed:

if only a single type A protein feed is used it has, or if two or more type A protein feeds are used they would, if mixed, have a pH of in the range of 5.6-10, more preferably 5.8-8, even more preferably 6.0-7 and most preferably 6.1-6.5.

Numbered embodiment 74. The method according to any of the preceding numbered embodiments, wherein in relation to type A protein feed:

if only a single type A protein feed is used it has, or if two or more type A protein feeds are used they would, if mixed, have a pH of in the range of 6.0-8, more preferably 6.1-7.5, even more preferably 6.2-7.0 and most preferably 6.2-6.5.

Numbered embodiment 75. The method according to any of the preceding numbered embodiments, wherein in relation to type B protein feed:

if only a single type B protein feed is used it has, or if two or more type B protein feeds are used they would, if mixed, have a pH of in the range of 2-5.4, more preferably 3-5.2, even more preferably 4-5.0, and most preferably 4.5-4.9.

Numbered embodiment 76. The method according to any of the preceding numbered embodiments, wherein in relation to type B protein feed:

if only a single type B protein feed is used it has, or if two or more type B protein feeds are used they would, if mixed, have a pH of in the range of 4.0-5.0, more preferably 4.1-4.9, even more preferably 4.3-4.8, and most preferably 4.5-4.8.

Numbered embodiment 77. The method according to any of the preceding numbered embodiments, wherein at least one of the one or more type A protein feeds does not contain BLG crystals, more preferably none of the one or more type A protein feeds contain BLG crystals, and/or wherein at least one of the one or more type B protein feeds do not contain BLG crystals, more preferably none of the one or more type B protein feeds contain BLG crystals.

Numbered embodiment 78. The method according to any of the preceding numbered embodiments, wherein at least one of the one or more type A protein feeds is not supersaturated with respect to BLG, and more preferably none of the one or more type A protein feeds are supersaturated with respect to BLG and/or wherein at least one of the one or more type B protein feeds is not supersaturated with respect to BLG, and more preferably none of the one or more type are supersaturated with respect to BLG.

Numbered embodiment 79. The method according to any of the preceding numbered embodiments, wherein type A and type B protein feed(s) that do not contain BLG crystals contribute with at least 1% w/w of the BLG content of the initial protein solution, more preferably at least 10% w/w, even more preferably at least 20% w/w, and most preferably at least 40% w/w.

Numbered embodiment 80. The method according to any of the preceding numbered embodiments, wherein type A and type B protein feed(s) that do not contain BLG crystals contribute with at least 50% w/w of the BLG content of the initial protein solution, more preferably at least 70% w/w, even more preferably at least 80% w/w, and most preferably at least 90% w/w.

Numbered embodiment 81. The method according to any of the preceding numbered embodiments, wherein in relation to type A protein feed:

if only a single type A protein feed is used it has, or if two or more type A protein feeds are used they would, if mixed, have a temperature of at most 60 degrees C., more preferably at most 50 degrees C., even more preferably at most 40 degrees C. and most preferably at most 30 degrees C.

Numbered embodiment 82. The method according to any of the preceding numbered embodiments, wherein in relation to type B protein feed:

if only a single type B protein feed is used it has, or if two or more type B protein feeds are used they would, if mixed, have a temperature of at most 60 degrees C., more preferably at most 50 degrees C., even more preferably at most 40 degrees C. and most preferably at most 30 degrees C.

Numbered embodiment 83. The method according to any of the preceding numbered embodiments, wherein in relation to type A protein feed:

if only a single type A protein feed is used it comprises, or if two or more type A protein feeds are used they would, if mixed, comprise at least 1% w/w BLG relative to the total weight of type A protein feed, more preferably at least 3% w/w, even more preferably at least 5% w/w, and most preferably at least 7% w/w BLG relative to the total weight of type A protein feed.

Numbered embodiment 84. The method according to any of the preceding numbered embodiments, wherein in relation to type B protein feed:

if only a single type B protein feed is used it comprises, or if two or more type B protein feeds are used they would, if mixed, comprise at least 1% w/w BLG relative to the total weight of type B protein feed, more preferably at least 3% w/w, even more preferably at least 5% w/w, and most preferably at least 7% w/w BLG relative to the total weight of type B protein feed.

Numbered embodiment 85. The method according to any of the preceding numbered embodiments, wherein the initial protein solution comprises:

a total amount of type A protein feed(s) having a pH of 6.0-8 in the range of 5-90% w/w relative to the weight of the initial protein solution, more preferably 10-80% w/w, even more preferably 20-70% w/w, and most preferably 30-60% w/w, and a total amount of type B protein feed(s) having a pH of 3-5.0 in the range of 5-90% w/w relative to the weight of the initial protein solution, more preferably 10-80% w/w, even more preferably 20-70% w/w, and most preferably 30-60% w/w.

Numbered embodiment 86. The method according to any of the preceding numbered embodiments, wherein in relation to type A protein feed, if only a single type A protein feed is used it has, or if two or more type A protein feeds are used they would, if mixed, have:

a content of BLG of 4-32% w/w relative to the total weight of type A protein feed, more preferably 6-32% w/w, more preferably 8-30% w/w, even more preferably 10-28% w/w, and most preferably 12-26% w/w BLG relative to the total weight of type A protein feed, a pH of in the range of 5.6-10, more preferably 5.8-8, even more preferably 6.0-7 and most preferably 6.1-6.5, preferably, a temperature of at most 20 degrees C., more preferably at most 15 degrees C., even more preferably at most 10 degrees C. and most preferably at most 5 degrees C., preferably, a content of BLG in an amount of at least 30% w/w relative to the total amount of protein, more preferably at least 40% w/w, even more preferred at least 50% w/w, and most preferred at least 55% w/w, one or more of:

a conductivity of at most 7 mS/cm, even more preferably at most 5 mS/cm, and most preferably at most 3 mS/cm, and a ratio between the conductivity and the total amount of protein of at most 0.3, more preferably at most 0.25, most preferably at most 0.20.

and in relation to type B protein feed, if only a single type B protein feed is used it has, or if two or more type B protein feeds are used they would, if mixed, have:

a content of BLG of 4-32% w/w relative to the total weight of type B protein feed, more preferably 6-32% w/w, more preferably 8-30% w/w, even more preferably 10-28% w/w, and most preferably 12-26% w/w BLG relative to the total weight of type B protein feed, a pH of in the range of 2-5.4, more preferably 3-5.2, even more preferably 4-5.0, most preferably 4.5-4.9, preferably, a temperature of at most 20 degrees C., more preferably at most 15 degrees C., even more preferably at most 10 degrees C. and most preferably at most 5 degrees C., preferably, a content of BLG in an amount of at least 30% w/w relative to the total amount of protein, more preferably at least 40% w/w, even more preferred at least 50% w/w, and most preferred at least 55% w/w, one or more of:

a conductivity of at most 7 mS/cm, more preferably at most 5 mS/cm, and most preferably at most 3 mS/cm, and a ratio between the conductivity and the total amount of protein of at most 0.3, more preferably at most 0.25, most preferably at most 0.20.

Numbered embodiment 87. The method according to any of the preceding numbered embodiments, wherein in relation to type A protein feed, if only a single type A protein feed is used it has, or if two or more type A protein feeds are used they would, if mixed, have:

a content of BLG of 4-32% w/w relative to the total weight of type A protein feed, more preferably 6-32% w/w, more preferably 8-30% w/w, even more preferably 10-28% w/w, and most preferably 12-26% w/w BLG relative to the total weight of type A protein feed, a pH of in the range of 5.6-10, more preferably 5.8-8, even more preferably 6.0-7 and most preferably 6.1-6.5, preferably, a temperature of at most 20 degrees C., more preferably at most 15 degrees C., even more preferably at most 10 degrees C. and most preferably at most 5 degrees C., preferably, a content of BLG in an amount of at least 30% w/w relative to the total amount of protein, more preferably at least 40% w/w, even more preferred at least 50% w/w, and most preferred at least 55% w/w, one or more of:

a conductivity of at most 7 mS/cm, even more preferably at most 5 mS/cm, and most preferably at most 3 mS/cm, and a ratio between the conductivity and the total amount of protein of at most 0.3, more preferably at most 0.25, most preferably at most 0.20.

and in relation to type B protein feed, if only a single type B protein feed is used it has, or if two or more type B protein feeds are used they would, if mixed, have:

a content of BLG of 4-32% w/w relative to the total weight of type B protein feed, more preferably 6-32% w/w, more preferably 8-30% w/w, even more preferably 10-28% w/w, and most preferably 12-26% w/w BLG relative to the total weight of type B protein feed, a pH of in the range of 2-5.4, more preferably 3-5.2, even more preferably 4-5.0, most preferably 4.5-4.9, preferably, a temperature of at most 20 degrees C., more preferably at most 15 degrees C., even more preferably at most 10 degrees C. and most preferably at most 5 degrees C., preferably, a content of BLG in an amount of at least 30% w/w relative to the total amount of protein, more preferably at least 40% w/w, even more preferred at least 50% w/w, and most preferred at least 55% w/w, one or more of:

a conductivity of at most 7 mS/cm, more preferably at most 5 mS/cm, and most preferably at most 3 mS/cm, and a ratio between the conductivity and the total amount of protein of at most 0.3, more preferably at most 0.25, most preferably at most 0.20.

Numbered embodiment 88. The method according to any of the preceding numbered embodiments, wherein type A protein feed(s) and type B protein feed(s) contribute with at least 50% w/w of the protein content of the initial protein solution, more preferably at least 70% w/w, even more preferably at least 80% w/w, and most preferably at least 90% w/w.

Numbered embodiment 89. The method according to any of the preceding numbered embodiments, wherein type A protein feed(s) and type B protein feed(s) contribute with at least 92% w/w of the protein content of the initial protein solution, more preferably at least 94% w/w, even more preferably at least 96% w/w, and most preferably at least 99% w/w.

Numbered embodiment 90. The method according to any of the preceding numbered embodiments, wherein type A protein feed(s) and type B protein feed(s) contribute with at least 50% w/w of the solids content of the initial protein solution, more preferably at least 70% w/w, even more preferably at least 80% w/w, and most preferably at least 90% w/w.

Numbered embodiment 91. The method according to any of the preceding numbered embodiments, wherein type A protein feed(s) and type B protein feed(s) contribute with at least 92% w/w of the solids content of the initial protein solution, more preferably at least 94% w/w, even more preferably at least 96% w/w, and most preferably at least 99% w/w.

Numbered embodiment 92. The method according to any of the preceding numbered embodiments, wherein type A protein feed(s) and type B protein feed(s) contribute with at least 50% w/w of the weight of the initial protein solution, more preferably at least 70% w/w, even more preferably at least 80% w/w, and most preferably at least 90% w/w.

Numbered embodiment 93. The method according to any of the preceding numbered embodiments, wherein type A protein feed(s) and type B protein feed(s) contribute with at least 92% w/w of the weight of the initial protein solution, more preferably at least 94% w/w, even more preferably at least 96% w/w, and most preferably at least 99% w/w.

Numbered embodiment 94. The method according to any of the preceding numbered embodiments, wherein the degree of supersaturation of BLG of the initial protein solution is higher than both the degree of supersaturation of:

the type A protein feed if only a single type A protein feed is used, or the type A protein feeds, if combined, if two or more type A protein feeds are used, and of:

the type B protein feed if only a single type B protein feed is used, or the type B protein feeds, if combined, if two or more type B protein feeds are used.

The present invention has been described above with reference to specific embodiments. However, other embodiments than the above described are equally possible within the scope of the invention. The different features and steps of various embodiments and aspects of the invention may be combined in other ways than those described herein unless it is stated otherwise.

EXAMPLES

Example 1: Crystallization Based on Mixing of Two WPI Streams

Introduction

During the initial trials of large-scale implementation of the method of WO2018/115520, frequent events of spontaneous BLG crystallization were observed in the ultrafiltration unit used to prepare the whey protein solution. The events of spontaneous BLG crystallization led to interruptions of the production and to time-consuming cleaning of the process units affected by the crystallisation.

The inventors then had the idea that instead of producing the supersaturated protein solution of WO2018/115520 from a single feed that could become supersaturated with respect to BLG under unfavorable conditions during preparation (e.g. at the occurrence of high, local protein concentration and/or sudden cooling), it was smarter to produce the supersaturated whey protein solution from two (or more) feeds, each having a pH that makes it clearly non-supersaturated with respect to BLG (or only supersaturated to a limited degree), and then mixing to two (or more) feeds to get the right pH for supersaturation of BLG, i.e. a pH close to pH 5.5.

This new approach makes it possible to prepare feeds with a very high content of protein without the risk of uncontrolled BLG crystallisation. Additionally, this approach makes it possible to prepare the feeds, and subsequently the initial protein solution, at temperatures significantly below the growth optimum of microorganisms, which is advantageous as less heat-treatment is required to reduce the microbial content of the end products to an acceptable level. The inventors have furthermore found that the pH adjustments made by the present type A and/or type B protein feeds contributes only with a very limited change in the conductivity of the initial protein solution as opposed to making the same pH change with traditional food acids or food bases. This is beneficial as a reduced conductivity of the initial protein solution typically gives rise to a higher BLG crystallisation yield.

The feasibility of this new approach is demonstrated in this Example where the first protein feed (Batch One, a Type A protein feed) had a pH of 6.2 and the second protein feed (Batch Two, a Type B protein feed) had a pH of 4.9. Despite a high protein concentration, none of the feeds were supersaturated. However, by simply mixing the two feeds in appropriate amounts (to obtain a pH close to pH 5.5) supersaturated protein mixtures were obtained from which BLG could be crystallized.

Process:

The whey raw material for this example was a lactose depleted UF retentate derived from sweet whey from a standard cheese production process, the whey had been fat reduced via a Synder FR membrane prior to use. From this raw material two batches was produced and conditioned by an ultrafiltration setup using a Alfa Laval GR82PE membrane with a 30 mill spacer and a feed pressure of 1.5-3.0 bar. The product was demineralized with polished water as diafiltration medium and the feed had a concentration of 18 percent TS (Total Solids)±5 percent. The diafiltration continued at least until the drop in conductivity in the retentate was below 0.02 mS/cm over a 20 min period where the TS in the retentate was stable (±0.5 percent TS). The retentate was then concentrated to around 22 percent TS the feed composition of Batch One and Two can be seen in Table 1.1 and 1.2.

The first batch (Batch One) was pH adjusted to pH 6.1 with a food grade hydrochloric acid (HCl) prior to UF treatment at 10 to 12 degrees C. The other batch (Batch Two) was pH adjusted to pH 4.9 with a food grade hydrochloric acid (HCl) prior to UF treatment at 10 to 12 degrees C.

TABLE 1.1

| Data describing on Batch One Batch One | |
| --- | --- |
| Physical aspects: | |
| pH | 6.2 |
| TS (%) | 21.2 |
| Conductivity(mS/cm) | 2.52 |
| Protein composition % of total protein (%) | |
| ALA | 14 |
| BLG | 63 |
| other | 23 |

TABLE 1.1-continued

| Data describing on Batch One Batch One | |
| --- | --- |
| minerals a.o (%) relative to TS | |
| Ca | 0.461 |
| K | 0.486 |
| Mg | 0.079 |
| Na | 0.151 |
| P | 0.217 |
| protein concentration | 90 |

TABLE 1.2

| Data describing on Batch Two Batch Two | |
| --- | --- |
| Physical aspects: | |
| pH | 4.9 |
| TS (%) | 21.2 |
| Conductivity(mS/cm) | 0.71 |
| Protein composition % of total protein (%) | |
| ALA | 14 |
| BLG | 60 |
| other | 26 |
| minerals a.o (%) relative to TS | |
| Ca | 0.257 |
| K | 0.064 |
| Mg | 0.039 |
| Na | BDL* |
| P | 0.228 |
| protein concentration | 94 |

*BDL = Below Detection Limit

After UF treatment the temperature of the two batches was adjusted to 10 degrees C. before portions of the batches were mixed together in five different ratios to produce the protein solutions in which the crystallization was conducted see Table 1.3 for details. Each mixture was seeded at 10 degrees C. with 0.1% w/w seed material and cooled to 5 degrees C. after seeding and left over night with agitation.

In order to check whether the Batch One and Batch Two were already supersaturated, samples of each of the two batches were taken prior to the above-mentioned mixing and were also seeded and stored at 10 degrees C. overnight. Visual inspection by microscopy the following morning showed that no crystals were present after incubation and it can therefore be concluded that Batch One and Batch Two were not supersaturated.

The seed material was produced by mixing a small portion of Batch One and Two together to reach a final pH of 5.5 and subsequently add a small amount of dried BLG crystal material. The seed solution was then placed on ice for one hour with stirring.

Samples of the protein solutions were taken prior to seeding and after crystallization and centrifuge at 3000 g for 5 minute, samples of the supernatant were analyzed by RP-HPLC as describe in Example 1 of WO2018/115520 and the crystallization yield was calculated by the following formula:

$$Yield = 1 - \left( \frac{(1 - \% \ BLG_{before \ crystallization})}{(1 - \% \ BLG_{after \ crystallization})} \right) \times \frac{\% \ BLG_{after \ crystallization}}{\% \ BLG_{before \ crystallization}}$$

Where $\% \ BLG_{before \ crystallization}$ is the BLG concentration measured by HPLC in the sample prior to seeding ad crystallization and $\% \ BLG_{after \ crystallization}$ is the BLG concentration measured by HPLC in the supernatant of the sample after crystallization.

Results:

As can be seen from the table below it is possible to condition whey protein feeds in an pH area where they have a low degree of supersaturation (or even no supersaturation) with respect to BLG thereby lowering the risk of spontaneous crystallization in the in the UF plant and increasing the maximum protein concentration that can be used without spontaneous BLG crystallization. The two feeds were subsequently mixed to provide an initial protein solution with a high degree of BLG supersaturation.

TABLE 1.3

| Protein solution data. | | | | | |
| --- | --- | --- | --- | --- | --- |
| Solution: | 1 | 2 | 3 | 4 | 5 |
| pH | 5.2 | 5.3 | 5.5 | 5.7 | 5.8 |
| Conductivety (mS/cm) | 1.43 | 1.58 | 1.81 | 2.18 | 2.32 |
| Yield (%) | 35 | 62 | 68 | 54 | 28 |
| Mix ratio (Batch One:Batch Two) | 0.62 | | | 5.46 | |

Example 2: Crystallization Based on Mixing of Two WPI Streams, Using a Commercial Available WPI The whey material for this example was commercial available Lacprodan DI-9213 and a second self-produced pH 6.2 WPI.

The pH 6.2 WPI was made from a lactose depleted UF retentate derived from sweet whey from a standard cheese production process, the whey had been fat reduced via a Synder FR membrane prior to use. The raw material was pH adjusted to pH 6.2 with a food grade hydrochloric acid prior to UF treatment at 10 to 12 degrees C. From this raw material a batche was produced and conditioned by an ultrafiltration setup using a Alfa Laval GR82PE membrane with a 30 mill spacer and a feed pressure of 1.5-3.0 bar. The product was demineralized with polished water as diafiltration medium and the feed had a concentration of 18 percent TS±5 percent. The diafiltration continued at least until the drop in conductivity in the retentate was below 0.02 mS/cm over a 20 min period where the TS in the retentate was stable (±0.5 percent TS). The retentate was then concentrated to around 22 percent TS the feed composition of Batch One and Two can be seen in Tables 2.1 and 2.2.

The Batch Two was made from Lacprodan DI-9213 in powder form.

The powder was conditioned by rehydrating it to a TS of 16.3 and leaving it with stirring at 10 degrees C. until all powder was dissolved.

TABLE 2.1

| Characteristics of Batch One Batch one | |
| --- | --- |
| Physical aspects: | |
| pH | 6.1 |
| TS (%) | 28.2 |
| Conductivity(mS/cm) | 2.73 |

TABLE 2.1-continued

Characteristics of Batch One
Batch one

| Protein composition % of total protein (%) | |
| --- | --- |
| ALA | 9 |
| BLG | 62 |
| other | 29 |
| minerals a.o (%) relative to TS | |
| Ca | 0.492 |
| K | 0.533 |
| Mg | 0.082 |
| Na | 0.123 |
| P | 0.205 |
| protein concentration | 89 |

TABLE 2.2

Data describing Batch Two
Batch Two

| Physical aspects: | |
| --- | --- |
| pH | 3.4 |
| TS (%) | 16.3 |
| Conductivity(mS/cm) | 1.58 |
| Protein composition % of total protein (%) | |
| ALA | 10 |
| BLG | 70 |
| other | 20 |
| minerals a.o (%) relative to TS | |
| Ca | 0.019 |
| K | 0.003 |
| Mg | 0.003 |
| Na | 0.003 |
| P | 1.425 |
| protein concentration | 87.3 |

After conditioning the two batches was treated (with the exception that only two solutions were made) and analyzed as in Example 1.

The characteristics of the mixtures can be seen in Table 2.3.

Results:

As can be seen from the table below it is possible to condition whey protein feeds in a pH area where they have a no supersaturation with regards to BLG thereby lowering the risk of spontaneous crystallization and increasing the level protein concentration possible without risking crystallization in the UF plant, and then subsequently mix the two together in order to obtain a high degree of supersaturation. It can be seen that the higher conductivity impacts the yield as expected.

TABLE 2.3

| Protein solution data. | | |
| --- | --- | --- |
| solution: | 1 | 2 |
| pH | 5.4 | 5.5 |
| Conductivety (mS/cm) | 2.57 | 2.58 |
| Yield (%) | 55 | 56 |

Example 3: Crystallization Based on Mixing of Two WPI Streams, pH 4.0 and 6.1

The whey raw material for this example was a lactose depleted UF retentate derived from sweet whey from a standard cheese production process, the whey had been fat reduced via a Synder FR membrane prior to use. From this raw material two batches was produced and conditioned by an ultrafiltration setup using a Alfa Laval GR82PE membrane with a 30 mill spacer and a feed pressure of 1.5-3.0 bar. The product was demineralized with polished water as diafiltration medium and the feed had a concentration of 18 percent TS±5 percent. The diafiltration continued at least untill the drop in conductivity in the retentate was below 0.02 mS/cm over a 20 min period where the TS in the retentate was stable (±0.5 percent TS). The retentate was then concentrated to around 22 percent TS the feed composition of Batch One and Two can be seen in Tables 3.1 and 3.2.

One batch (batch one) was pH adjusted to pH 6.1 with a food grade hydrochloric acid (HCl) prior to UF treatment at 10 to 12 degrees C. The other batch (batch two) was pH adjusted to pH 4.0 with a food grade hydrochloric acid (HCl) prior to UF treatment at 10 to 12 degrees C.

TABLE 3.1

Data describing on Batch One
Batch One

| Physical aspects: | |
| --- | --- |
| pH | 6.1 |
| TS (%) | 21.2 |
| Conductivity(mS/cm) | 2.52 |
| Protein composition % of total protein (%) | |
| ALA | 14 |
| BLG | 63 |
| other | 23 |
| minerals a.o (%) relative to TS | |
| Ca | 0.461 |
| K | 0.486 |
| Mg | 0.079 |
| Na | 0.151 |
| P | 0.217 |
| protein concentration | 90 |

TABLE 3.2 data describing on Batch Two
Batch two

| Physical aspects: | |
| --- | --- |
| pH | 4.0 |
| TS (%) | 22.2 |
| Conductivity(mS/cm) | 1.49 |
| Protein composition % of total protein (%) | |
| ALA | 12 |
| BLG | 67 |
| other | 21 |
| minerals a.o (%) relative to TS | |
| Ca | BDL* |
| K | BDL* |
| Mg | BDL* |
| Na | BDL* |
| P | 0.202 |
| protein concentration | 89 |

*BDL = Below Detection Limit

After conditioning the two batches was treated (with the exception that only four solutions were made) and analyzed as in Example 1 of WO2018/115520.

The characteristics of the mixtures can be seen in Table 3.3.

Results:

As can be seen from the table below it is possible to condition whey protein feeds in an area where they have a low degree of supersaturation with regards to BLG thereby lowering the risk of spontaneous crystallization and increasing the level protein concentration possible without risking crystallization in the UF plant, and then subsequently mix the two together in order to obtain a high degree of supersaturation.

TABLE 3.3

| Protein solution data. | | | | |
|---|---|---|---|---|
| solution: | 1 | 2 | 3 | 4 |
| pH | 5.25 | 5.40 | 5.55 | 5.70 |
| Conductivity (mS/cm) | 2.3 | 2.34 | 2.42 | 2.46 |
| Yield (%) | 33 | 56 | 56 | 48 |

Example 4: Crystal Size Distribution

The whey raw material for this example was a lactose depleted UF retentate derived from sweet whey from a standard cheese production process, the whey had been fat reduced via a Synder FR membrane prior to use. From this raw material two batches for each crystallization was produced and conditioned by an ultrafiltration setup using a Alfa Laval GR82PE membrane with a 30 mill spacer and a feed pressure of 1.5-3.0 bar. The product was demineralized with polished water as diafiltration medium and the feed had a concentration of 18 percent TS±5 percent. The diafiltration continued at least untill the drop in conductivity in the retentate was below 0.02 mS/cm over a 20 min period where the TS in the retentate was stable (±0.5 percent TS). The retentate was then concentrated to around 22 percent TS the feed composition of batch one and two can be seen in the tables below One batch (Batch One) was pH adjusted to pH around 6.1 with a food grade hydrochloric acid (HCl) prior to UF treatment at 10 to 12 degrees C. The other batch (Batch Two) was pH adjusted to pH 4.8 with a food grade hydrochloric acid (HCl) prior to UF treatment at 10 to 12 degrees C.

The crystallizations were conducted in a 300 L crystallisation tank and 0.1% w/w seed material was used. The seed material was produces as in Example 1.

$1^{st}$ Crystallization

TABLE 4.1

| Data describing on Batch One | |
|---|---|
| Batch One | |
| Physical aspects: | |
| pH | 6.1 |
| TS (%) | 23.2 |
| Conductivity(mS/cm) | 2.72 |
| Protein composition % of total protein (%) | |
| ALA | 14 |
| BLG | 63 |
| other | 23 |
| minerals a.o (%) relative to TS | |
| Ca | 0.492 |
| K | 0.533 |
| Mg | 0.082 |

TABLE 4.1-continued

| Data describing on Batch One | |
|---|---|
| Batch One | |
| Na | 0.123 |
| P | 0.205 |
| protein concentration | 89 |

TABLE 4.2

| Data describing on Batch Two | |
|---|---|
| Batch Two | |
| Physical aspects: | |
| pH | 4.8 |
| TS (%) | 23.3 |
| Conductivity(mS/cm) | 0.72 |
| Protein composition % of total protein (%) | |
| ALA | 10 |
| BLG | 62 |
| other | 28 |
| minerals a.o (%) relative to TS | |
| Ca | 0.248 |
| K | 0.082 |
| Mg | 0.041 |
| Na | BDL* |
| P | 0.206 |
| protein concentration | 90 |

*BDL = Below Detection Limit

After conditioning the two batches were mixed together to obtain a final pH of 5.50, the mixture was seeded and rapidly cooled to 5 degrees C. and left over Night to crystallize. Samples of the slurry was analysed as described in example 1 to calculate the yield. The particle size distribution of the crystal slurry was analysed by Malvern particles sizes characterization.

$2^{nd}$ Crystallization

TABLE 4.3

| Data describing on Batch One | |
|---|---|
| Batch One | |
| Physical aspects: | |
| pH | 6.2 |
| TS (%) | 23.2 |
| Conductivity(mS/cm) | 2.70 |
| Protein composition % of total protein (%) | |
| ALA | 10 |
| BLG | 62 |
| other | 28 |
| minerals a.o (%) relative to TS | |
| Ca | 0.452 |
| K | 0.492 |
| Mg | 0.072 |
| Na | 0.150 |
| P | 0.205 |
| protein concentration | 88 |

TABLE 4.4

| Data describing on Batch Two Batch Two | |
|---|---|
| Physical aspects: | |
| pH | 4.8 |
| TS (%) | 23.3 |
| Conductivity(mS/cm) | 0.82 |
| Protein composition % of total protein (%) | |
| ALA | 10 |
| BLG | 62 |
| other | 28 |
| minerals a.o (%) relative to TS | |
| Ca | 0.214 |
| K | 0.067 |
| Mg | 0.030 |
| Na | BDL* |
| P | 0.196 |
| protein concentration | 90 |

*BDL = Below Detection Limit

After conditioning the two batches was mixed together to obtain a final pH of 5.45, the mixture was seeded and rapidly cooled to 5 degrees C. and left over Night to crystallize. Samples of the slurry was analysed as described in example 1 to calculate the yield. The particle size distribution of the crystal slurry was analysed by Malvern particles size characterization.

3$^{rd}$ Crystallization:

TABLE 4.5

| Data describing on Batch One Batch one | |
|---|---|
| Physical aspects: | |
| pH | 6.1 |
| TS (%) | 22.9 |
| Conductivity(mS/cm) | 2.66 |
| Protein composition % of total protein (%) | |
| ALA | 9 |
| BLG | 66 |
| other | 25 |
| minerals a.o (%) relative to TS | |
| Ca | 0.405 |
| K | 0.485 |
| Mg | 0.073 |
| Na | 0.149 |
| P | 0.177 |
| protein concentration | 87 |

TABLE 4.6

| Data describing on Batch Two Batch two | |
|---|---|
| Physical aspects: | |
| pH | 4.8 |
| TS (%) | 23.3 |
| Conductivity(mS/cm) | 0.82 |
| Protein composition % of total protein (%) | |
| ALA | 10 |
| BLG | 69 |
| other | 21 |
| minerals a.o (%) relative to TS | |
| Ca | 0.192 |
| K | 0.061 |

TABLE 4.6-continued

| Data describing on Batch Two Batch two | |
|---|---|
| Mg | 0.029 |
| Na | BDL* |
| P | 0.176 |
| protein concentration | 89 |

*BDL = Below Detection Limit

After conditioning the two batches was mixed together to obtain a pH of 5.80, the mixture was seeded and incubated for 1 hour before it was adjusted, by further addition of Batch Two, over 2 hours to a final pH of 5.45 and then rapidly cooled to 5 degrees C. and left over Night to crystallize. Samples of the slurry was analysed as described in Example 1 to calculate the yield. The particle size distribution of the crystal slurry was analysed by Malvern particles size characterization.

Results:

In the Table 4.7 the results of the crystallizations are shown, and as can be seen the crystal size distributions were similar even though different raw materials were used and the crystallization processes differed.

TABLE 4.7

| Overview of crystallization results | | | | |
|---|---|---|---|---|
| Crystallization | BLG Yield (%) | Dx(10) | Dx(50) | Dx(90) |
| 1 | 73 | 80 | 167 | 263 |
| 2 | 75 | 58 | 153 | 253 |
| 3 | 71 | 57 | 127 | 248 |

The invention claimed is:

1. A method of preparing an edible composition comprising beta-lactoglobulin (BLG), the method comprising the steps of:
   a) preparing an initial protein solution comprising BLG, wherein said initial protein solution is supersaturated with respect to BLG and has a pH in the range of 5-6,
   b) crystallising BLG in the supersaturated, initial protein solution in salting-in mode, thereby obtaining a BLG crystal-containing solution, and
   c) separating BLG crystals from the remaining liquid of the BLG crystal-containing solution,
   wherein step a) involves preparing the initial protein solution by mixing one or more type A protein feed(s) with one or more type B protein feed(s),
   and wherein:
      a "type A protein feed" is defined as a protein feed which comprises BLG and has a pH of at least 5.6, and
      a "type B protein feed" is defined as a protein feed which comprises BLG and has a pH of at most 5.4.

2. The method according to claim 1 wherein:
   in relation to the one or more type A protein feed(s):
      if only a single type A protein feed is used it has, or
      if two or more type A protein feeds are used they would, if mixed, have a pH of at least 5.6, and
   in relation to the one or more type B protein feed(s):
      if only a single type B protein feed is used it has, or
      if two or more type B protein feeds are used they would, if mixed, have a pH of at most 5.4.

3. The method according to claim 1, wherein:
   in relation to the one or more type A protein feed(s):
      if only a single type A protein feed is used it has, or if two or more type A protein feeds are used they would, if mixed, have a pH of at least 6.0, and in relation to the one or more type B protein feed(s):

if only a single type B protein feed is used it has, or if two or more type B protein feeds are used they would, if mixed, have a pH of at most 5.0.

4. The method according to claim 1, wherein in relation to the one or more type A protein feed(s):

if only a single type A protein feed is used it has, or if two or more type A protein feeds are used they would, if mixed, have a pH of in the range of 5.6-10.

5. The method according to claim 1, wherein in relation to the one or more type A protein feed(s):

if only a single type A protein feed is used it has, or if two or more type A protein feeds are used they would, if mixed, have a pH of in the range of 6.0-8.

6. The method according to claim 1, wherein in relation to the one or more type B protein feed(s):

if only a single type B protein feed is used it has, or if two or more type B protein feeds are used they would, if mixed, have a pH of in the range of 2-5.4.

7. The method according to claim 1, wherein in relation to the one or more type B protein feed(s):

if only a single type B protein feed is used it has, or if two or more type B protein feeds are used they would, if mixed, have a pH of in the range of 4.0-5.0.

8. The method according to claim 1, wherein at least one of the one or more type A protein feed(s) does not contain BLG crystals and/or wherein at least one of the one or more type B protein feed(s) do not contain BLG crystals.

9. The method according to claim 1, wherein at least one of the one or more type A protein feed(s) is not supersaturated with respect to BLG and/or wherein at least one of the one or more type B protein feed(s) is not supersaturated with respect to BLG.

10. The method according to claim 1, wherein type A and type B protein feed(s) that do not contain BLG crystals contribute with at least 1% w/w of the BLG content of the initial protein solution.

11. The method according to claim 1, wherein type A and type B protein feed(s) that do not contain BLG crystals contribute with at least 50% w/w of the BLG content of the initial protein solution.

12. The method according to claim 1, wherein in relation to the one or more type A protein feed(s):

if only a single type A protein feed is used it has, or if two or more type A protein feeds are used they would, if mixed, have a temperature of at most 60 degrees C.

13. The method according to claim 1, wherein in relation to the one or more type B protein feed(s):

if only a single type B protein feed is used it has, or if two or more type B protein feeds are used they would, if mixed, have a temperature of at most 60 degrees C.

14. The method according to claim 1, wherein in relation to the one or more type A protein feed(s):

if only a single type A protein feed is used it comprises, or if two or more type A protein feeds are used they would, if mixed, comprise at least 1% w/w BLG relative to the total weight of the one or more type A protein feed(s).

15. The method according to claim 1, wherein in relation to the one or more type B protein feed(s):

if only a single type B protein feed is used it comprises, or if two or more type B protein feeds are used they would, if mixed, comprise at least 1% w/w BLG relative to the total weight of the one or more type B protein feed(s).

16. The method according to claim 1, wherein the initial protein solution comprises a total amount of the one or more type A protein feed(s) in the range of 1-99% w/w relative to the weight of the initial protein solution.

17. The method according to claim 1, wherein the initial protein solution comprises a total amount of the one or more type B protein feed(s) in the range of 1-99% w/w relative to the weight of the initial protein solution.

18. The method according to claim 1, wherein the initial protein solution comprises:

a total amount of type A protein feed(s) having a pH of 5.8-8 in the range of 5-90% w/w relative to the weight of the initial protein solution, and a total amount of type B protein feed(s) having a pH of 3-5.2 in the range of 5-90% w/w relative to the weight of the initial protein solution.

19. The method according to claim 1, wherein the initial protein solution comprises:

a total amount of type A protein feed(s) having a pH of 6.0-8 in the range of 5-90% w/w relative to the weight of the initial protein solution, and a total amount of type B protein feed(s) having a pH of 3-5.0 in the range of 5-90% w/w relative to the weight of the initial protein solution.

20. The method according to claim 1, wherein the one or more type A protein feed(s) and the one or more type B protein feed(s) contribute with at least 50% w/w of the protein content of the initial protein solution.

21. The method according to claim 1, wherein the one or more type A protein feed(s) and the one or more type B protein feed(s) contribute with at least 92% w/w of the protein content of the initial protein solution.

22. The method according to claim 1, wherein the one or more type A protein feed(s) and the one or more type B protein feed(s) contribute with at least 50% w/w of the solids content of the initial protein solution.

23. The method according to claim 1, wherein the one or more type A protein feed(s) and the one or more type B protein feed(s) contribute with at least 92% w/w of the solids content of the initial protein solution.

24. The method according to claim 1, wherein the one or more type A protein feed(s) and the one or more type B protein feed(s) contribute with at least 50% w/w of the weight of the initial protein solution.

25. The method according to claim 1, wherein the one or more type A protein feed(s) and the one or more type B protein feed(s) contribute with at least 92% w/w of the weight of the initial protein solution.

26. The method according to claim 1, wherein the degree of supersaturation of BLG of the initial protein solution is higher than both the degree of supersaturation of:

the type A protein feed if only a single type A protein feed is used, or the type A protein foods, if combined, if two or more type A protein foods are used, and of:

the type B protein feed if only a single type B protein feed is used, or the type B protein foods, if combined, if two or more type B protein feeds are used.

* * * * *